(12) United States Patent
Kawahata et al.

(10) Patent No.: US 6,450,591 B1
(45) Date of Patent: Sep. 17, 2002

(54) HYDRAULIC BRAKE PRESSURE CONTROL SYSTEM

(75) Inventors: Fumiaki Kawahata, Toyota (JP); Masayasu Ohkubo, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/127,865

(22) Filed: Aug. 3, 1998

(30) Foreign Application Priority Data

Aug. 12, 1997 (JP) .............................................. 9-217828

(51) Int. Cl.$^7$ ................................................ B60T 8/32
(52) U.S. Cl. .................................................... 303/122.5
(58) Field of Search ........................... 303/122, 122.04, 303/122.05, 122.07, 122.09, 122.1, 122.11, 122.12, 122.13, 122.14

(56) References Cited

U.S. PATENT DOCUMENTS

| | | | |
|---|---|---|---|
| 5,567,021 A | | 10/1996 | Gaillard |
| 5,779,327 A | * | 7/1998 | Nakashima et al. ... 303/122.12 |
| 5,951,120 A | * | 9/1999 | Shimura ................ 303/122.05 |
| 5,979,997 A | | 11/1999 | Ohkubo et al. |
| 5,997,106 A | * | 12/1999 | Takayama ............... 303/122.05 |
| 6,007,164 A | * | 12/1999 | Sakai et al. ............ 303/122.12 |

FOREIGN PATENT DOCUMENTS

| | | |
|---|---|---|
| DE | 4343314 A1 | 6/1995 |
| DE | 1951224 A1 | 10/1996 |
| DE | 19731720 A1 | 2/1998 |
| DE | 19835881 | 4/1999 |
| DE | 19835881 A1 | 5/1999 |
| GB | 2 314900 A | 1/1998 |
| JP | A-4-243658 | 8/1992 |
| JP | A-6-312658 | 11/1994 |
| JP | A-7-277175 | 10/1995 |

OTHER PUBLICATIONS

W. Jonner et al., *Electrohydraulic Brake System—The First Approach to Brake–By–Wire Technology*, Society of Automotive Engineers (SAE), Paper No. 960991, pp. 105–112.

M. Singh et al., Design of a Brake by Wire System Using OOA, Society of Automotive Engineers (SAE), Paper No. 960992, pp. 75–80.

* cited by examiner

Primary Examiner—Christopher P. Schwartz
Assistant Examiner—C. T. Bartz
(74) Attorney, Agent, or Firm—Oliff & Berridge, PLC

(57) ABSTRACT

In a hydraulic brake pressure control system, a master cylinder generates a brake fluid pressure proportional to a brake pedal pressure and a high-pressure supply device generates an increased brake fluid pressure. A hydraulic circuit having a wheel cylinder device is capable of performing a master cylinder control to control a wheel cylinder pressure by using the pressure generated by the master cylinder, and capable of performing a brake-by-wire control to control the wheel cylinder pressure by using the pressure generated by the high-pressure supply device. The hydraulic brake pressure control system includes a master cut valve device which controls a flow of brake fluid from the master cylinder into the wheel cylinder device. A wheel cylinder sensor device outputs a signal indicative of the brake fluid pressure in the wheel cylinder device. A malfunction position/mode detecting unit detects a malfunction position and a malfunction mode in the hydraulic brake pressure control system based on the signal output by the wheel cylinder sensor device during the master cylinder control and the signal output by the wheel cylinder sensor device during the brake-by-wire control.

23 Claims, 25 Drawing Sheets

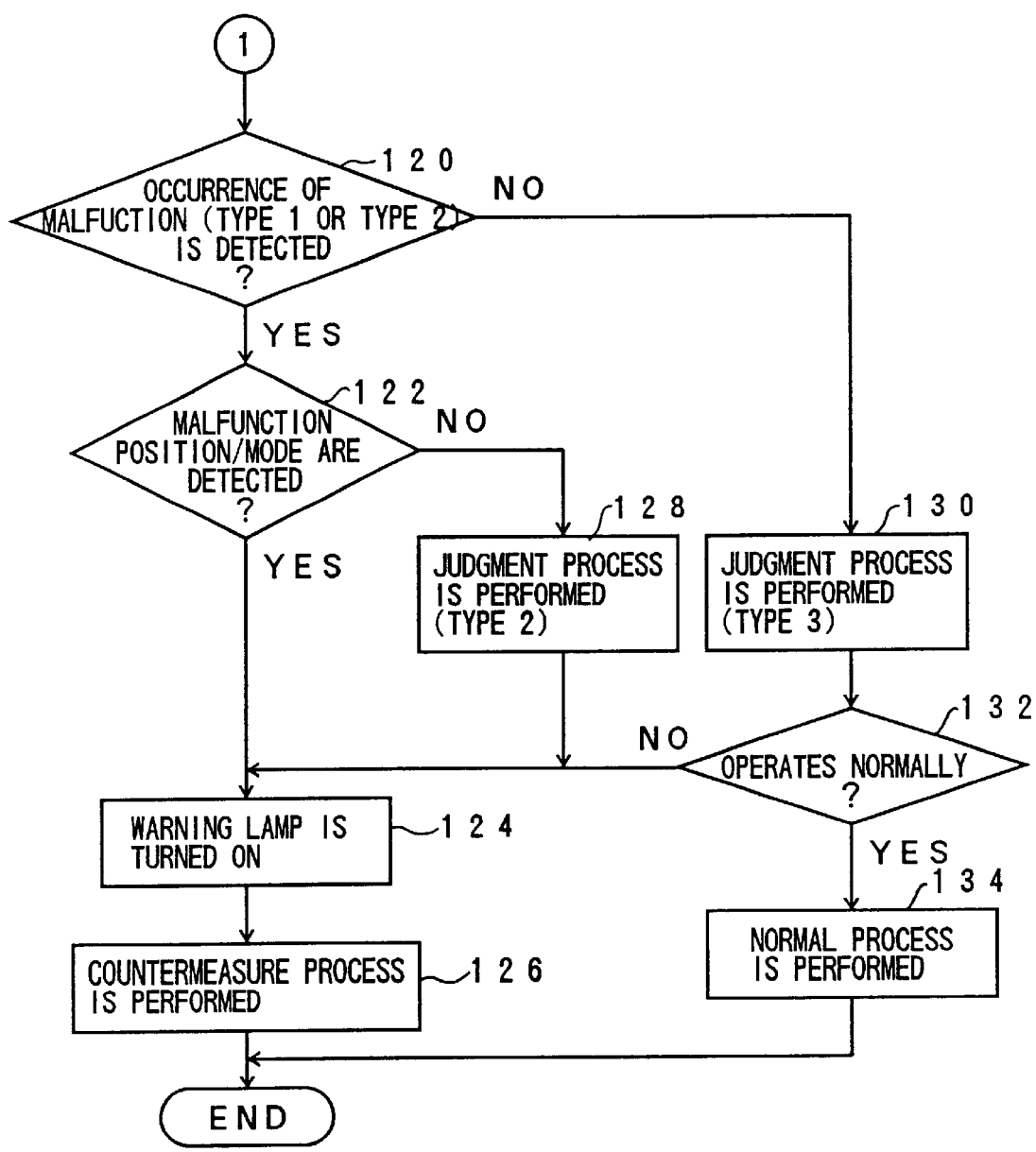

FIG.5

| No. | M/C CHECK SENSOR OUTPUTS<br>MC FR FL RR RL | BBW CHECK SENSOR OUTPUTS<br>FR FL RR RL | JUDGMENT PROCESS | RESULT | MALFUNCTION POSITION / MODE |
|---|---|---|---|---|---|
| 1 | ○ ○ ○ △ △ (NO RISE) | ○ ○ ○ ○ | PROCESS 1 | A | M/C REAR; NO PRESSURE RISE |
| 2 | | | | B | RMCV 58; VALVE-CLOSED DEFECT |
| 3 | | ○ ○ △ ○ | PROCESS 2 or PROCESS 3 | A | RR W/C PIPE; LEAK |
| 4 | | | | B | RR LCV 94; LEAK |
| 5 | | ○ ○ ○ △ | PROCESS 2 or PROCESS 3 | A | RL W/C PIPE; LEAK |
| 6 | | | | B | RL LCV 96; LEAK |
| 7 | ○ ○ ○ △ △ (NO DROP) | ○ ○ ○ ○ | | | M/C REAR; PRESSURE FIXED |
| 8 | ○ × × ○ ○ (NO RISE) | ○ ○ ○ ○ | | | FMCV 50; VALVE-CLOSED DEFECT |
| 9 | △ △ △ ○ ○ (NO RISE) | ○ ○ ○ ○ | | | M/C FRONT; NO PRESSURE RISE |
| 10 | | △ ○ ○ ○ | PROCESS 2 or PROCESS 3 | A | FR W/C PIPE; LEAK |
| 11 | | | | B | FR LCV 90; LEAK |
| 12 | | ○ △ ○ ○ | PROCESS 2 or PROCESS 3 | A | FL W/C PIPE; LEAK |
| 13 | | | | B | FL LCV 92; LEAK |
| 14 | △ △ △ ○ ○ (NO DROP) | ○ ○ ○ ○ | | | M/C FRONT; PRESSURE FIXED |
| 15 | × ○ ○ ○ ○ | ○ ○ ○ ○ | | | M/C SENSOR; INOPERATIVE |
| 16 | △ ○ ○ ○ ○ | ○ ○ ○ ○ | | | M/C SENSOR; DRIFT |

FIG.6

| No. | M/C CHECK SENSOR OUTPUTS | | | | | BBW CHECK SENSOR OUTPUTS | | | | JUDGMENT PROCESS | RESULT | MALFUNCTION POSITION / MODE |
|---|---|---|---|---|---|---|---|---|---|---|---|---|
| | MC | FR | FL | RR | RL | FR | FL | RR | RL | | | |
| 17 | O | × | O | O | O | × | O | O | O | | | FR SENSOR; INOPERATIVE |
| 18 | O | △ | O | O | O | △ | O | O | O | | | FR SENSOR; DRIFT |
| 19 | O | O | × | O | O | O | × | O | O | | | FL SENSOR; INOPERATIVE |
| 20 | | | | | | O | O | O | O | | | FSCV 55; VALVE - CLOSED DEFECT |
| 21 | O | O | △ | O | O | O | △ | O | O | | | FL SENSOR; DRIFT |
| 22 | O | O | O | × | O | O | O | × | O | | | RR SENSOR; INOPERATIVE |
| 23 | O | O | O | △ | O | O | O | △ | O | | | RR SENSOR; DRIFT |
| 24 | O | O | O | O | × | O | O | O | × | | | RL SENSOR; INOPERATIVE |
| 25 | | | | | | O | O | O | O | | | RSCV 63; VALVE - CLOSED DEFECT |
| 26 | O | O | O | O | △ | O | O | O | △ | | | RL SENSOR; DRIFT |
| 27 | O | O | O | O | O | △ (NO RISE) | O | O | O | PROCESS 4 | A | FMCV 50; VALVE - OPEN DEFECT |
| 28 | | | | | | | | | | | B | FR LCV 80; VALVE - CLOSED DEFECT |
| 29 | | | | | | △ (NO LINEAR CONTROL) | O | O | O | | | FR LCV 80; VALVE - OPEN DEFECT |
| 30 | | | | | | △ (NO DROP) | O | O | O | | | FR LCV 90; VALVE - CLOSED DEFECT |
| 31 | | | | | | O | △ (NO RISE) | O | O | | | FL LCV 82; VALVE - CLOSED DEFECT |
| 32 | | | | | | O | △ (NO LINEAR CONTROL) | O | O | | | FL LCV 82; VALVE - OPEN DEFECT |

FIG.7

| No. | M/C CHECK SENSOR OUTPUTS<br>MC FR FL RR RL | BBW CHECK SENSOR OUTPUTS<br>FR FL RR RL | JUDGMENT PROCESS | RESULT | MALFUNCTION POSITION / MODE |
|---|---|---|---|---|---|
| 33 | ○ ○ ○ ○ ○ | ○ △ ○ ○<br>(NO DROP) | | | FL LCV 92 ;<br>VALVE – CLOSED DEFECT |
| 34 | | ○ ○ △ ○<br>(NO RISE) | PROCESS 5 | A | RMCV 58 ;<br>VALVE – OPEN DEFECT |
| 35 | | | | B | RR LCV 86 ;<br>VALVE – CLOSED DEFECT |
| 36 | | ○ ○ △ ○<br>(NO LINEAR CONTROL) | | | RR LCV 86 ;<br>VALVE – OPEN DEFECT |
| 37 | | ○ ○ △ ○<br>(NO DROP) | | | RR LCV 94 ;<br>VALVE – CLOSED DEFECT |
| 38 | | ○ ○ ○ △<br>(NO RISE) | | | RL LCV 88 ;<br>VALVE – CLOSED DEFECT |
| 39 | | ○ ○ ○ △<br>(NO LINEAR CONTROL) | | | RL LCV 88 ;<br>VALVE – OPEN DEFECT |
| 40 | | ○ ○ ○ △<br>(NO DROP) | | | RL LCV 96 ;<br>VALVE – CLOSED DEFECT |
| 41 | | △ △ ○ ○<br>(COMMON CHANGE) | | | FSCV 55 ;<br>VALVE – OPEN DEFECT |
| 42 | | × × ○ ○ | | | FCV 79 ;<br>VALVE – CLOSED DEFECT |
| 43 | | ○ ○ △ △ | | | RSCV 63 ;<br>VALVE – OPEN DEFECT |
| 44 | | ○ ○ × ×<br>(COMMON CHANGE) | | | RCV 84 ;<br>VALVE – CLOSED DEFECT |
| 45 | | ○ ○ ○ ○ | PROCESS 6 | A | FCV 79 ;<br>VALVE – OPEN DEFECT |
| 46 | | | PROCESS 7 | A | RCV 84 ;<br>VALVE – OPEN DEFECT |
| 47 | | | PROCESS 8 | A | VALVE 26 ;<br>PACC LEAK |
| 48 | △ △ △ ○ ○<br>(RAPID INCREASE) | ○ ○ ○ ○ | | | |

FIG.16

| No. | MAL-FUNCTION POSITION | MAL-FUNCTION MODE | CONTROL METHOD FR | FL | RR | RL | BBW BASE PRESSURE | COUNTER-MEASURE PROCESS |
|---|---|---|---|---|---|---|---|---|
| 1 | M/C REAR | NO RISE | BBW | BBW | BBW | BBW | pMC | · RMCV 58 → CLOSE |
| 7 | | PRESSURE FIXED | SAME AS No.1 | | | | | |
| 9 | M/C FRONT | NO RISE | BBW | BBW | M/C | BBW | pRR | · RR LCV 86 → CLOSE<br>· RR LCV 94 → CLOSE<br>· RMCV 58 → OPEN<br>· RSCV 63 → CLOSE |
| 14 | | PRESSURE FIXED | SAME AS No.9 | | | | | |
| 15 | M/C SENSOR 24 | INOPERATIVE | SAME AS No.9 | | | | | |
| 16 | | DRIFT | ACTION ① BBW | BBW | BBW | BBW | pMC | · pMC CORRECTION |
| | | | ACTION ② SAME AS No.9 | | | | | |
| 17 | FR SENSOR 54 | INOPERATIVE | ACTION ① BBW | BBW | BBW | BBW | pMC | · FR LCV 80 → CLOSE<br>· FR LCV 90 → CLOSE<br>· FMCV 50 → CLOSE<br>· FSCV 55 → OPEN |
| | | | ACTION ② BBW | BBW | BBW | BBW | pMC | · FR LCV AND FL LCV→SAME OPERATION |
| 18 | | DRIFT | ACTION ① BBW | BBW | BBW | BBW | pMC | · pFR CORRECTION |
| | | | ACTION ② SAME AS No.17 (ACTIONS 1 & 2) | | | | | |

FIG.17

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 19 | FL SENSOR 57 | INOPERATIVE | ACTION ① BBW | BBW | BBW | BBW | pMC | · FL LCV 82 → CLOSE<br><br>· FL LCV 92 → CLOSE<br><br>· FMCV 50 → CLOSE<br><br>· FSCV 55 → OPEN |
| | | | ACTION ② BBW | BBW | BBW | BBW | pMC | · FL LCV AND FR LCV→SAME OPERATION |
| 21 | | DRIFT | ACTION ① BBW | BBW | BBW | BBW | pMC | · pFL CORRECTION |
| | | | ACTION ② | SAME AS No.19 (ACTIONS 1 & 2) | | | | |
| 22 | RR SENSOR 62 | INOPERATIVE | ACTION ① BBW | BBW | BBW | BBW | pMC | · RR LCV 86 → CLOSE<br><br>· RR LCV 94 → CLOSE<br><br>· RMCV 58 → CLOSE<br><br>· RSCV 63 → OPEN |
| | | | ACTION ② BBW | BBW | BBW | BBW | pMC | · RR LCV AND RL LCV→SAME OPERATION |
| 23 | | DRIFT | ACTION ① BBW | BBW | BBW | BBW | pMC | · pRR CORRECTION |
| | | | ACTION ② | SAME AS No.22 (ACTIONS 1 & 2) | | | | |

FIG.18

| No. | MAL-FUNCTION POSITION | MAL-FUNCTION MODE | CONTROL METHOD FR | FL | RR | RL | BBW BASE PRESSURE | COUNTER-MEASURE PROCESS |
|---|---|---|---|---|---|---|---|---|
| 24 | RL SENSOR 65 | INOPERATIVE | ACTION ① BBW | BBW | BBW | BBW | pMC | · RL LCV 88 → CLOSE<br>· RL LCV 96 → CLOSE<br>· RMCV 58 → CLOSE<br>· RSCV 63 → OPEN |
|  |  |  | ACTION ② BBW | BBW | BBW | BBW | pMC | · RL LCV AND RR LCV→SAME OPERATION |
| 26 |  | DRIFT | ACTION ① BBW | BBW | BBW | BBW | pMC | · pRL CORRECTION |
|  |  |  | ACTION ② | SAME AS No.24 (ACTIONS 1 & 2) | | | | |
| 34 | RMCV 58 | VALVE-OPEN DEFECT | BBW | BBW | M/C | BBW | pMC or pRR | · RR LCV 86 → CLOSE<br>· RR LCV 94 → CLOSE<br>· RSCV 63 →CLOSE |
| 2 |  | VALVE-CLOSED DEFECT | SAME AS NORMAL PROCESS | | | | | |
| 43 | RSCV 63 | VALVE-OPEN DEFECT | BBW | BBW | BBW | BBW | pMC | · RR LCV 88 → CLOSE<br>· RL LCV 96 → CLOSE<br>· RMCV 58 → CLOSE |
| 25 |  | VALVE-CLOSED DEFECT | SAME AS NORMAL PROCESS | | | | | |

FIG.19

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 27 | FMCV 50 | VALVE-OPEN DEFECT | M/C | BBW | BBW | BBW | pMC or pFR | · FR LCV 80 → CLOSE<br>· FR LCV 90 → CLOSE<br>· FSCV 55 → CLOSE |
| 8 | | VALVE-CLOSED DEFECT | SAME AS NORMAL PROCESS | | | | | |
| 41 | FSCV 55 | VALVE-OPEN DEFECT | BBW | BBW | BBW | BBW | pMC | · FL LCV 82 → CLOSE<br>· FL LCV 92 → CLOSE<br>· FMCV 50 →CLOSE |
| 20 | | VALVE-CLOSED DEFECT | SAME AS NORMAL PROCESS | | | | | |
| 45 | RCV 84 | VALVE-OPEN DEFECT | SAME AS NORMAL PROCESS | | | | | |
| 44 | | VALVE-CLOSED DEFECT | BBW | BBW | M/C | M/C | pMC | · RR LCV 86 →CLOSE<br>· RR LCV 94 →CLOSE<br>· RL LCV 88 →CLOSE<br>· RL LCV 96 →CLOSE<br>· RMCV 58 →OPEN<br>· RSCV 63 →OPEN |

FIG.20

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 46 | FCV 79 | VALVE-OPEN DEFECT | SAME AS NORMAL PROCESS | | | | | |
| 42 | | VALVE-CLOSED DEFECT | M/C | M/C | BBW | BBW | pMC | • FR LCV 80 → CLOSE<br>• FR LCV 90 → CLOSE<br>• FL LCV 82 → CLOSE<br>• FL LCV 92 → CLOSE<br>• FMCV 50 → OPEN<br>• FSCV 55 → OPEN |
| 29 | FR LCV 80 | VALVE-OPEN DEFECT | ACTION ① SAME AS NORMAL PROCESS | | | | | |
| | | | ACTION ② M/C | M/C | BBW | BBW | pMC | • FR LCV 90 → CLOSE<br>• FL LCV 82 → CLOSE<br>• FL LCV 92 → CLOSE<br>• FMCV 50 → OPEN<br>• FSCV 55 → OPEN<br>• FCV 79 → CLOSE |
| 28 | | VALVE-CLOSED DEFECT | BBW | BBW | BBW | BBW | pMC | • FR LCV 90 → CLOSE<br>• FMCV 50 → CLOSE<br>• FSCV 55 → OPEN |

FIG.21

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 11 | FR LCV 90 | VALVE-OPEN DEFECT | ACTION ① SAME AS NORMAL PROCESS | | | | | |
| | | | ACTION ② NONE | BBW | BBW | BBW | pMC | · FR LCV 80 → CLOSE<br>· FMCV 50 →CLOSE<br>· FSCV 55 →CLOSE<br>· FCV 79 → OPEN |
| 30 | | VALVE-CLOSED DEFECT | BBW | BBW | BBW | BBW | pMC | · FR LCV 80 → CLOSE<br>· FMCV 50 →CLOSE<br>· FSCV 55 →OPEN |
| 32 | FL LCV 82 | VALVE-OPEN DEFECT | ACTION ① SAME AS NORMAL PROCESS | | | | | |
| | | | ACTION ② M/C | M/C | BBW | BBW | pMC | · FL LCV 92 →CLOSE<br>· FR LCV 80 →CLOSE<br>· FR LCV 90 →CLOSE<br>· FMCV 50 →OPEN<br>· FSCV 55 →OPEN<br>· FCV 79 →CLOSE |
| 31 | | VALVE-CLOSED DEFECT | BBW | BBW | BBW | BBW | pMC | · FL LCV 92 →CLOSE<br>· FMCV 50 →CLOSE<br>· FSCV 55 →OPEN |

FIG.22

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 13 | FL LCV 92 | VALVE-OPEN DEFECT | ACTION ① | SAME AS NORMAL PROCESS | | | | |
| | | | ACTION ② BBW | NONE | BBW | BBW | pMC | · FL LCV 82 →CLOSE<br>· FMCV 50 →CLOSE<br>· FSCV 55 →CLOSE<br>· FR LCV 80 →OPEN |
| 33 | | VALVE-CLOSED DEFECT | BBW | BBW | BBW | BBW | pMC | · FL LCV 82 →CLOSE<br>· FMCV 50 →CLOSE<br>· FSCV 55 →OPEN |
| 36 | RR LCV 86 | VALVE-OPEN DEFECT | ACTION ① | SAME AS NORMAL PROCESS | | | | |
| | | | ACTION ② BBW | BBW | M/C | M/C | pMC | · RR LCV 94 →CLOSE<br>· RL LCV 88 →CLOSE<br>· RL LCV 96 →CLOSE<br>· RMCV 58 →OPEN<br>· RSCV 63 →OPEN<br>· RCV 84 →CLOSE |
| 35 | | VALVE-CLOSED DEFECT | BBW | BBW | BBW | BBW | pMC | · RR LCV 94 →CLOSE<br>· RMCV 58 →CLOSE<br>· RSCV 63 →OPEN |

FIG.23

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 4 | RR LCV 94 | VALVE-OPEN DEFECT | ACTION ① | SAME AS NORMAL PROCESS | | | | |
| | | | ACTION ② BBW | BBW | NONE | BBW | pMC | · RR LCV 86 →CLOSE<br>· RMCV 58 →CLOSE<br>· RSCV 63 →CLOSE<br>· RCV 84 → OPEN |
| 37 | | VALVE-CLOSED DEFECT | BBW | BBW | BBW | BBW | pMC | · RR LCV 86 → CLOSE<br>· RMCV 58 →CLOSE<br>· RSCV 63 →OPEN |
| 39 | RL LCV 88 | VALVE-OPEN DEFECT | ACTION ① | SAME AS NORMAL PROCESS | | | | |
| | | | ACTION ② BBW | BBW | M/C | M/C | pMC | · RL LCV 96 →CLOSE<br>· RR LCV 86 →CLOSE<br>· RR LCV 94 →CLOSE<br>· RMCV 58 →OPEN<br>· RSCV 63 →OPEN<br>· RCV 84 →CLOSE |
| 38 | | VALVE-CLOSED DEFECT | BBW | BBW | BBW | BBW | pMC | · RL LCV 88 →CLOSE<br>· RMCV 58 →CLOSE<br>· RSCV 63 →OPEN |

FIG.24

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 6 | RL LCV 96 | VALVE-OPEN DEFECT | ACTION ① SAME AS NORMAL PROCESS | | | | | |
| | | | ACTION ② BBW | BBW | BBW | NONE | pMC | · RL LCV 88 →CLOSE<br>· RMCV 58 →CLOSE<br>· RSCV 63 →CLOSE<br>· RCV 84 → OPEN |
| 40 | | VALVE-CLOSED DEFECT | BBW | BBW | BBW | BBW | pMC | · RL LCV 88 → CLOSE<br>· RMCV 58 →CLOSE<br>· RSCV 63 →OPEN |
| 10 | FR W/C PIPE | LEAK | NONE | BBW | BBW | BBW | pMC | · FR LCV 80 →CLOSE<br>· FR LCV 90 →CLOSE<br>· FMCV 50 →CLOSE<br>· FSCV 55 →CLOSE<br>· FCV 79 →OPEN |
| 12 | FL W/C PIPE | LEAK | BBW | NONE | BBW | BBW | pMC | · FL LCV 82 →CLOSE<br>· FL LCV 92 →CLOSE<br>· FMCV 50 →CLOSE<br>· FSCV 55 →CLOSE<br>· FCV 79 →OPEN |

FIG.25

| No. | MAL-FUNCTION POSITION | MAL-FUNCTION MODE | CONTROL METHOD | | | | BBW BASE PRESSURE | COUNTER-MEASURE PROCESS |
|---|---|---|---|---|---|---|---|---|
| | | | FR | FL | RR | RL | | |
| 3 | RR W/C PIPE | LEAK | BBW | BBW | NONE | BBW | pMC | · RR LCV 86 → CLOSE<br>· RR LCV 94 → CLOSE<br>· RMCV 58 →CLOSE<br>· RSCV 63 →CLOSE<br>· RCV 84 → OPEN |
| 5 | RL W/C PIPE | LEAK | BBW | BBW | BBW | NONE | pMC | · RL LCV 88 → CLOSE<br>· RL LCV 96 → CLOSE<br>· RMCV 58 →CLOSE<br>· RSCV 63 →CLOSE<br>· RCV 84 →OPEN |
| 47·48 | VALVE 26 | Pacc LEAK | SAME AS NORMAL PROCESS | | | | | |

HYDRAULIC BRAKE PRESSURE CONTROL SYSTEM

BACKGROUND OF THE INVENTION

1. Field of the Invention

The present invention generally relates to a hydraulic brake pressure control system, and more particularly to a hydraulic brake pressure control system which is appropriate to control brake fluid pressure in a hydraulic circuit of a brake system connected to wheels of an automotive vehicle.

2. Description of the Related Art

As disclosed in Japanese Laid-Open Patent Application No. 4-243658, there is known a hydraulic brake pressure control device in which a determination as to whether the hydraulic brake pressure control device is normally operating is made by comparison of a master cylinder pressure and a wheel cylinder pressure. When the hydraulic brake pressure control device of the above publication is normally operating, the wheel cylinder pressure related to a wheel cylinder of an automotive vehicle is adjusted to be proportional to the master cylinder pressure related to a master cylinder of the hydraulic brake pressure control device.

In the hydraulic brake pressure control device of the above publication, when the master cylinder pressure is detected to be above a given pressure and the wheel cylinder pressure is detected to be proportional to the master cylinder pressure, it is determined that the hydraulic brake pressure control device is normally operating.

On the other hand, when the master cylinder pressure is detected to be above the given pressure but the wheel cylinder pressure is detected to below a proper pressure level (or the wheel cylinder pressure does not properly rise in response to the master cylinder pressure), it is determined that a malfunction has occurred in the hydraulic brake pressure control device. Or when the master cylinder pressure is detected to be below the given pressure and the wheel cylinder pressure is detected to be above the proper pressure level, it is determined that a malfunction has occurred in the hydraulic brake pressure control device. By using the detection method of the hydraulic brake pressure control device of the above publication, it is possible to notify a vehicle operator of the occurrence of a malfunction in the hydraulic brake pressure control device.

Generally, in order to perform an effective countermeasure process in response to the occurrence of individual malfunctions in the hydraulic brake pressure control device, it is necessary to quickly find a position of each individual malfunction and a mode of each individual malfunction in the hydraulic brake pressure control device. Hereinafter, such information of each individual malfunction will be called the malfunction position/mode. However, the hydraulic brake pressure control device of the above publication does not detect the malfunction position/mode in the hydraulic brake pressure control device when the occurrence of the malfunction is detected. Hence, it is difficult for the hydraulic brake pressure control device of the above publication to perform an effective countermeasure process in response to the occurrence of individual malfunctions.

SUMMARY OF THE INVENTION

An object of the present invention is to provide an improved hydraulic brake pressure control system in which the above-described problems are eliminated.

Another object of the present invention is to provide a hydraulic brake pressure control system which is capable of detecting the malfunction position/mode of each individual malfunction when the occurrence of the malfunction is detected in the hydraulic brake pressure control system, in order to quickly perform an effective countermeasure process in response to the occurrence of the malfunction.

The above-mentioned object of the present invention is achieved by a hydraulic brake pressure control system in which a master cylinder which generates a brake fluid pressure proportional to a brake pedal pressure, a high-pressure supply device which generates an increased brake fluid pressure, and a hydraulic circuit having a wheel cylinder device are provided, the hydraulic circuit performing a master cylinder control to control a wheel cylinder pressure by using the pressure generated by the master cylinder, and performing a brake-by-wire control to control the wheel cylinder pressure by using the pressure generated by the high-pressure supply device, the hydraulic brake pressure control system comprising: a master cut valve device, provided in the hydraulic circuit, which controls a flow of brake fluid from the master cylinder into the wheel cylinder device; a wheel cylinder sensor device which outputs a signal indicative of the brake fluid pressure in the wheel cylinder device; and a malfunction position/mode detecting unit which detects a malfunction position and a malfunction mode in the hydraulic brake pressure control system based on the signal output by the wheel cylinder sensor device during the master cylinder control and the signal output by the wheel cylinder sensor device during the brake-by-wire control.

In the hydraulic brake pressure control system of the present invention, a malfunction position and a malfunction mode of each individual malfunction which may occur in the system are accurately detected based on the output signal of the wheel cylinder sensor device during the master cylinder control and the output signal of the wheel cylinder sensor device during the brake-by-wire control. It is possible for the hydraulic brake pressure control system of the present invention to quickly perform an effective countermeasure process in response to the occurrence of the malfunction.

In the hydraulic brake pressure control system of the present invention, a plurality of countermeasure processes for individual malfunctions are stored. A specific position and a specific mode of each individual malfunction which may occur in the hydraulic brake pressure control system are detected by the malfunction position/mode detecting unit, and it is possible to easily select the most effective countermeasure process for the malfunction of concern from the stored countermeasure processes. Hence, it is possible for the hydraulic brake pressure control system of the present invention to quickly perform an effective countermeasure process in response to the occurrence of each individual malfunction.

BRIEF DESCRIPTION OF THE DRAWINGS

The above and other objects, features and advantages of the present invention will become more apparent from the following detailed description when read in conjunction with the accompanying drawings in which:

FIG. 4 is a flowchart for explaining a second part of the malfunction/countermeasure determination control process;

FIG. 5 is a diagram for explaining a first part of a correlation between sensor outputs for individual malfunctions, judgment process to be performed and malfunction position/mode obtained as a result of the judgment process;

FIG. 6 is a diagram for explaining a second part of the correlation between the sensor outputs, the judgment process and the malfunction position/mode;

FIG. 7 is a diagram for explaining a third part of the correlation between the sensor outputs, the judgment process and the malfunction position/mode;

FIG. 16 is a diagram for explaining a first part of a correlation between malfunction position/mode and countermeasure process to be performed for each individual malfunction by the control unit of the hydraulic brake pressure control system of FIG. 1;

FIG. 17 is a diagram for explaining a second part of the correlation between the malfunction position/mode and the countermeasure process;

FIG. 18 is a diagram for explaining a third part of the correlation between the malfunction position/mode and the countermeasure process;

FIG. 19 is a diagram for explaining a fourth part of the correlation between the malfunction position/mode and the countermeasure process;

FIG. 20 is a diagram for explaining a fifth part of the correlation between the malfunction position/mode and the countermeasure process;

FIG. 21 is a diagram for explaining a sixth part of the correlation between the malfunction position/mode and the countermeasure process;

FIG. 22 is a diagram for explaining a seventh part of the correlation between the malfunction position/mode and the countermeasure process;

FIG. 23 is a diagram for explaining an eighth part of the correlation between the malfunction position/mode and the countermeasure process;

FIG. 24 is a diagram for explaining a ninth part of the correlation between the malfunction position/mode and the countermeasure process; and FIG. 25 is a diagram for explaining a tenth part of the correlation between the malfunction position/mode and the countermeasure process.

DESCRIPTION OF THE PREFERRED EMBODIMENTS

A description will now be given of the preferred embodiments of the present invention with reference to the accompanying drawings.

Figure 1:
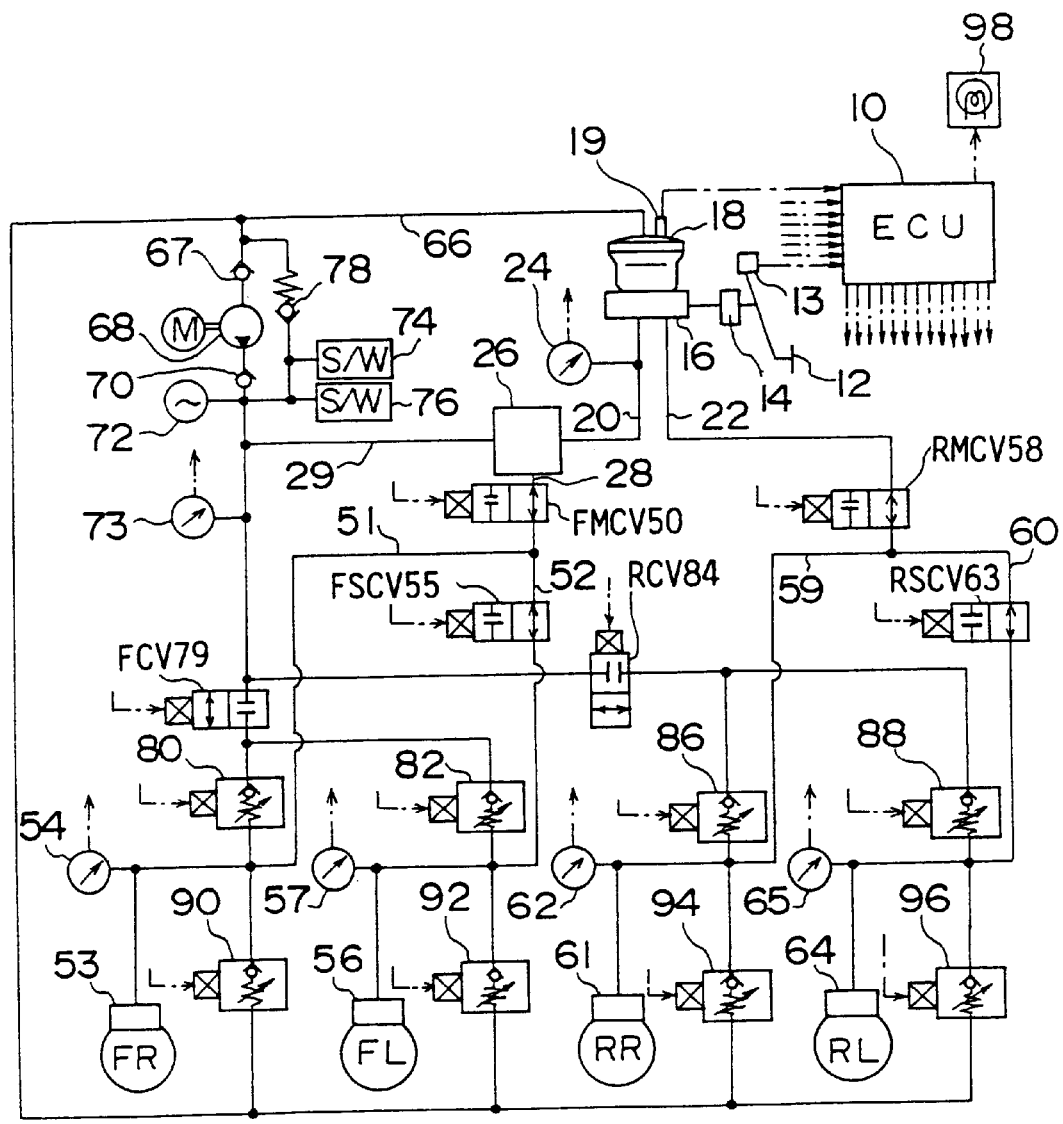
FIG. 1 is a block diagram of one embodiment of a hydraulic brake pressure control system of the present invention.

FIG. 1 shows one embodiment of a hydraulic brake pressure control system of the present invention. The hydraulic brake pressure control system is provided with an electronic control unit 10 (hereinafter called ECU 10). The ECU 10 controls the overall operation of the hydraulic brake pressure control system.

As shown in FIG. 1, the hydraulic brake pressure control system is provided with a brake pedal 12 of an automotive vehicle. A stop switch 13 is provided on the brake pedal 12. The stop switch 13 outputs an ON signal when the brake pedal 12 is depressed by a vehicle operator. The ON signal output by the stop switch 13 is supplied to the ECU 10. The ECU 10 detects whether the brake pedal 12 is depressed by the vehicle operator based on the ON signal from the stop switch 13. Similarly, the stop switch 13 outputs an OFF signal to the ECU 10 when the brake pedal 12 is released by the vehicle operator. The ECU 10 detects whether the brake pedal 12 is released by the vehicle operator based on the OFF signal from the stop switch 13.

The brake pedal 12 is connected to a master cylinder 16 via a stroke simulator 14. The stroke simulator 14 produces a stroke of the brake pedal 12 in response to a brake pedal pressure exerted on the brake pedal 12 by the vehicle operator. The master cylinder 16 is provided with two internal pressure chambers therein and generates a master cylinder pressure $P_{M/C}$ proportional to the brake pedal pressure exerted on the brake pedal 12.

A reservoir tank 18 is provided at an upper portion of the master cylinder 16. The reservoir tank 18 is filled with brake fluid. When the brake pedal 12 is released, the reservoir tank 18 is open to the internal pressure chambers of the master cylinder 16. A fluid sensor 19 is provided on the reservoir tank 18. The fluid sensor 19 outputs an electrical signal indicative of an amount QF of a remaining brake fluid in the reservoir tank 18. The output signal of the fluid sensor 19 is supplied to the ECU 10. The ECU 10 detects the amount QF of the remaining brake fluid in the reservoir tank 18 based on the output signal from the fluid sensor 19.

A first hydraulic path 20 and a second hydraulic path 22 are connected to the master cylinder 16. A master cylinder pressure sensor 24 (hereinafter called $P_{M/C}$ sensor 24) is connected to the first hydraulic path 20 to which the master cylinder pressure $P_{M/C}$ from the master cylinder 16 is supplied. That is, the $P_{M/C}$ sensor 24 is connected to the front-side one of the two internal pressure chambers of the master cylinder 16. The $P_{M/C}$ sensor 24 outputs a signal (hereinafter called output signal pMC) indicative of the master cylinder pressure $P_{M/C}$ of the first hydraulic path 20. The output signal pMC of the $P_{M/C}$ sensor 24 is supplied to the ECU 10. The ECU 10 detects the master cylinder pressure $P_{M/C}$ based on the output signal pMC of the $P_{M/C}$ sensor 24.

The first hydraulic path 20 is connected at the other end to a mechanical pressure-increase valve 26. Further, a front hydraulic path 28 and a high-pressure path 29 are connected to the mechanical pressure-increase valve 26. The mechanical pressure-increase valve 26 boosts a brake fluid pressure and supplies the boosted pressure into the front hydraulic path 28. An accumulator pressure Pacc that is higher than the master cylinder pressure $P_{M/C}$ is supplied through the high-pressure path 29 to the mechanical pressure-increase valve 26.

Figure 2:
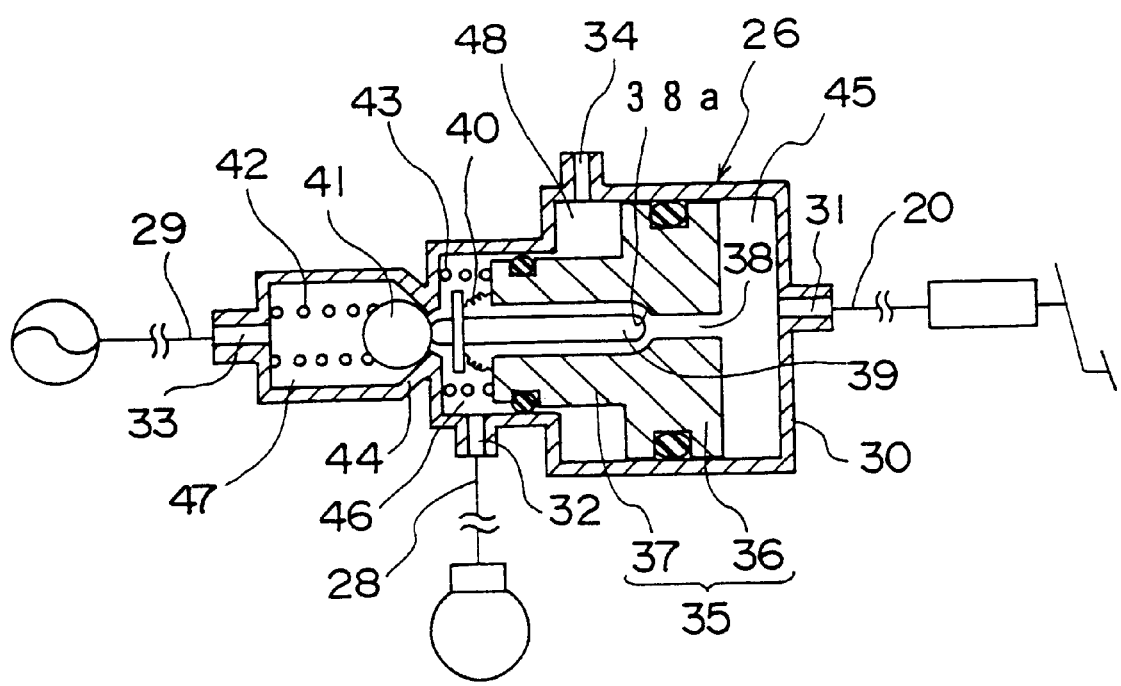
FIG. 2 is a cross-sectional view of a mechanical pressure-increase valve in the hydraulic brake pressure control system of FIG. 1.

FIG. 2 shows a mechanical pressure-increase valve 26 in the hydraulic brake pressure control system of FIG. 1. As shown in FIG. 2, the mechanical pressure-increase valve 26 is provided with a housing 30. In the housing 30, a master cylinder pressure port 31 connected to the first hydraulic path 20, a discharge port 32 connected to the front hydraulic path 28, a high-pressure port 33 connected to the high-pressure path 29, and an atmosphere port 34 connected to the atmosphere are formed.

A booster piston 35 is movably provided within the housing 30 of the mechanical pressure-increase valve 26. In the booster piston 35, a large-diameter portion 36 having a large cross-sectional area "S" and a small-diameter portion 37 having a small cross-sectional area "s" are formed. A through hole 38 extending along a central axis of the booster piston 35 is formed inside the booster piston 35. A needle valve 39 is placed into the through hole 38. A valve seat 38a which functions as a valve seat of the needle valve 39 is formed in the through hole 38. A first spring 40 is provided between the needle valve 39 and the booster piston 35. The first spring 40 exerts an actuating force on the needle valve 39 to separate the needle valve 39 from the valve seat 38a.

Further, in the mechanical pressure-increase valve 26, a ball valve 41, a second spring 42, and a third spring 43 are provided within the housing 30. A valve seat 44 which functions as a valve seat of the ball valve 41 is formed in the housing 30. The second spring 42 exerts an actuating force on the ball valve 41 to push the ball valve 41 toward the valve seat 44. The third spring 43 exerts an actuating force on the booster piston 35 to push the booster piston 35 toward the master cylinder pressure port 31. A through hole in which the needle valve 39 is passed is formed at the center of the valve seat 44.

In the housing 30 of the mechanical pressure-increase valve 26, a pressurizing chamber 45, a pressure adjusting chamber 46, a high-pressure chamber 47, and an atmosphere chamber 48 are formed by the booster piston 35 and the ball valve 41. The pressurizing chamber 45 is connected to the master cylinder 16 via the master cylinder pressure port 31. The pressure adjusting chamber 46 is connected to the front hydraulic path 28 via the discharge port 32. The high-pressure chamber 47 is connected to the high-pressure source via the high-pressure port 33. The atmosphere chamber 48 is connected to the atmosphere port 34.

Next, an operation of the mechanical pressure-increase valve 26 will be described with reference to FIG. 2.

When no master cylinder pressure $P_{M/C}$ is generated by the master cylinder 16, the mechanical pressure-increase valve 26 is maintained in an initial condition as shown in FIG. 2. In the initial condition, when the vehicle operator starts depressing the brake pedal 12, the brake fluid is supplied into the pressurizing chamber 45 from the master cylinder pressure port 31. The brake fluid in the pressurizing chamber 45 is supplied through the through hole 38 into the pressure adjusting chamber 46. Hence, after the brake pedal 12 is depressed, both the internal pressure of the pressurizing chamber 45 and the internal pressure of the pressure adjusting chamber 46 are increased to the master cylinder pressure $P_{M/C}$. When the master cylinder pressure $P_{M/C}$ is produced in both the pressurizing chamber 45 and the pressure adjusting chamber 46, an actuating force F, which is represented by the formula $F=S \cdot P_{M/C} - s \cdot P_{M/C}$ where S is the cross-sectional area of the large-diameter portion 36 and s is the cross-sectional area of the small-diameter portion 37, is exerted on the booster piston 35, and the actuating force F functions to push the booster piston 35 toward the pressure adjusting chamber 46. Consequently, the booster piston 35 starts moving toward the pressure adjusting chamber 46 relative to the housing 30 promptly after the brake pedal 12 is depressed.

When the booster piston 35 is moved toward the pressure adjusting chamber 46 exceeding a predetermined distance, the needle valve 39 abuts on the valve seat of the needle valve 39 to close the through hole 38. After the through hole 38 is closed by the needle valve 39, the actuating force F exerted on the booster piston 35 begins to be transmitted to the ball valve 41 through the needle valve 39. Hence, shortly after the movement of the booster piston 35 exceeds the predetermined distance, the ball valve 41 is separated from the valve seat 44 to open the through hole of the valve seat 44 by the actuating force F.

When the ball valve 41 is separated from the valve seat 44, the pressure adjusting chamber 46 is open to the high-pressure chamber 47. Hence, shortly after the ball valve 41 is set in the valve open state, the internal pressure of the pressure adjusting chamber 46 is higher than the master cylinder pressure $P_{M/C}$. Suppose that Pc denotes a brake fluid pressure produced in the pressure adjusting chamber 46 in such a condition. An actuating force F1 exerted on the booster piston 35 in such a condition is represented by the formula $F1 = S \cdot P_{M/C} - s \cdot Pc$. If the actuating force F1 is a positive value, or greater than zero, the booster piston 35 is kept to be moved in the valve open direction to further separate the ball valve 41 from the valve seat 44.

If the brake fluid pressure Pc of the pressure adjusting chamber 46 becomes adequately high, the actuating force F1 on the booster piston 35 is a negative value, or smaller than zero. The booster piston 35 starts being moved in the valve closing direction to bring the ball valve 41 into contact with the valve seat 44. When the ball valve 41 abuts on the valve seat 44, the pressure Pc of the pressure adjusting chamber 46 stops being increased.

In the mechanical pressure-increase valve 26 of FIG. 2, the above-described operation is repeatedly carried out after the brake pedal 12 is depressed by the vehicle operator. The mechanical pressure-increase valve 26 of FIG. 2 is configured such that the internal pressure of the pressure adjusting chamber 46 is controlled to a boosted pressure Pb after the above-described operation is performed. The boosted pressure Pb is represented by the formula $Pb = (S/s) \cdot P_{M/C}$. Hereinafter, the coefficient (S/s) of the formula is called the boost ratio S/s.

The mechanical pressure-increase valve 26 of FIG. 2 boosts the brake fluid pressure of the pressure adjusting chamber 46 in accordance with the formula $Pb = (S/s) \cdot P_{M/C}$, and supplies the boosted pressure Pb to the front hydraulic path 28 from the discharge port 32. As is apparent from the above-mentioned formula, the boosted pressure Pb supplied to the front hydraulic path 28 is equal to the master cylinder pressure $P_{M/C}$ multiplied by the boost ratio S/s.

According to the mechanical pressure-increase valve 26 of FIG. 2, when the brake pedal 12 is depressed, it is possible to supply the boosted pressure Pb into the front hydraulic path 28, the boosted pressure Pb being equal to the master cylinder pressure $P_{M/C}$ multiplied by the boost ratio S/s.

In the mechanical pressure-increase valve 26 of FIG. 2, when a proper accumulator pressure Pacc is not supplied into the high-pressure chamber 47 through the high-pressure path 29, only the second spring 42 exerts the actuating force on the ball valve 41 to push the ball valve 41 toward the valve seat 44. The actuating force on the ball valve 41 by the second spring 42 is preset to be smaller than the actuating force on the needle valve 39 by the first spring 40. In such a condition, when the booster piston 35 is moved toward the pressure adjusting chamber 46 after the brake pedal 12 is depressed by the operator, the needle valve 39 does not abut on the valve seat of the needle valve 39 to close the through hole 38, but the ball valve 41 is separated from the valve seat 44 to open the through hole of the valve seat 44. During the movement of the booster piston 35, the needle valve 39 is continuously set in the valve open state to open the through hole 38.

Accordingly, when the internal pressure of the high-pressure chamber 47 is not increased to a proper accumulator pressure Pacc, the internal pressure of the pressure adjusting chamber 46 is kept to be equal to the master cylinder pressure $P_{M/C}$ after the brake pedal 12 is depressed by the operator. According to the mechanical pressure-increase valve 26 of FIG. 2, after the brake pedal 12 is depressed, it is possible to supply the brake fluid pressure of the pressure adjusting chamber 46 into the front hydraulic path 28, the pressure of the pressure adjusting chamber 46 being equal to the master cylinder pressure $P_{M/C}$.

In the mechanical pressure-increase valve 26 of FIG. 2, when the master cylinder pressure $P_{M/C}$ is produced in the pressure adjusting chamber 46 in the above-described manner, the master cylinder pressure $P_{M/C}$ in the pressure adjusting chamber 46 is also supplied into the high-pressure path 29 through the high-pressure chamber 47.

In the hydraulic brake pressure control system of FIG. 1, the front hydraulic path 28 is connected at the other end to a front main cut valve 50 (hereinafter called FMCV 50). The FMCV 50 is a two-position solenoid valve which is set in a valve open state in an initial condition, and set in a valve closed state when a drive signal is supplied to the FMCV 50 by the ECU 10. Hereinafter, the condition in which the FMCV 50 is set in the valve open state with no drive signal supplied to the FMCV 50 is called the initial condition.

The FMCV 50 is connected at the other end to both a front right (FR) connecting path 51 (hereinafter called FR connecting path 51) and a front left connecting path 52 (hereinafter called FL connecting path 52). That is, the output of the FMCV 50 branches into the FR connecting path 51 and the FL connecting path 52.

The FR connecting path 51 is connected to a wheel cylinder 53, and the wheel cylinder 53 is provided in a front right (FR) wheel of the vehicle. An FR pressure sensor 54 is connected to an intermediate portion of the FR connecting path 51 adjacent to the wheel cylinder 53. The FR pressure sensor 54 outputs a signal (hereinafter called output signal pFR) indicative of a wheel cylinder pressure $P_{W/C}$ of the wheel cylinder 53. The output signal pFR of the FR pressure sensor 54 is supplied to the ECU 10. The ECU 10 detects the wheel cylinder pressure $P_{W/C}$ related to the FR wheel based on the output signal pFR of the FR pressure sensor 54.

The FL connecting path 52 is connected to a front sub-cut valve 55 (hereinafter called FSCV 55). The FSCV 55 is a two-position solenoid valve which is set in a valve open state in an initial condition, and set in a valve closed state when a drive signal is supplied to the FSCV 55 by the ECU 10. Hereinafter, the condition in which the FSCV 55 is set in the valve open state with no drive signal supplied to the FSCV 55 is called the initial condition.

The FSCV 55 is connected to a wheel cylinder 56, and the wheel cylinder 56 is provided in a front left (FL) wheel of the vehicle. An FL pressure sensor 57 is connected to an intermediate portion of the FL connecting path 52 adjacent to the wheel cylinder 56. The FL pressure sensor 57 outputs a signal (hereinafter called output signal pFL) indicative of a wheel cylinder pressure $P_{W/C}$ of the wheel cylinder 56. The output signal pFL of the FL pressure sensor 57 is supplied to the ECU 10. The ECU 10 detects the wheel cylinder pressure $P_{W/C}$ related to the FL wheel based on the output signal pFL of the FL pressure sensor 57.

The second hydraulic path 22 extending from the master cylinder 16 is connected to a rear main cut valve 58 (hereinafter called RMCV 58). The RMCV 58 is a two-position solenoid valve which is set in a valve open state in an initial condition, and set in a valve closed state when a drive signal is supplied to the RMCV 58 by the ECU 10. Hereinafter, the condition in which the RMCV 58 is set in the valve open state with no drive signal supplied to the RMCV 58 is called the initial condition.

The RMCV 58 is connected at the other end to both a rear right connecting path 59 (hereinafter called RR connecting path 59) and a rear left connecting path 60 (hereinafter called RL connecting path 60). That is, the output of the RMCV 58 branches into the RR connecting path 59 and the RL connecting path 60.

The RR connecting path 59 is connected to a wheel cylinder 61, and the wheel cylinder 61 is provided in a rear right (RR) wheel of the vehicle. An RR pressure sensor 62 is connected to an intermediate portion of the RR connecting path 59 adjacent to the wheel cylinder 61. The RR pressure sensor 62 outputs a signal (hereinafter called output signal pRR) indicative of a wheel cylinder pressure $P_{W/C}$ of the wheel cylinder 61. The output signal pRR of the RR pressure sensor 62 is supplied to the ECU 10. The ECU 10 detects the wheel cylinder pressure $P_{W/C}$ related to the RR wheel based on the output signal pRR of the RR pressure sensor 62.

The RL connecting path 60 is connected to a rear sub-cut valve 63 (hereinafter called RSCV 63). The RSCV 63 is a two-position solenoid valve which is set in a valve open state in an initial condition, and set in a valve closed state when a drive signal is supplied to the RSCV 63 by the ECU 10. Hereinafter, the condition in which the RSCV 63 is set in the valve open state with no drive signal supplied to the RSCV 63 is called the initial condition.

The RSCV 63 is connected to a wheel cylinder 64, and the wheel cylinder 64 is provided in a rear left (RL) wheel of the vehicle. An RL pressure sensor 65 is connected to an intermediate portion of the RL connecting path 60 adjacent to the wheel cylinder 64. The RL pressure sensor 65 outputs a signal (hereinafter called output signal pRL) indicative of a wheel cylinder pressure $P_{W/C}$ of the wheel cylinder 64. The output signal pRL of the RL pressure sensor 65 is supplied to the ECU 10. The ECU 10 detects the wheel cylinder pressure $P_{W/C}$ related to the RL wheel based on the output signal pRL of the RL pressure sensor 64.

The hydraulic brake pressure control system of FIG. 1 includes a reservoir path 66, and the reservoir path 66 is connected to the reservoir tank 18. The hydraulic brake pressure control system of FIG. 1 includes a pump unit 68 and an accumulator 72. The pump unit 68 and the accumulator 72 serve as a high-pressure supply device in the hydraulic brake pressure control system. The pump unit 68 has an actuating motor, an inlet port and an outlet port. The inlet port of the pump unit 68 is connected through a check valve 67 to the reservoir path 66. The output port of the pump unit 68 is connected through a check valve 70 to the high-pressure path 29.

The accumulator 72 is connected to the high-pressure path 29 in which the mechanical pressure-increase valve 26 is provided. The accumulator 72 functions to store the accumulator pressure Pacc of the brake fluid discharged by the pump unit 68. An accumulator pressure sensor 73 (hereinafter called Pacc sensor 73) is connected to the high-pressure path 29 adjacent to the accumulator 72. The Pacc sensor 73 outputs a signal (hereinafter called output signal pACC) indicative of the accumulator pressure Pacc in the high-pressure path 29. The output signal pACC of the Pacc sensor 73 is supplied to the ECU 10. The ECU 10 detects the accumulator pressure Pacc in the high-pressure path 29 based on the output signal pACC of the PACC sensor 73.

Further, an upper limit switch 74 (hereinafter called ULSW 74) and a lower limit switch 76 (hereinafter called LLSW 76) are connected to the high-pressure path 29. The ULSW 74 outputs an ON signal when the accumulator pressure Pacc in the high-pressure path 29 is above a given upper limit pressure. The LLSW 76 outputs an ON signal when the accumulator pressure Pacc in the high-pressure path 29 is less than a given lower limit pressure. The output signal of the ULSW 74 and the output signal of the LLSW 76 are supplied to the ECU 10. During the time when the ON signal from the LLSW 76 is supplied to the ECU 10, the ECU 10 supplies a drive signal to the actuating motor of the pump unit 68 so as to increase the accumulator pressure Pacc in the high-pressure path 29. During the time when the ON signal from the ULSW 74 is supplied to the ECU 10, the ECU 10 stops supplying the drive signal to the actuating motor of the pump unit 68 so as to decrease the accumulator pressure Pacc in the high-pressure path 29. According to this processing, the accumulator pressure Pacc in the high-pressure path 29 is maintained to be within the range between the lower limit pressure and the upper limit pressure by the ECU 10, the pump unit 68, the LLSW 76 and the ULSW 74.

A constant-pressure valve 78 is provided between the high-pressure path 29 and the reservoir path 66. The constant-pressure valve 78 is a one-way valve which allows the flow of brake fluid in the direction from the high-pressure path 29 to the reservoir path 66 only when the difference in the pressure between the high-pressure path 29 and the reservoir path 66 exceeds a valve-opening pressure of the constant-pressure valve 78. The constant-pressure valve 78 always inhibits the flow of brake fluid in the opposite direction from the reservoir path 66 to the high-pressure path 29.

Further, in the hydraulic brake control device of FIG. 1, an FR pressure-raising linear control valve 80 (hereinafter called LCV 80) and an FL pressure-raising linear control valve 82 (hereinafter called LCV 82) are connected in parallel to the high-pressure path 29 via a front increased-pressure cut valve 79 (hereinafter called FCV 79). The FCV 79 is a two-position solenoid valve which is set in a valve closed state in an initial condition, and set in a valve open state when a drive signal is supplied to the FCV 79 by the ECU 10. Hereinafter, the condition in which the FCV 79 is set in the valve closed state with no drive signal supplied to the FCV 79 is called the initial condition of the FCV 79. The LCV 80 is connected at the other end to the FR connecting path 51. The LCV 82 is connected at the other end to the FL connecting path 52.

Further, in the hydraulic brake pressure control system of FIG. 1, an RR pressure-raising linear control valve 86 (hereinafter called LCV 86) and an RL pressure-raising linear control valve 88 (hereinafter called LCV 88) are connected in parallel to the high-pressure path 29 via a rear increased-pressure cut valve 84 (hereinafter called RCV 84). The RCV 84 is a two-position solenoid valve which is set in a valve closed state in an initial condition, and set in a valve open state when a drive signal is supplied to the RCV 84 by the ECU 10. Hereinafter, the condition in which the RCV 84 is set in the valve closed state with no drive signal supplied to the RCV 84 is called the initial condition of the RCV 84. The LCV 86 is connected at the other end to the RR connecting path 59. The LCV 88 is connected at the other end to the RL connecting path 60.

The above-mentioned LCV 80, 82, 86, and 88 are the pressure-raising linear control valves. Each of the above-mentioned LCV 80, 82, 86 and 88 is set in a valve closed state in an initial condition. In the initial condition, each of the LCV 80, 82, 86 and 88 is set in the valve closed state with no drive signal supplied to the LCV by the ECU 10. In the initial condition, the flow of the brake fluid from the high-pressure path 29 into a corresponding one of the FR connecting path 51, the FL connecting path 52, the RR connecting path 59 and the RL connecting path 60 is inhibited or closed off.

Each of the above-mentioned LCV 80, 82, 86 and 88 is set in a valve open state when a drive signal is supplied to the LCV by the ECU 10, such that the brake fluid in the high-pressure path 29 is supplied, at a flow rate proportional to the drive signal, into a corresponding one of the FR connecting path 51, the FL connecting path 52, the RR connecting path 59 and the RL connecting path 60. In the valve open state, by allowing the flow of the brake fluid into a corresponding one of the wheel cylinders 53, 56, 61 and 64 in such a manner, each of the above-mentioned LCV 80, 82, 86 and 88 functions to maintain the wheel cylinder pressure of the corresponding wheel cylinder at a controlled level in response to the drive signal from the ECU 10.

Further, in the hydraulic brake pressure control system of FIG. 1, the FR connecting path 51, the FL connecting path 52, the RR connecting path 59 and the RL connecting path 60 are connected to the reservoir path 66 through an FR pressure-reducing linear control valve 90 (hereinafter called LCV 90), an FL pressure-reducing linear control valve 92 (hereinafter called LCV 92), an RR pressure-reducing linear control valve 94 (hereinafter called LCV 94) and an RL pressure-reducing linear control valve 96 (hereinafter called LCV 96), respectively. As described above, the reservoir path 66 is connected to the reservoir tank 18.

The above-mentioned LCV 90, 92, 94 and 96 are the pressure-reducing linear control valves. Each of the above-mentioned LCV 90, 92, 94 and 96 is set in a valve closed state in an initial condition when no drive signal is supplied to the LCV by the ECU 10. In the initial condition, each of the LCV 90, 92, 94 and 96 is set in the valve closed state. In the initial condition, the flow of the brake fluid from a corresponding one of the FR connecting path 51, the FL connecting path 52, the RR connecting path 59 and the RL connecting path 60 into the reservoir path 66 is inhibited or closed off.

Each of the above-mentioned LCV 90, 92, 94 and 96 is set in a valve open state when a drive signal is supplied to the LCV by the ECU 10, such that the brake fluid from a corresponding one of the FR connecting path 51, the FL connecting path 52, the RR connecting path 59 and the RL connecting path 60 is supplied, at a flow rate proportional to the drive signal, into the reservoir path 66. In the valve open state, by allowing the flow of the brake fluid from a corresponding one of the wheel cylinders 53, 56, 61 and 64 into the reservoir tank 18 in such a manner, each of the above-mentioned LCV 90, 92, 94 and 96 functions to reduce the wheel cylinder pressure of the corresponding wheel cylinder in response to the drive signal supplied by the ECU 10.

The hydraulic brake pressure control system of FIG. 1 is provided with a warning lamp 98. The warning lamp 98 is connected to an output of the ECU 10. When occurrence of a malfunction in the hydraulic brake pressure control system of FIG. 1 is detected by the ECU 10, the ECU 10 turns ON the warning lamp 98. Hence, the warning lamp 98 functions to notify the vehicle operator of the occurrence of the malfunction in the hydraulic brake pressure control system.

Next, an operation of the hydraulic brake pressure control system of the present embodiment will be described.

In the hydraulic brake pressure control system of FIG. 1, when no drive signal is supplied to the solenoid valves 50, 55, 58, 63, 79 and 84 by the ECU 10, all the solenoid valves 50, 55, 58, 63, 79 and 84 are set in the initial conditions. The mechanical pressure-increase valve 26 is open to the wheel cylinders 53 and 56 through the front hydraulic path 28, and the master cylinder 16 is open to the wheel cylinders 61 and 64 through the connecting paths 59 and 60. The condition of the hydraulic brake pressure control system in which all the above-mentioned solenoid valves are in the initial conditions is illustrated in FIG. 1. As described above, when all the solenoid valves are in the initial conditions, the solenoid valves 50, 55, 58 and 63 are set in the valve open state and the solenoid valves 79 and 84 are set in the valve closed state. The accumulator 72 is separated or cut off from the wheel cylinders 53, 56, 61 and 64 by the solenoid valves 79 and 84. Therefore, in such a condition, the mechanical pressure-increase valve 26 and the master cylinder 16 can supply the boosted pressure Pb into the FR wheel cylinder 53 and the FL wheel cylinder 56 through the front hydraulic path 28, the boosted pressure Pb being equal to the master cylinder pressure $P_{M/C}$ multiplied by the boost ratio S/s. At the same time, the master cylinder pressure $P_{M/C}$ from the master cylinder 16 can be supplied to the RR wheel cylinder 61 and the RL wheel cylinder 64 through the RR connecting path 59 and the RL connecting path 60, respectively.

In the above-described condition, the mechanical pressure-increase valve 26 mechanically produces the boosted pressure Pb in the pressure adjusting chamber 46 without performing the electrical brake control, the boosted pressure Pb being equal to the master cylinder pressure $P_{M/C}$ multiplied by the boost ratio S/s. It is possible for the hydraulic brake pressure control system of the present embodiment to control the wheel cylinder pressure of the wheel cylinders 53, 57, 61 and 64 based on the master cylinder pressure $P_{M/C}$ from the master cylinder 16 without performing the electrical brake control.

Hereinafter, the above-described control of the hydraulic brake pressure control system of FIG. 1 for the wheel cylinder pressure of the wheel cylinders 53, 57, 61 and 64 is called the M/C control method. Also, hereinafter, the detection of the pressures of the wheel cylinders 53, 56, 61 and 64 by the ECU 10 based on the output signals of the pressure sensors 54, 57, 62 and 65 when the solenoid valves 50, 55, 58, 63, 79 and 84 are set in the initial conditions as described above is called the M/C control check. On the other hand, in the hydraulic brake pressure control system of FIG. 1, when a drive signal is supplied to each of the solenoid valves 50, 55, 58, 63, 79 and 84 by the ECU 10, the accumulator 72 is connected to the LCV 80, 82, 86 and 88. The mechanical pressure-increase valve 26 is cut off from the wheel cylinders 53 and 56, and the master cylinder 16 is cut off from the wheel cylinders 61 and 64. As described above, when the drive signal is supplied to each of the above-mentioned solenoid valves, the solenoid valves 50, 55, 58 and 63 are set in the valve closed state and the solenoid valves 79 and 84 are set in the valve open state. In such a condition, the accumulator pressure Pacc from the accumulator 72 is supplied into the LCV 80, 82, 86 and 88.

In the above-described condition, the pressure-raising linear control valves (LCV) 80, 82, 86 and 88 and the pressure-reducing linear control valves (LCV) 90, 92, 94 and 96 are electrically controlled by the ECU 10 such that the output signals pFR, pFL, pRR and pRL of the pressure sensors 54, 57, 62 and 65 match with a target wheel cylinder pressure for each of the wheel cylinders 53, 56, 61 and 64. The ECU 10 calculates the target wheel cylinder pressure for each of the wheel cylinders based-on a braking request sent to the hydraulic brake pressure control system of FIG. 1 by the automotive vehicle (for example, a vehicle attitude control system). This electrical brake control is known as brake-by-wire (BBW) control.

Hereinafter, this electrical brake control of the hydraulic brake pressure control system of FIG. 1 for the wheel cylinder pressure of the wheel cylinders 53, 57, 61 and 64 is called the BBW control method. Also, hereinafter, the detection of the pressures of the wheel cylinders 53, 56, 61 and 64 by the ECU 10 based on the output signals of the pressure sensors 54, 57, 62 and 65 when the solenoid valves 50, 55, 58, 63, 79 and 84 are set in the above-described conditions is called the BBW control check. According to the BBW control method, it is possible for the hydraulic brake pressure control system of FIG. 1 to control the wheel cylinder pressure of the wheel cylinders 53, 56, 61 and 64 based on the accumulator pressure Pacc supplied by the accumulator 72 without using the mechanical pressure-increase valve 26 or the master cylinder 16.

When a braking request supplied to the hydraulic brake pressure control system of FIG. 1 is produced in response to the braking operation of the vehicle operator, it is necessary to control the wheel cylinder pressure of the wheel cylinders 53, 56, 61 and 64 to an appropriate brake fluid pressure in response to the brake pedal pressure exerted by the vehicle operator. In the hydraulic brake pressure control system of FIG. 1, the $P_{M/C}$ sensor 24 outputs the signal pMC, indicative of the master cylinder pressure $P_{M/C}$ of the first hydraulic path 20, to the ECU 10 even when the drive signal is supplied to each of the solenoid valves 50, 55, 58, 63, 79 and 84. The ECU 10 detects the master cylinder pressure $P_{M/C}$ based on the output signal pMC of the $P_{M/C}$ sensor 24. Hence, the ECU 10 can calculate a target wheel cylinder pressure for each of the wheel cylinders 53, 56, 61 and 64 based on the output signal pMC of the $P_{M/C}$ sensor 24. It is possible for the hydraulic brake pressure control system of FIG. 1 to electrically control the pressure-raising linear control valves 80, 82, 86 and 88 and the pressure-reducing linear control valves 90, 92, 94 and 96 by means of the ECU 10, such that the output signals pFR, pFL, pRR and pRL of the pressure sensors 54, 57, 62 and 65 match with the target wheel cylinder pressure for each of the wheel cylinders 53, 56, 61 and 64. Therefore, by performing the BBW control method, it is possible to control the wheel cylinder pressure of the wheel cylinders 53, 56, 61 and 64 to an appropriate brake fluid pressure in response to the brake pedal pressure exerted by the vehicle operator.

As described above, by supplying the drive signal to each of the solenoid valves 50, 55, 58, 63, 79 and 84 and performing the BBW control method, it is possible for the hydraulic brake pressure control system of FIG. 1 to suitably control the wheel cylinder pressure of the wheel cylinders 53, 56, 61 and 64 based on the accumulator pressure Pacc supplied by the accumulator 72 without using the mechanical pressure-increase valve 26 or the master cylinder 16. In the case of the BBW control method, the pump unit 68 and the accumulator 72 are used as the high-pressure supply device in the hydraulic brake pressure control system of FIG. 1.

When the hydraulic brake pressure control system of FIG. 1 is operating normally, the control of the wheel cylinder pressure of the wheel cylinders 53, 56, 61 and 64 is carried out by the above-described BBW control method. When a malfunction has occurred in the hydraulic brake pressure control system of FIG. 1, the control of the wheel cylinder pressure of the wheel cylinders 53, 56, 61 and 64 is carried out by the ECU 10 by utilizing the M/C control check and the BBW control check in combination. More specifically, the hydraulic brake pressure control system of FIG. 1 is characterized in that, when each individual malfunction has occurred, the ECU 10 detects a specific position and a specific mode of each individual malfunction (or the malfunction position/mode) in the hydraulic brake pressure control system based on results of the detection of the pressures of the wheel cylinders 53, 56, 61 and 64, and performs the most effective countermeasure process in accordance with the determined malfunction position/mode in response to the occurrence of each individual malfunction. The above-mentioned features of the hydraulic brake pressure control system of FIG. 1 will be described in the following.

Figure 3:
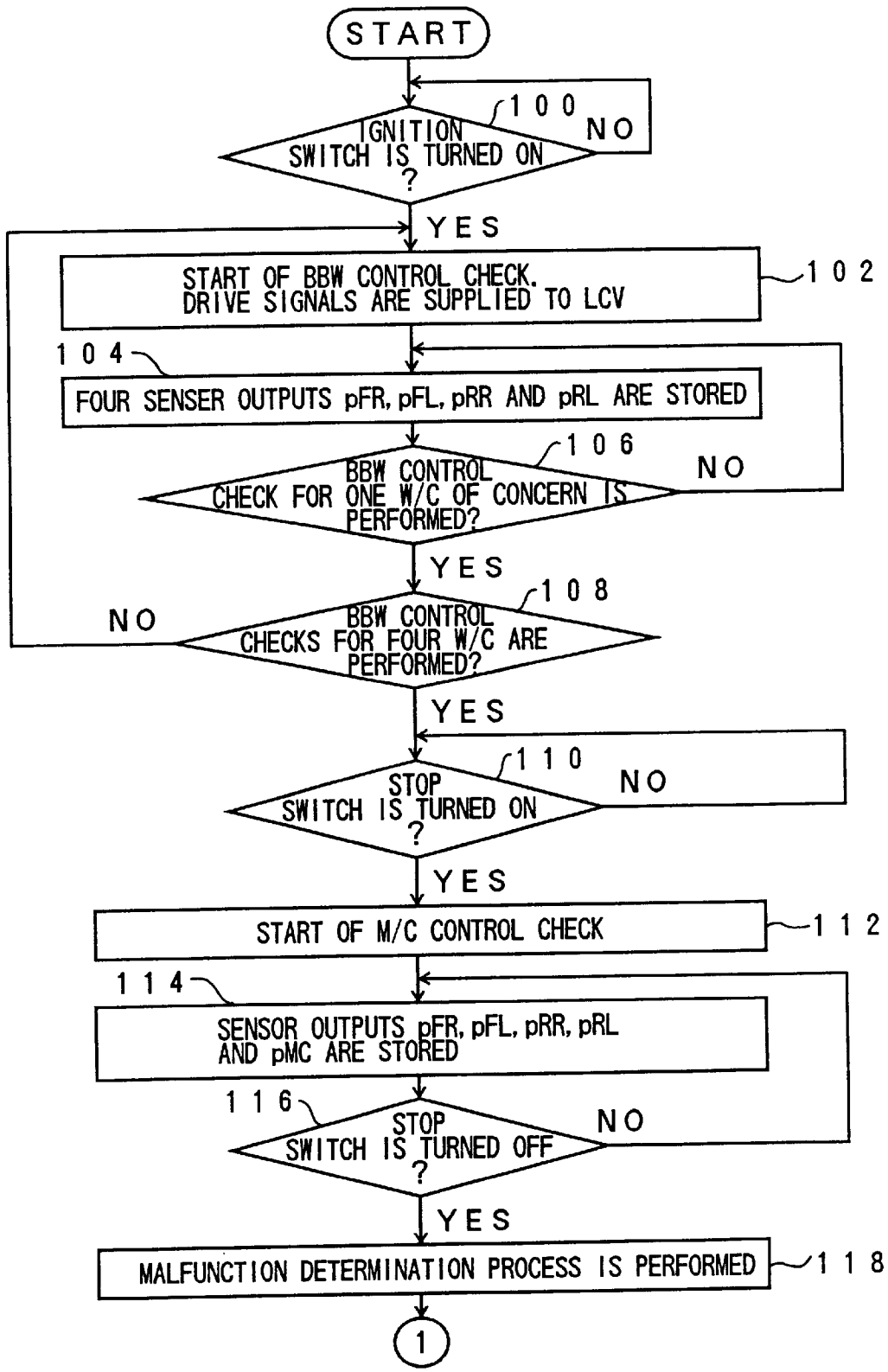
FIG. 3 is a flowchart for explaining a first part of a malfunction/countermeasure determination control process performed by a control unit of the hydraulic brake pressure control system of FIG. 1.

FIG. 3 and FIG. 4 show a malfunction/countermeasure determination control process performed by the ECU 10 of the hydraulic brake pressure control system of FIG. 1. FIG. 3 is a flowchart for explaining a first part of the malfunction/countermeasure determination control process performed by the ECU 10, and FIG. 4 is a flowchart for explaining a second part of the malfunction/countermeasure determination control process.

The performance of the malfunction/countermeasure determination control process of FIG. 3 and FIG. 4 enables the ECU 10 to make a determination as to whether a malfunction has occurred in the hydraulic brake pressure control system of FIG. 1. At the same time, it enables the ECU 10 to determine an optimal countermeasure process for the malfunction as a result of determination of the malfunction position/mode for the malfunction in the hydraulic brake pressure control system. The malfunction/countermeasure determination control process of FIG. 3 and FIG. 4 is repeatedly initiated by the ECU 10 every time the process ends.

When the malfunction/countermeasure determination control process of FIG. 3 and FIG. 4 is started, as shown in FIG. 3, the ECU 10 at step 100 detects whether an ignition switch (not shown) of the automotive vehicle on which the hydraulic brake pressure control system of FIG. 1 is installed is turned ON by the vehicle operator. The step 100 is repeated by the ECU 10 until the result of the detection is affirmative.

When the result at the step 100 is affirmative, the ECU 10 at step 102 starts the BBW control check for one of the four wheel cylinders 53, 56, 61 and 64 of concern. That is, a specific one of the four wheel cylinders 53, 56, 61 and 64 is first selected for the execution of the step 102 at the current cycle, and the remaining ones will be sequentially selected at subsequent cycles.

At the start of the BBW control check, the ECU 10 supplies the drive signal to each of the solenoid valves 50, 55, 58, 63, 79 and 84, so that the solenoid valves 50, 55, 58 and 63 are set in the valve closed state and the solenoid valves 79 and 84 are set in the valve open state. During an execution time of the BBW control check, the ECU 10 supplies given drive signals to the pressure-raising LCV (or the related one of the LCV 80, 82, 86 and 88) and the pressure-reducing LCV (or the related one of the LCV 90, 92, 94 and 96) for one of the four wheel cylinders of concern, so that the accumulator pressure Pacc from the accumulator 72 is supplied into the related pressure-raising LCV, and the related pressure-raising LCV and the related pressure-reducing LCV are electrically controlled by the ECU 10 such that the related one of the output signals pFR, pFL, pRR and pRL of the pressure sensors 54, 57, 62 and 65 matches with a predetermined target wheel cylinder pressure.

During the execution time of the BBW control check at the step 102, the ECU 10 at step 104 stores the four output signals pFR, pFL, pRR and pRL output by the pressure sensors 54, 57, 62 and 65 (corresponding to the internal pressures of the wheel cylinders 53, 56, 61 and 64) in a memory of the ECU 10 for the related one of the four wheel cylinders. Alternatively, in the step 104, only the two output signals from the related ones (either the front-side pressure sensors 54 and 57 or the rear-side pressure sensors 62 and 65) of the four pressure sensors 54, 57, 62 and 65 may be stored in the memory of the ECU 10.

At the end of the BBW control check, the ECU 10 at step 106 detects whether the BBW control check (including the step 104) for the related one of the wheel cylinders 53, 56, 61 and 64 is already performed. When the result at the step 106 is negative, the ECU 10 again performs the step 104 so that the four output signals pFR, pFL, pRR and pRL output by the pressure sensors 54, 57, 62 and 65 are stored in the memory for the related one of the four wheel cylinders.

When the result at the step 106 is affirmative, the ECU 10 at step 108 detects whether the BBW control checks for all the four wheel cylinders 53, 56, 61 and 64 are already performed upon the occurrence of the ON state of the ignition switch. When the BBW control checks for all the four wheel cylinders are not yet performed, the ECU 10 again performs the above steps 102–106 for the new one of the four wheel cylinders until the result at the step 108 is affirmative. The BBW control checks for the four wheel cylinders 53, 56, 61 and 64 are sequentially performed by repeating the steps 102–106 in a predetermined order of the wheel cylinders 53, 56, 61 and 64.

Accordingly, when the result at the step 108 is affirmative, the BBW control check is performed once for each of the four wheel cylinders, and the pattern of the BBW check sensor outputs pFR, pFL, pRR and pRL (indicating the wheel cylinder pressures) during the BBW control check is stored in the memory of the ECU 10 for each of the four wheel cylinders.

After the above steps 100–108 are performed, the ECU 10 at step 110 detects whether an ON signal output by the stop switch 13 of the brake pedal 12 is detected. As described above, when the brake pedal 12 is depressed by the vehicle operator, the stop switch 13 outputs the ON signal to the ECU 10. The step 110 is repeated by the ECU 10 until the result of the detection is affirmative.

When the result at the step 110 is affirmative, the ECU 10 at step 112 starts the M/C control check. As described above, at the start of the M/C control check, the ECU 10 sets the solenoid valves 50, 55, 58, 63, 79 and 84 in the initial conditions, so that the solenoid valves 50, 55, 58 and 63 are set in the valve open state and the solenoid valves 79 and 84 are set in the valve closed state. The mechanical pressure-increase valve 26 is open to the wheel cylinders 53 and 56 through the front hydraulic path 28, and the master cylinder 16 is open to the wheel cylinders 61 and 64 through the connecting paths 59 and 60. In this condition (as shown in FIG. 1), the accumulator 72 is separated or cut off from the wheel cylinders 53, 56, 61 and 64 by the solenoid valves 79 and 84. The mechanical pressure-increase valve 26 and the master cylinder 16 can supply the boosted pressure Pb into the wheel cylinders 53 and 56 through the front hydraulic path 28, the boosted pressure Pb being equal to the master cylinder pressure $P_{M/C}$ multiplied by the boost ratio S/s. At the same time, the master cylinder pressure $P_{M/C}$ from the master cylinder 16 can be supplied to the wheel cylinders 61 and 64 through the connecting paths 59 and 60.

During the execution time of the M/C control check at the step 112, the ECU 10 at step 114 stores the four output signals pFR, pFL, pRR and pRL from the pressure sensors 54, 57, 62 and 65 (corresponding to the internal pressures of the wheel cylinders 53, 56, 61 and 64) and the output signal pMC from the pressure sensor 24 (corresponding to the internal pressure of the master cylinder 16) in the memory of the ECU 10.

At the end of the M/C control check, the ECU 10 at step 116 detects whether an OFF signal output by the stop switch 13 is detected. As described above, when the brake pedal 12 is released by the vehicle operator, the stop switch 13 outputs the OFF signal to the ECU 10. The step 116 is repeated by the ECU 10 until the result of the detection is affirmative. When the result at the step 116 is negative, the ECU 10 again repeats the above step 114 to store the pattern of the M/C check sensor outputs pFR, pFL, pRR, pRL and pMC during the execution time of the M/C control check in the memory of the ECU 10.

Accordingly, when the result at the step 116 is affirmative, the brake pedal 12 is first depressed since the end of the BBW control check, and then the brake pedal 12 is released. The pattern of the M/C check sensor outputs, stored in the memory at the end of the step 116, includes the sensor output pMC (indicating the master cylinder pressure at such a timing) and the sensor outputs pFR, pFL, pRR and pRL (indicating the wheel cylinder pressures during the execution time of the M/C control check).

After the step 116 is performed, the ECU 10 at step 118 performs a malfunction determination process. During the malfunction determination process, the ECU 10 makes a determination as to whether a malfunction has occurred in the hydraulic brake pressure control system of FIG. 1, based on the detected pattern of the BBW check sensor outputs (pFR, pFL, pRR and pRL) and the M/C check sensor outputs (pMC, pFR, pFL, pRR and pRL) obtained at the steps 104 and 114. The malfunction determination process of the step 118 will be described later.

After the step 118 is performed, as shown in FIG. 4, the ECU 10 at step S120 makes a determination as to whether the occurrence of a malfunction in the hydraulic brake pressure control system of FIG. 1 is detected by the step 118.

In the malfunction/countermeasure determination control process of the present embodiment, individual malfunctions which may occur in the hydraulic brake pressure control system of FIG. 1 are classified into the following types:

Type 1: malfunctions whose occurrence is detected by the malfunction determination process of the step 118, and a malfunction position and a malfunction mode of each of the malfunctions of this type are properly detected by the malfunction determination process of the step 118.

Type 2: malfunctions whose occurrence is detected by the malfunction determination process of the step 118, but a malfunction position and a malfunction mode of each of the malfunctions of this type are properly detected by one of judgment processes other than the malfunction determination process of the step 118.

Type 3: malfunctions whose occurrence is not properly detected by the malfunction determination process of the step 118, and a malfunction position and a malfunction mode of each of the malfunctions of this type are properly detected by a set of other judgment processes different from the malfunction determination process of the step 118 and the type-2 judgment processes.

As shown in FIG. 4, when the occurrence of a malfunction which belongs to the type 1 or the type 2 is detected by the malfunction determination process of the step 118, the result at the step 120 is affirmative. Then the ECU 10 at step 122 makes a determination as to whether a malfunction position and a malfunction mode of the malfunction of concern are properly detected by the step 118.

In other words, the ECU 10 at the step 122 detects whether the malfunction whose occurrence is detected by the step 118 belongs to the type 1 or the type 2. When the malfunction whose occurrence is detected by the step 118 belongs to the type 1, the result at the step 122 is affirmative. In this case, the ECU 10 proceeds to the next step 124. When the malfunction whose occurrence is detected by the step 118 belongs to the type 2, the result at the step 122 is negative. In this case, the ECU 10 proceeds to the next step 128.

When the result at the step 122 is affirmative, the ECU 10 at step 124 turns ON the warning lamp 98, in order to notify the vehicle operator of the occurrence of the malfunction in the hydraulic brake pressure control system of FIG. 1. In this case, the occurrence of the malfunction of concern and the malfunction and mode of the malfunction of concern have been detected by the malfunction determination process of the step 118.

After the step 124 is performed, the ECU 10 at step 126 performs a countermeasure process in response to the occurrence of the malfunction of concern. In the ECU 10 of the present embodiment, a plurality of countermeasure processes for individual malfunctions which may occur in the hydraulic brake pressure control system of FIG. 1 are pre-recorded or stored in the memory of the ECU 10. At the start of the step 126, the ECU 10 selects one of the stored countermeasure processes for the malfunction of concern whose position and mode are detected by the preceding step, and performs the selected countermeasure process in response to the occurrence of the malfunction of concern. The plurality of countermeasure processes for individual malfunctions, stored in the memory of the ECU 10 of the present embodiment, will be described later.

After the step 126 is performed, the malfunction/countermeasure determination control process of FIG. 3 and FIG. 4 ends. The ECU 10 of the present embodiment continuously performs the countermeasure process of the step 126 until the ignition switch is turned OFF by the vehicle operator.

As shown in FIG. 4, when the malfunction whose occurrence is detected by the step 118 belongs to the type 2 (not the type 1), the result at the step 122 is negative. The ECU 10 proceeds to the next step 128. At the start of the step 128, the detected pattern of the BBW check sensor outputs and the M/C check sensor outputs as the result of the malfunction determination process of the step 118 matches with one of a plurality of stored patterns of the sensor outputs (related to the type 2) for a plurality of judgment processes which are pre-recorded or stored in the memory of the ECU 10. The ECU 10 at the step 128 selects a corresponding judgment process of the stored judgment processes for the result of the malfunction determination process of the step 118, and performs the selected judgment process in order to detect a malfunction position and a malfunction mode of the type-2 malfunction of concern. The judgment process performed at the step 128 by the ECU 10 will be described later.

After the step 128 is performed, the ECU 10 detects the malfunction position/mode of the type-2 malfunction of concern. Hence, the ECU 10 performs the above step 124 and the above step 126 in accordance with the detected malfunction position and mode.

When the occurrence of a malfunction is not properly detected by the result of the malfunction determination process of the step 118, the result at the step 120 is negative. In this case, a malfunction of the type 3 may have occurred in the hydraulic brake pressure control system of FIG. 1, or the hydraulic brake pressure control system may be operating normally. The ECU 10 at step 130 sequentially performs a set of corresponding judgment processes for the result of the malfunction determination process of the step 118, in order to detect the occurrence of a type-3 malfunction and a malfunction position and a malfunction mode of the malfunction. The judgment processes performed at the step 130 by the ECU 10 will be described later.

During the step 130, the ECU 10 detects the occurrence of a type-3 malfunction, if any, and also the malfunction position and mode of the type-3 malfunction. Then, the ECU 10 at step 132 detects whether the hydraulic brake pressure control system of FIG. 1 is normally operating.

When the occurrence of the type-3 malfunction in the hydraulic brake pressure control system of FIG. 1 is already detected by the step 130, the result at the step 132 is negative. Then, the ECU 10 performs the above step 124 and the above step 126 in accordance with the detected malfunction position and mode of the type-3 malfunction.

On the other hand, when the occurrence of a type-3 malfunction in the hydraulic brake pressure control system is not detected by the step 130, the result at the step 132 is affirmative. Hence, the ECU 10 at step 134 performs a normal process in the hydraulic brake pressure control system of FIG. 1.

During the normal process of the step 134, the ECU 10 electrically controls the pressure-raising LCV 80, 82, 86 and 88 and the pressure-reducing LCV 90, 92, 94 and 96 by using the BBW control method, such that the output signals pFR, pFL, pRR and pRL of the pressure sensors 54, 57, 62 and 65 match with a given target wheel cylinder pressure for each of the wheel cylinders 53, 56, 61 and 64. After the step 134 is performed, the malfunction/countermeasure determination process at the current cycle ends. Thereafter, every time a braking request is sent to the ECU 10 by the vehicle, the ECU 10 calculates a target wheel cylinder pressure for each of the wheel cylinders based on the braking request, and electrically controls the pressure-raising LCV 80, 82, 86 and 88 and the pressure-reducing LCV 90, 92, 94 and 96, such that the output signals pFR, pFL, pRR and pRL of the pressure sensors 54, 57, 62 and 65 match with the calculated target wheel cylinder pressure.

Next, a description will be given of the malfunction determination process which is performed at the step 118 by the ECU 10 and various judgment processes which are performed at the steps 128 and 130 by the ECU 10 with reference to FIG. 5 through FIG. 15.

FIG. 5, FIG. 6 and FIG. 7 show a correlation between the pattern of M/C check sensor outputs and BBW check sensor outputs, the judgment process to be performed, and the malfunction position/mode obtained as a result of one of the malfunction determination process and the judgment process, which is stored in the memory of the ECU 10 with respect to each of individual malfunctions which may occur in the hydraulic brake pressure control system of FIG. 1. FIG. 5 shows a first part of the correlation (malfunctions No. 1 through No. 16), FIG. 6 shows a second part of the correlation (malfunctions No. 17 through No. 32), and FIG. 7 shows a third part of the correlation (malfunctions No. 33 through No. 48).

As shown in FIG. 5 through FIG. 7, the correlation for each individual malfunction contains:
  the pattern of M/C check sensor outputs (corresponding to the detection result of the step 114) and BBW check sensor outputs (corresponding to the detection result of the step 104);
  the judgment process to be performed (corresponding to the step 128 or the step 130); and
  the malfunction position/mode obtained as a result of either the malfunction determination process (corresponding to the step 118) or the judgment process (corresponding to the step 128 or the step 130).

In the present embodiment, during the malfunction determination process of the step 118, the ECU 10 selects one of the stored patterns (shown as in the correlation of FIG. 5 through FIG. 7) that matches with the detection result of both the step 104 and the step 114. In FIGS. 5–7, the circle symbol indicates that the sensor is operating normally (i.e., having a normal output). The triangle symbol indicates that the sensor output is defective (i.e., having a drift from a normal output). The x symbol indicates that there is no detected sensor output (i.e., having an inoperative sensor output).

For example, in a case of malfunction No. 7 in the correlation of FIG. 5, the matching between the detection result and the stored pattern of M/C check sensor outputs and BBW check sensor outputs is uniquely determined by the ECU 10. When the detection result matches with the stored pattern of malfunction No. 7, the ECU 10 determines that a malfunction which has occurred in the hydraulic brake pressure control system is of the type 1. In this case, the ECU 10 at the step 118 detects that the malfunction position is the rear internal pressure chamber of the master cylinder 16 in the hydraulic brake pressure control system, and the malfunction mode is a pressure fixed defect, as shown in the correlation of FIG. 5.

For example, in a case of malfunction No. 1 and malfunction No. 2 in the correlation of FIG. 5, the matching between the detection result and the stored pattern of M/C check sensor outputs and BBW check sensor outputs is not uniquely determined by the ECU 10. It is necessary to detect which of malfunction No. 1 and malfunction No. 2 is related to a malfunction which has occurred in the system by performing a judgment process different from the malfunction determination process of the step 118. When the detection result matches with the stored pattern of malfunction No. 1 and malfunction No. 2, the ECU 10 determines that a malfunction which has occurred in the hydraulic brake pressure control system is of the type 2, and that a malfunction position and a malfunction mode of the malfunction are not properly detected by the step 118. In this case, the ECU 10 at the step 128 performs a judgment process 1 (corresponding to both malfunction No. 1 and malfunction No. 2), as shown in the correlation of FIG. 5, in order to detect a malfunction position and a malfunction mode of the type-2 malfunction.

For example, in a case of malfunctions No. 45 through No. 47 in the correlation of FIG. 7, the matching between the detection result and the stored pattern of M/C check sensor outputs and BBW check sensor outputs is impossible because all the sensor outputs of the detection result show a normal change in the brake fluid pressure. When the detection result matches with the stored pattern of malfunctions No. 45 through No. 47, the ECU 10 determines that a malfunction which may occur in the hydraulic brake pressure control system is of the type 3. In this case, the ECU 10 at the step 130 performs a set of judgment processes 6 through 8 (corresponding to malfunctions No. 45 through No. 47), as shown in the correlation of FIG. 7, in order to detect the occurrence of a type-3 malfunction, if any, and a malfunction position and a malfunction mode of the type-3 malfunction.

Next, a description will be given of the respective malfunctions No. 1 through No. 48 in the correlation of FIG. 5 through FIG. 7.

Malfunction No. 1 of FIG. 5 is a type-2 malfunction which may occur in the hydraulic brake pressure control system of FIG. 1. The malfunction position is the rear internal pressure chamber of the master cylinder 16 in the hydraulic brake pressure control system, and the malfunction mode is a "no pressure rise" defect. When the M/C control check is performed at the step 112, the brake fluid pressure from the master cylinder 16 is not supplied to the rear wheel cylinders 61 and 64. In this condition, the sensor outputs pMC, pFR and pFL during the M/C control check show a normal change in the brake fluid pressure but the sensor outputs pRR and pRL during the M/C control check do not indicate a rise of the brake fluid pressure.

When the BBW control check is performed at the step 112, the FMCV 50 and the RMCV 58 are set in the valve-closed state, and the master cylinder 16 is cut off from the hydraulic circuit including the four wheel cylinders. The malfunction of concern (which is a pressure fixed defect of the rear internal pressure chamber of the master cylinder 16) does not influence the sensor outputs as a result of the BBW control check. Hence, in this condition, the sensor outputs pFR, pFL, pRR and pRL during the BBW control check show a normal change in the brake fluid pressure.

Malfunction No. 2 of FIG. 5 is a type-2 malfunction which may occur in the hydraulic brake pressure control system of FIG. 1. The malfunction position is the RMCV 58 in the hydraulic brake pressure control system, and the malfunction mode is a valve-closed defect. When the M/C control check is performed at the step 112, the brake fluid pressure supplied to the rear wheel cylinders 61 and 64 by the master cylinder 16 is closed off at the defective RMCV 58. In this condition, the sensor outputs pMC, pFR and pFL during the M/C control check show a normal change in the brake fluid pressure but the sensor outputs pRR and pRL during the M/C control check do not indicate a rise of the brake fluid pressure.

When the BBW control check is performed at the step 112, the RMCV 58 is set in the valve-closed state, and the master cylinder 16 is cut off from the hydraulic circuit including the four wheel cylinders. The malfunction of concern (which is a valve-closed defect of the RMCV 58 in the hydraulic brake pressure control system) does not influence the sensor outputs as a result of the BBW control check. Hence, in this condition, the sensor outputs pFR, pFL, pRR and pRL during the BBW control check show a normal change in the brake fluid pressure.

As described above, when a malfunction which is indicated by one of malfunction No. 1 and malfunction No. 2 occurs in the system, the detection result matches with the corresponding stored pattern as in the correlation of FIG. 5. In the correlation of FIG. 5 through FIG. 7, there is no other stored pattern of the sensor outputs which matches with the detection result of the present case.

Hence, when the detection result matches with the stored pattern of malfunction No. 1 and malfunction No. 2, the ECU 10 determines that the malfunction which has occurred in the hydraulic brake pressure control system is of the type 2, and that a malfunction position and a malfunction mode of the malfunction are not properly detected by the step 118. In this case, the ECU 10 at the step 128 starts performing the judgment process 1 as shown in the correlation of FIG. 5, in order to detect a malfunction position and a malfunction mode of the malfunction of concern.

Figure 8:
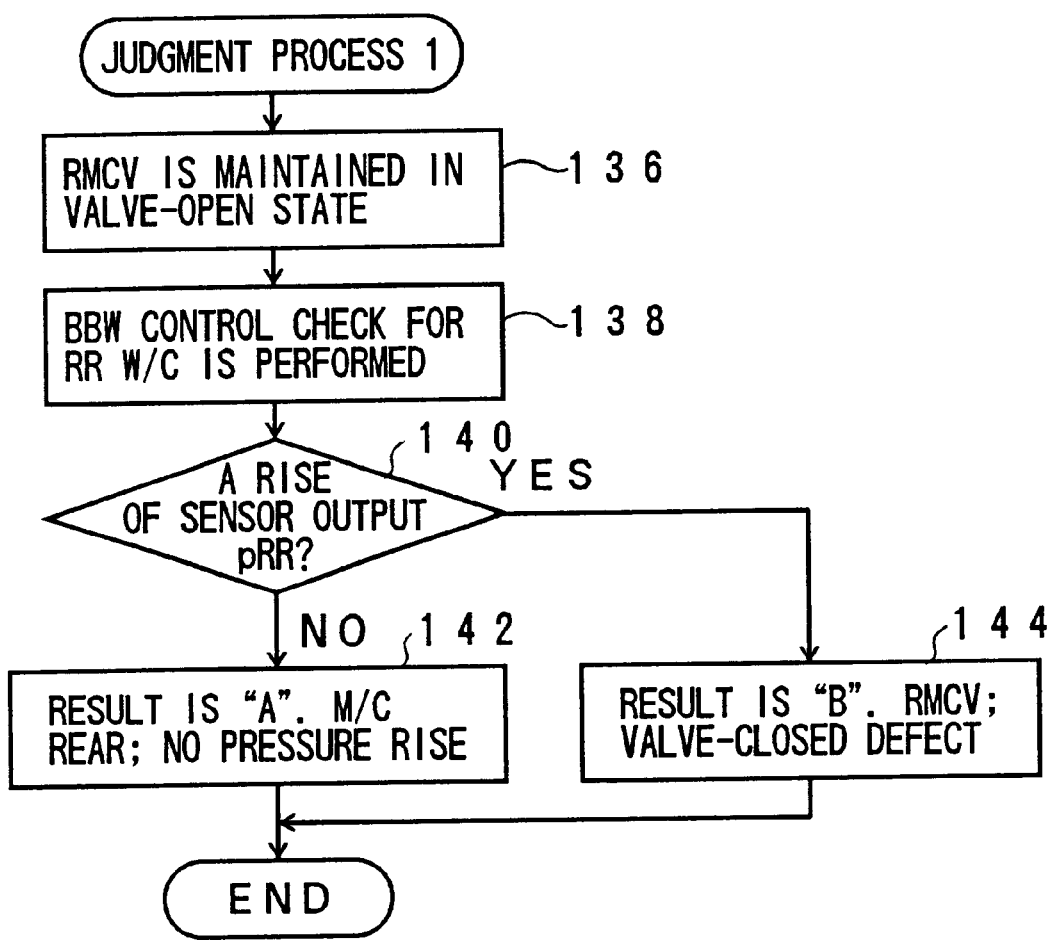
FIG. 8 is a flowchart for explaining a judgment process 1 performed by the control unit of the hydraulic brake pressure control system of FIG. 1.

FIG. 8 shows a judgment process 1 performed at the step 128 of FIG. 4 by the ECU 10 of the hydraulic brake pressure control system of FIG. 1.

As shown in FIG. 8, at the start of the judgment process 1, the ECU 10 at step 136 maintains the RMCV 58 in the valve-open state. Specifically, at the step 136, no drive signal is supplied to the RMCV 58 by the ECU 10 and the RMCV 58 is set in the initial condition. If a valve-closed defect of the RMCV 58 occurs in the system, the RMCV 58 remains in the valve-closed state after the step 136 is performed. If a valve-closed defect of the RMCV 58 does not occur in the system, the RMCV 58 is maintained in the valve-open state after the step 136 is performed.

The ECU 10 at step 138 performs the BBW control check for the RR wheel cylinder 61. Specifically, during the BBW control check of the step 138, the RMCV 58 is maintained in the valve-open state, the RSCV 60 is set in the valve-closed state, and the RR LCV 86 and the RR LCV 94 are electrically controlled by supplying the given drive signals thereto.

The ECU 10 at step 140 detects whether the sensor output pRR as a result of the BBW control check of the step 138 indicates a proper rise of the brake fluid pressure in the RR wheel cylinder 61. If the RMCV 58 is maintained in the valve-open state during the BBW control check of the step 138, the brake fluid pressure in the RR wheel cylinder 61 is supplied through the RMCV 58 to the master cylinder 16. In this condition, the sensor output pRR as the detection result does not indicate a proper rise in the brake fluid pressure of the RR wheel cylinder 61.

Hence, when the result at the step 140 is negative (that is, when the sensor output pRR during the BBW control check does not indicate a proper rise of the brake fluid pressure in the RR wheel cylinder 61), the ECU 10 determines that the RMCV 58 is actually set in the valve-open state, and a valve-closed defect of the RMCV 58 does not occur in the system. Then the ECU 10 proceeds to the next step 142.

The ECU 10 at step 142 determines that the result of the judgment process 1 is "A". Specifically, the ECU 10 determines that the malfunction position is the rear internal pressure chamber of the master cylinder 16, and the malfunction mode is a pressure fixed defect. As described above, the precondition for the judgment process 1 of FIG. 8 is that the malfunction of concern is either a pressure fixed defect of the rear internal pressure chamber of the master cylinder 16 or a valve-closed defect of the RMCV 58. Hence, the ECU 10 at the step 142 can determine the malfunction position/mode of the malfunction of concern. After the step 142 is performed, the judgment process of FIG. 8 ends.

When the result at the step 140 is affirmative (that is, when the sensor output pRR during the BBW control check indicates a proper rise of the brake fluid pressure in the RR wheel cylinder 61), it is determined that the RMCV 58 is improperly maintained in the valve-closed state during the BBW control check. Hence, the ECU 10 determines that the RMCV 58 is defective and a valve-closed defect of the RMCV 58 occurs in the system.

The ECU 10 at step 144 determines that the result of the judgment process 1 is "B". Specifically, the ECU 10 determines that the malfunction position is the RMCV 58, and the malfunction mode is a valve-closed defect. After the step 144 is performed, the judgment process 1 of FIG. 8 ends. According to the judgment process 1 of the present embodiment, it is possible to accurately determine whether the malfunction of concern is malfunction No. 1 (a pressure fixed defect of the rear internal pressure chamber of the master cylinder 16) or malfunction No. 2 (a valve-closed defect of the RMCV 58).

Malfunction No. 3 of FIG. 5 is a type-2 malfunction which may occur in the hydraulic brake pressure control system of FIG. 1. The malfunction position is a pipe connected to the RR wheel cylinder 61 in the hydraulic brake pressure control system, and the malfunction mode is a "leak" defect. When the M/C control check is performed at the step 112, the leak of the brake fluid pressure at the malfunction position occurs. During the M/C control check, the RR connecting path 59 and the RL connecting path 60 are connected to each other. If the above-mentioned leak occurs, both the brake fluid pressure in the RR wheel cylinder 61 and the brake fluid pressure in the RL wheel cylinder 64 do not properly rise during the M/C control check. In this condition, the sensor outputs pMC, pFR and pFL during the M/C control check show a normal change in the brake fluid pressure but the sensor outputs pRR and pRL during the M/C control check do not indicate a rise of the brake fluid pressure.

When the BBW control check is performed at the step 112, the RSCV 63 is set in the valve-closed state, so that the RL connecting path 60 is cut off from the RR connecting path 59 by the RSCV 63. The malfunction of concern (which is a leak defect of the pipe of the RR wheel cylinder 61) influences only the sensor output pRR during the BBW control check, but does not influence the other sensor outputs during the BBW control check. Hence, in this condition, the sensor outputs pFR, pFL and pRL during the BBW control check show a normal change in the brake fluid pressure, and the sensor output pRR during the BBW control check does not indicate a proper rise of the brake fluid pressure.

Malfunction No. 4 of FIG. 5 is a type-2 malfunction which may occur in the hydraulic brake pressure control system of FIG. 1. The malfunction position is the RR LCV 94 in the hydraulic brake pressure control system, and the malfunction mode is a "leak" defect. When the M/C control check is performed at the step 112, the brake fluid pressure supplied to the rear wheel cylinders 61 and 64 by the master cylinder 16 leaks out to the reservoir path 66 through the defective LCV 94. In this condition, the sensor outputs pMC, pFR and pFL during the M/C control check show a normal change in the brake fluid pressure but the sensor outputs pRR and pRL during the M/C control check do not indicate a rise of the brake fluid pressure.

When the BBW control check is performed at the step 112, the malfunction of concern (which is a leak defect of the RR LCV 94 in the hydraulic brake pressure control system) influences only the sensor output pRR during the BBW control check but does not influence the other sensor outputs during the BBW control check. Hence, in this condition, the sensor outputs pFR, pFL and pRL during the BBW control check show a normal change in the brake fluid pressure and only the sensor output pRR does not indicate a proper rise of the brake fluid pressure.

As described above, when a malfunction which is indicated by one of malfunction No. 3 and malfunction No. 4 occurs in the system, the detection result matches with the corresponding stored pattern as in the correlation of FIG. 5. In the correlation of FIG. 5 through FIG. 7, there is no other stored pattern of the sensor outputs which matches with the detection result of the present case.

Hence, when the detection result matches with the stored pattern of malfunction No. 3 and malfunction No. 4, the ECU 10 determines that the malfunction which has occurred in the hydraulic brake pressure control system is of the type 2, and that a malfunction position and a malfunction mode of the malfunction are not properly detected by the step 118. In this case, the ECU 10 at the step 128 starts performing one of a judgment process 2 and a judgment process 3 as shown in the correlation of FIG. 5, in order to detect a malfunction position and a malfunction mode of the malfunction of concern. In order to detect the malfunction position/mode of the malfunction of concern, it is adequate to perform either of the judgment process 2 and the judgment process 3.

Figure 9:
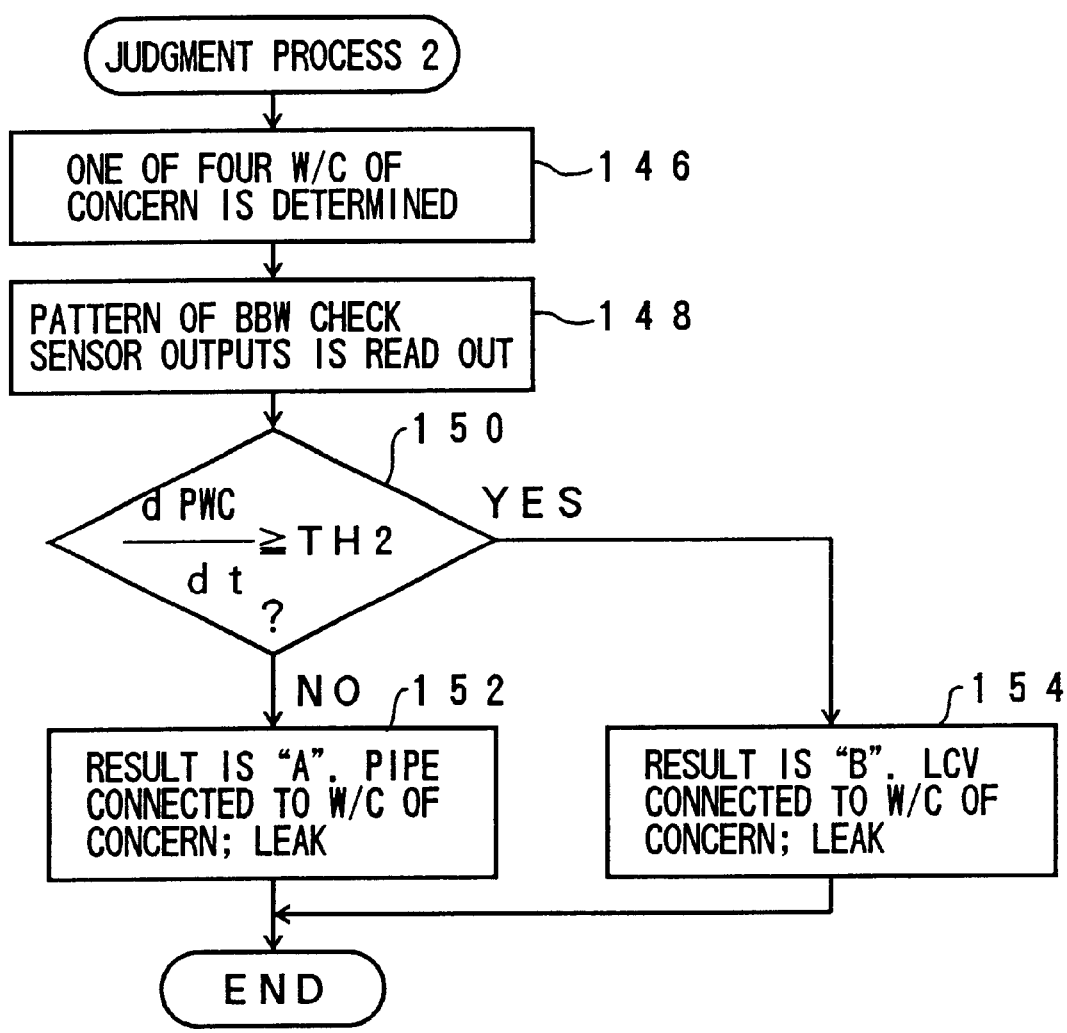
FIG. 9 is a flowchart for explaining a judgment process 2 performed by the control unit of the hydraulic brake pressure control system of FIG. 1.

FIG. 9 shows the judgment process 2 performed at the step 128 of FIG. 4 by the ECU 10 of the hydraulic brake pressure control system of FIG. 1. The judgment process 2 is performed to determine whether the malfunction of concern is a leak defect of a pipe connected to the RR wheel cylinder 61 or a leak defect of the LCV 94 connected to the RR wheel cylinder 61. Also, the judgment process 2 can be performed to determine whether the malfunction of concern is a leak defect of a pipe connected to one of the other wheel cylinders or a leak defect of the LCV connected to one of the other wheel cylinders.

As shown in FIG. 9, at the start of the judgment process 2, the ECU 10 at step 146 determines one of the four wheel cylinders 53, 56, 61 and 64 which is now an object of the judgment process 2. In the case of malfunction No. 3 and malfunction No. 4, the ECU 10 determines the RR wheel cylinder 61 as being the object of the judgment process 2.

The ECU 10 at step 148 reads out one (which is called sensor output pWC) of the BBW check sensor outputs in the detection result of the step 104 which is related to the wheel cylinder of concern. In the case of malfunction No. 3 and malfunction No. 4, the ECU 10 reads out the sensor output pRR of the BBW check sensor outputs (pFR, pFL, pRR and pRL) in the detection result of the step 104.

The ECU 10 at step 150 determines whether a derivative value dpWC/dt of the read sensor output of the step 148 is above a predetermined threshold value TH2. When the result at the step 150 is negative (dpWC/dt<TH2), the ECU 10 proceeds to the next step 152. When the result at the step 150 is affirmative (dpWC/dt≦TH2), the ECU 10 proceeds to the next step 154.

The ECU 10 at the step 152 determines that the result of the judgment process 2 is "A". Specifically, the ECU 10 determines that the malfunction position is a pipe connected to the wheel cylinder of concern, and the malfunction mode is a leak defect. If the wheel cylinder of concern in the system is normally operating, the brake fluid pressure in the wheel cylinder of concern rapidly changes during the BBW control check. However, the determination of the step 150 yields a negative result (dpWC/dt<TH2), and the brake fluid pressure in the wheel cylinder of concern moderately changes during the BBW control check. This is because a leak of the pipe connected to the wheel cylinder of concern occurs, and a certain amount of the brake fluid leaks out at the pipe of the wheel cylinder of concern. Hence, the ECU 10 at the step 152 determines the malfunction position/mode of the malfunction of concern, that is, a leak defect of the pipe connected to the wheel cylinder of concern, as in the correlation of FIG. 5. After the step 152 is performed, the judgment process 2 of FIG. 9 ends.

The ECU 10 at the step 154 determines that the result of the judgment process 2 is "B". Specifically, the ECU 10 determines that the malfunction position is the LCV connected to the wheel cylinder of concern, and the malfunction mode is a leak defect. In this case, the determination of the step 150 yields an affirmative result (dpWC/dt≧TH2). The brake fluid pressure in the wheel cylinder of concern rapidly changes during the BBW control check. As described above, the precondition for the judgment process 2 of FIG. 9 is that the malfunction of concern is either a leak defect of the pipe connected to the wheel cylinder of concern or a leak defect of the LCV connected to the wheel cylinder of concern. Since there exists no leak defect of the pipe connected to the wheel cylinder of concern, the ECU 10 at the step 154 determines that a leak defect of the LCV connected to the wheel cylinder of concern. After the step 154 is performed, the judgment process 2 of FIG. 9 ends. According to the judgment process 2 of the present embodiment, it is possible to accurately determine whether the malfunction of concern is malfunction No. 3 (a leak defect of the pipe connected to the RR wheel cylinder 61) or malfunction No. 4 (a leak defect of the LCV 94 connected to the RR wheel cylinder 61).

Figure 10:
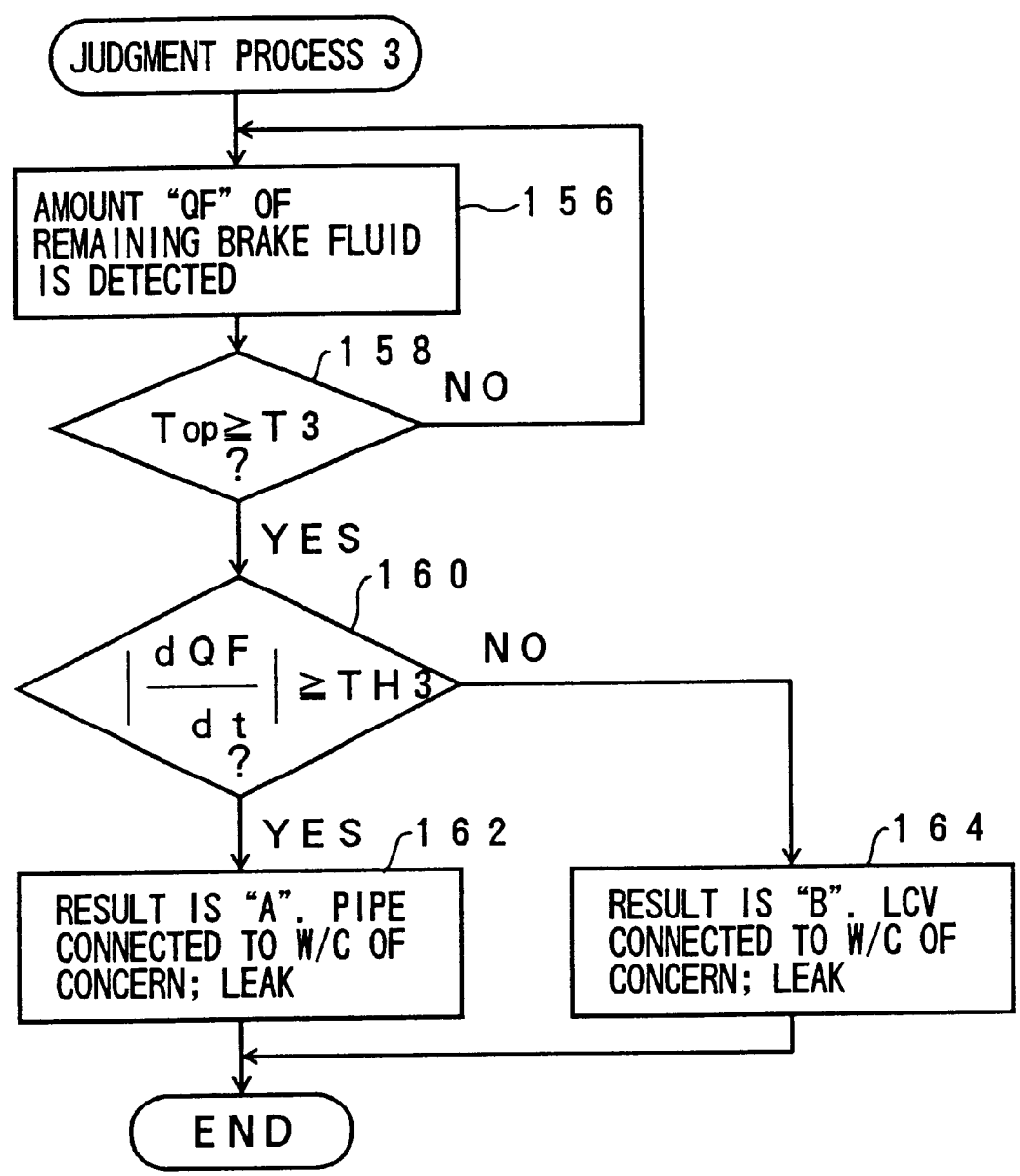
FIG. 10 is a flowchart for explaining a judgment process 3 performed by the control unit of the hydraulic brake pressure control system of FIG. 1.

FIG. 10 shows the judgment process 3 performed at the step 128 of FIG. 4 by the ECU 10 of the hydraulic brake pressure control system of FIG. 1. The judgment process 3 is performed to determine whether the malfunction of concern is a leak defect of a pipe connected to the RR wheel cylinder 61 or a leak defect of the LCV 94 connected to the RR wheel cylinder 61. Also, the judgment process 3 can be performed to determine whether the malfunction of concern is a leak defect of a pipe connected to one of the other wheel cylinders or a leak defect of the LCV connected to one of the other wheel cylinders.

As shown in FIG. 10, at the start of the judgment process 3, the ECU 10 at step 156 detects an amount QF of the remaining brake fluid in the reservoir tank 18 based on the output signal of the fluid sensor 19.

The ECU 10 at step 158 detects whether an execution time Top of the judgment process 3 exceeds a given period T3. When the result at the step 158 is negative (Top<T3), the ECU 10 again performs the step 156 so that the detection of an amount of the remaining brake fluid in the reservoir tank 18 is repeated. Hence, changes in the amount of the remaining brake fluid in the reservoir tank 18 during the given period T3 are detected by the ECU 10. When the result at the step 158 is affirmative (Top≧T3), the ECU 10 proceeds to the next step 160.

The ECU 10 at the step 160 determines whether the absolute value |dQF/dt| of a rate of change of the remaining brake fluid of the reservoir tank 18 is above a predetermined threshold value TH3. The absolute value |dQF/dt| becomes large as the amount QF of the remaining brake fluid of the reservoir tank 18 rapidly decreases. When the determination of the step 160 yields an affirmative result (|dQF/dt|≧TH3), it is determined that the amount QF of the remaining brake fluid of the reservoir tank 18 rapidly decreases. When the result at the step 160 is affirmative, the ECU 10 proceeds to the next step 162. When the result at the step 160 is negative, the ECU 10 proceeds to the next step 164.

The ECU 10 at the step 162 determines that the result of the judgment process 3 is "A". Specifically, the ECU 10 determines that the malfunction position is a pipe connected to the wheel cylinder of concern, and the malfunction mode is a leak defect. If the wheel cylinder of concern in the system is normally operating, the brake fluid pressure in the wheel cylinder of concern rapidly changes during the BBW control check. However, the affirmative result (|dQF/dt|≧TH3) is obtained, and the amount QF of the remaining brake fluid of the reservoir tank 18 rapidly decreases during the BBW control check. This is because a leak of the pipe connected to the wheel cylinder of concern occurs, and a certain amount of the brake fluid leaks out at the pipe of the wheel cylinder of concern. Hence, the ECU 10 at the step 162 determines the malfunction position/mode of the malfunction of concern, that is, a leak defect of the pipe connected to the wheel cylinder of concern, as in the correlation of FIG. 5. After the step 162 is performed, the judgment process 3 of FIG. 10 ends.

The ECU 10 at the step 164 determines that the result of the judgment process 3 is "B". Specifically, the ECU 10 determines that the malfunction position is the LCV connected to the wheel cylinder of concern, and the malfunction mode is a leak defect. In this case, the determination of the step 160 yields a negative result (|dQF/dt|<TH3). The brake fluid pressure in the wheel cylinder of concern rapidly changes during the BBW control check. Although a certain amount of the brake fluid leaks at the defective LCV connected to the wheel cylinder of concern, most brake fluid from the defective LCV is returned back to the reservoir tank 18. As described above, the precondition for the judgment process 3 of FIG. 10 is that the malfunction of concern is either a leak defect of the pipe connected to the wheel cylinder of concern or a leak defect of the LCV connected to the wheel cylinder of concern. Since there exists no leak defect of the pipe connected to the wheel cylinder of concern, the ECU 10 at the step 164 determines that a leak defect of the LCV connected to the wheel cylinder of concern. After the step 164 is performed, the judgment process 3 of FIG. 10 ends. According to the judgment process 3 of the present embodiment, it is possible to accurately determine whether the malfunction of concern is malfunction No. 3 (a leak defect of the pipe connected to the RR wheel cylinder 61) or malfunction No. 4 (a leak defect of the LCV 94 connected to the RR wheel cylinder 61).

Malfunction No. 5 of FIG. 5 is a type-2 malfunction which may occur in the hydraulic brake pressure control system of FIG. 1. The malfunction position is a pipe connected to the RL wheel cylinder 64 in the hydraulic brake pressure control system, and the malfunction mode is a "leak" defect. When the M/C control check is performed at the step 112, the leak of the brake fluid pressure at the malfunction position occurs. During the M/C control check, the RR connecting path 59 and the connecting path 60 are connected to each other. If the above-mentioned leak occurs, both the brake fluid pressure in the RR wheel cylinder 61 and the brake fluid pressure in the RL wheel cylinder 64 do not properly rise during the M/C control check. In this condition, the sensor outputs pMC, pFR and pFL during the M/C control check show a normal change in the brake fluid pressure but the sensor outputs pRR and pRL during the M/C control check do not indicate a rise of the brake fluid pressure.

When the BBW control check is performed at the step 112, the RSCV 63 is set in the valve-closed state, so that the RR connecting path 59 is cut off from the RL connecting path 60 by the RSCV 63. The malfunction of concern (which is a leak defect of the pipe of the RL wheel cylinder 64) influences only the sensor output pRL during the BBW control check, but does not influence the other sensor outputs during the BBW control check. Hence, in this condition, the sensor outputs pFR, pFL and pRR during the BBW control check show a normal change in the brake fluid pressure, and the sensor output pRL during the BBW control check does not indicate a proper rise of the brake fluid pressure.

Malfunction No. 6 of FIG. 5 is a type-2 malfunction which may occur in the hydraulic brake pressure control system of FIG. 1. The malfunction position is the RL LCV 96 in the hydraulic brake pressure control system, and the malfunction mode is a "leak" defect. When the M/C control check is performed at the step 112, the brake fluid pressure supplied to the rear wheel cylinders 61 and 64 by the master cylinder 16 leaks out to the reservoir path 66 through the defective LCV 96. In this condition, the sensor outputs pMC, pFR and pFL during the M/C control check show a normal change in the brake fluid pressure but the sensor outputs pRR and pRL during the M/C control check do not indicate a rise of the brake fluid pressure.

When the BBW control check is performed at the step 112, the malfunction of concern (which is a leak defect of the RL LCV 96 in the hydraulic brake pressure control system) influences only the sensor output pRL during the BBW control check but does not influence the other sensor outputs during the BBW control check. Hence, in this condition, the sensor outputs pFR, pFL and pRR during the BBW control check show a normal change in the brake fluid pressure and only the sensor output pRL does not indicate a proper rise of the brake fluid pressure.

As described above, when a malfunction indicated by one of malfunction No. 5 and malfunction No. 6 occurs in the system, the detection result matches with the corresponding stored pattern as in the correlation of FIG. 5. In the correlation of FIG. 5 through FIG. 7, there is no other stored pattern of the sensor outputs which matches with the detection result of the present case.

Hence, when the detection result matches with the stored pattern of malfunction No. 5 and malfunction No. 6, the ECU 10 determines that the malfunction which has occurred in the hydraulic brake pressure control system is of the type 2, and that a malfunction position and a malfunction mode of the malfunction are not properly detected by the step 118. In this case, the ECU 10 at the step 128 starts performing one of the judgment process 2 and the judgment process 3 as shown in the correlation of FIG. 5, in order to detect a malfunction position and a malfunction mode of the malfunction of concern. Similar to the case of malfunction No. 3 and malfunction No. 4, according to one of the judgment process 2 of FIG. 9 and the judgment process 3 of FIG. 10, it is possible to accurately determine whether the malfunction of concern is malfunction No. 5 or malfunction No. 6.

Malfunction No. 7 of FIG. 5 is a type-1 malfunction which may occur in the hydraulic brake pressure control system of FIG. 1. The malfunction position is the rear internal pressure chamber of the master cylinder 16 in the hydraulic brake pressure control system, and the malfunction mode is a "pressure fixed" defect. When the M/C control check is performed at the step 112, both the brake fluid pressure in the RR wheel cylinder 61 and the brake fluid pressure in the RL wheel cylinder 64 are not properly reduced after the brake pedal 12 is released by the vehicle operator because of the pressure fixed defect of the rear internal pressure chamber of the master cylinder 16. In this condition, the sensor outputs pMC, pFR and pFL during the M/C control check show a normal change in the brake fluid pressure but the sensor outputs pRR and pRL during the M/C control check do not indicate a drop of the brake fluid pressure.

When the BBW control check is performed at the step 112, the FMCV 50 and the RMCV 58 are set in the valve-closed state, and the master cylinder 16 is cut off from the hydraulic circuit including the four wheel cylinders. The malfunction of concern (which is the pressure fixed defect of the rear internal pressure chamber of the master cylinder 16) does not influence the sensor outputs during the BBW control check. Hence, in this condition, the sensor outputs pFR, pFL, pRR and pRL during the BBW control check show a normal change in the brake fluid pressure.

As described above, when a malfunction indicated by malfunction No. 7 occurs in the system, the detection result matches with the corresponding stored pattern as in the correlation of FIG. 5. In the correlation of FIG. 5 through FIG. 7, there is no other stored pattern of the sensor outputs which matches with the detection result of the present case. Hence, when the detection result matches with the stored pattern of malfunction No. 7, the ECU 10 determines that the pressure fixed defect of the rear internal pressure chamber of the master cylinder 16 occurs in the system.

Malfunction No. 8 of FIG. 5 is a type-1 malfunction which may occur in the hydraulic brake pressure control system of FIG. 1. The malfunction position is the FMCV 50 in the hydraulic brake pressure control system, and the malfunction mode is a "valve-closed" defect. When the M/C control check is performed at the step 112, the boosted pressure Pb supplied to the front hydraulic path 28 by the mechanical pressure-increase valve 26 is closed off by the defective FMCV 50. In this condition, the sensor outputs pMC, pRR and pRL during the M/C control check show a normal change in the brake fluid pressure but the sensor outputs pFR and pFL during the M/C control check do not indicate a rise of the brake fluid pressure.

When the BBW control check is performed at the step 112, the FMCV 50 is set in the valve-closed state. The malfunction of concern (which is a valve-closed defect of the FMCV 50 in the hydraulic brake pressure control system) does not influence the detection result of the sensor outputs during the BBW control check.

Hence, in this condition, the sensor outputs pFR, pFL, pRR and pRL during the BBW control check show a normal change in the brake fluid pressure.

As described above, when a malfunction indicated by malfunction No. 8 occurs in the system, the detection result matches with the corresponding stored pattern as in the correlation of FIG. 5. In the correlation of FIG. 5 through FIG. 7, there is no other stored pattern of the sensor outputs which matches with the detection result of the present case. Hence, when the detection result matches with the stored pattern of malfunction No. 8, the ECU 10 determines that the valve-closed defect of the FMCV 50 occurs in the system.

Malfunction No. 9 of FIG. 5 is a type-1 malfunction which may occur in the hydraulic brake pressure control system of FIG. 1. The malfunction position is the front internal pressure chamber of the master cylinder 16 in the hydraulic brake pressure control system, and the malfunction mode is a "no pressure rise" defect. When the M/C control check is performed at the step 112, the brake fluid pressure from the master cylinder 16 is not properly supplied to the first hydraulic path 20. In this condition, the sensor outputs PRR and pRL during the M/C control check show a normal change in the brake fluid pressure but the sensor outputs pMC, pFR and pFL during the M/C control check do not indicate a rise of the brake fluid pressure.

When the BBW control check is performed at the step 112, the FMCV 50 and the RMCV 58 are set in the valve-closed state. The master cylinder 16 is cut off from the hydraulic circuit including the four wheel cylinders. The malfunction of concern (which is a "no pressure rise" defect of the front internal pressure chamber of the master cylinder 16) does not influence the detection result of the sensor outputs during the BBW control check. Hence, in this condition, the sensor outputs pFR, pFL, pRR and pRL during the BBW control check show a normal change in the brake fluid pressure.

As described above, when a malfunction indicated by malfunction No. 9 occurs in the system, the detection result matches with the corresponding stored pattern as in the correlation of FIG. 5. In the correlation of FIG. 5 through FIG. 7, there is no other stored pattern of the sensor outputs which matches with the detection result of the present case. Hence, when the detection result matches with the stored pattern of malfunction No. 9, the ECU 10 determines that the "no pressure rise" defect of the front internal pressure chamber of the master cylinder 16 occurs in the system.

Malfunction No. 10 of FIG. 5 is a type-2 malfunction which may occur in the hydraulic brake pressure control system of FIG. 1. The malfunction position is a pipe connected to the FR wheel cylinder 53 in the hydraulic brake pressure control system, and the malfunction mode is a "leak" defect. When the M/C control check is performed at the step 112, the leak of the brake fluid pressure at the malfunction position occurs. During the M/C control check, the FR connecting path 51 and the FL connecting path 52 are connected to each other. If the above-mentioned leak occurs, both the brake fluid pressure in the FR wheel cylinder 53 and the brake fluid pressure in the FL wheel cylinder 56 do not properly rise during the M/C control check.

Hence, the brake fluid pressure in the front hydraulic path 28 does not properly rise during the M/C control check. Hence, in the mechanical pressure-increase valve 26, the pressurizing chamber 45 is maintained at a low pressure and the pressure of the pressurizing chamber 45 does not rise. As shown in FIG. 2, the brake fluid pressure of the first hydraulic path 20 is equal to the brake fluid pressure of the pressurizing chamber 45 of the mechanical pressure-increase valve 26. Therefore, in this condition, the sensor outputs pMC, pFR and pFL during the M/C control check do not indicate a rise of the brake fluid pressure but the sensor outputs pRR and pRL during the M/C control check show a normal change in the brake fluid pressure.

When the BBW control check is performed at the step 112, the FSCV 55 is set in the valve-closed state, so that the FL connecting path 52 is cut off from the FR connecting path 51 by the FSCV 55. The malfunction of concern (which is a leak defect of the pipe connected to the FR wheel cylinder 53) influences only the sensor output pFR during the BBW control check, but does not influence the other sensor outputs during the BBW control check. Hence, in this condition, the sensor outputs pFL, pRR and pRL during the BBW control check show a normal change in the brake fluid pressure, and the sensor output pFR during the BBW control check does not indicate a rise of the brake fluid pressure.

Malfunction No. 11 of FIG. 5 is a type-2 malfunction which may occur in the hydraulic brake pressure control system of FIG. 1. The malfunction position is the FR LCV 90 in the hydraulic brake pressure control system, and the malfunction mode is a "leak" defect. When the M/C control check is performed at the step 112, the brake fluid pressure supplied to the front wheel cylinders 53 and 56 by the mechanical pressure-increase valve 26 leaks out to the reservoir path 66 through the defective LCV 90. In this condition, the sensor outputs pMC, pFR and pFL during the M/C control check do not indicate a rise of the brake fluid pressure and the sensor outputs pRR and pRL during the M/C control check show a normal change in the brake fluid pressure.

When the BBW control check is performed at the step 112, the malfunction of concern (which is a leak defect of the FR LCV 90 in the hydraulic brake pressure control system) influences only the sensor output pFR during the BBW control check but does not influence the other sensor outputs during the BBW control check. Hence, in this condition, the sensor outputs pFL, pRR and pRL during the BBW control check show a normal change in the brake fluid pressure but only the sensor output pFR does not indicate a rise of the brake fluid pressure.

As described above, when a malfunction indicated by one of malfunction No. 10 and malfunction No. 11 occurs in the system, the detection result matches with the corresponding stored pattern as in the correlation of FIG. 5. In the correlation of FIG. 5 through FIG. 7, there is no other stored pattern of the sensor outputs which matches with the detection result of the present case.

Hence, when the detection result matches with the stored pattern of malfunction No. 10 and malfunction No. 11, the ECU 10 determines that the malfunction which has occurred in the hydraulic brake pressure control system is of the type 2, and that a malfunction position and a malfunction mode of the malfunction are not properly detected by the step 118. In this case, the ECU 10 at the step 128 starts performing one of the judgment process 2 and the judgment process 3 as shown in the correlation of FIG. 5, in order to detect a malfunction position and a malfunction mode of the malfunction of concern. Similar to the case of malfunction No. 3 and malfunction No. 4, according to one of the judgment process 2 of FIG. 9 and the judgment process 3 of FIG. 10, it is possible to accurately determine whether the malfunction of concern is malfunction No. 10 or malfunction No. 11.

Malfunction No. 12 of FIG. 5 is a type-2 malfunction which may occur in the hydraulic brake pressure control system of FIG. 1. The malfunction position is a pipe connected to the FL wheel cylinder 56 in the hydraulic brake pressure control system, and the malfunction mode is a "leak" defect. When the M/C control check is performed at the step 112, the leak of the brake fluid pressure at the malfunction position occurs. During the M/C control check, the FR connecting path 51 and the FL connecting path 52 are connected to each other. If the above-mentioned leak occurs, both the brake fluid pressure in the FR wheel cylinder 53 and the brake fluid pressure in the FL wheel cylinder 56 do not properly rise during the M/C control check. Similar to the case of malfunction No. 10, in this condition, the sensor outputs pMC, pFR and pFL during the MIC control check do not indicate a rise of the brake fluid pressure but the sensor outputs pRR and pRL during the M/C control check show a normal change in the brake fluid pressure.

When the BBW control check is performed at the step 112, the FSCV 55 is set in the valve-closed state, so that the FR connecting path 51 is cut off from the FL connecting path 52 by the FSCV 55. The malfunction of concern (which is a leak defect of the pipe connected to the FL wheel cylinder 56) influences only the sensor output pFL during the BBW control check, but does not influence the other sensor outputs during the BBW control check. Hence, in this condition, the sensor outputs pFR, pRR and pRL during the BBW control check show a normal change in the brake fluid pressure, and the sensor output pFL during the BBW control check does not indicate a rise of the brake fluid pressure.

Malfunction No. 13 of FIG. 5 is a type-2 malfunction which may occur in the hydraulic brake pressure control system of FIG. 1. The malfunction position is the FL LCV 92 in the hydraulic brake pressure control system, and the malfunction mode is a "leak" defect. When the M/C control check is performed at the step 112, the brake fluid pressure supplied to the front wheel cylinders 53 and 56 by the mechanical pressure-increase valve 26 leaks out to the reservoir path 66 through the defective LCV 92. In this condition, the sensor outputs pMC, pFR and pFL during the M/C control check do not indicate a rise of the brake fluid pressure but the sensor outputs pRR and pRL during the M/C control check show a proper change in the brake fluid pressure.

When the BBW control check is performed at the step 112, the malfunction of concern (which is a leak defect of the FL LCV 92 in the hydraulic brake pressure control system) influences only the sensor output pFL during the BBW control check but does not influence the other sensor outputs during the BBW control check. Hence, in this condition, the sensor outputs pFR, pRR and pRL during the BBW control check show a normal change in the brake fluid pressure and only the sensor output pFL does not indicate a rise of the brake fluid pressure.

As described above, when a malfunction indicated by one of malfunction No. 12 and malfunction No. 13 occurs in the system, the detection result matches with the corresponding stored pattern as in the correlation of FIG. 5. In the correlation of FIG. 5 through FIG. 7, there is no other stored pattern of the sensor outputs which matches with the detection result of the present case. Hence, when the detection result matches with the stored pattern of malfunction No. 12 and malfunction No. 13, the ECU 10 determines that the malfunction which has occurred in the hydraulic brake pressure control system is of the type 2, and that a malfunction position and a malfunction mode of the malfunction are not properly detected by the step 118. In this case, the ECU 10 at the step 128 starts performing one of the judgment process 2 and the judgment process 3 as shown in the correlation of FIG. 5, in order to detect a malfunction position and a malfunction mode of the malfunction of concern. Similar to the case of malfunction No. 3 and malfunction No. 4, according to one of the judgment process 2 of FIG. 9 and the judgment process 3 of FIG. 10, it is possible to accurately determine whether the malfunction of concern is malfunction No. 12 or malfunction No. 13.

Malfunction No. 14 of FIG. 5 is a type-1 malfunction which may occur in the hydraulic brake pressure control system of FIG. 1. The malfunction position is the front internal pressure chamber of the master cylinder 16 in the hydraulic brake pressure control system, and the malfunction mode is a "pressure fixed" defect. When the M/C control check is performed at the step 112, the brake fluid pressure in the master cylinder 16 (or the first hydraulic path 20), the brake fluid pressure in the FR wheel cylinder 53 and the brake fluid pressure in the FL wheel cylinder 56 are not properly reduced after the brake pedal 12 is released by the vehicle operator because of the pressure fixed defect of the front internal pressure chamber of the master cylinder 16. In this condition, the sensor outputs pMC, pFR and pFL during the M/C control check do not indicate a drop of the brake fluid pressure but the sensor outputs pRR and pRL during the M/C control check show a normal change in the brake fluid pressure.

When the BBW control check is performed at the step 102, the FMCV 50 and the RMCV 58 are set in the valve-closed state, and the master cylinder 16 is cut off from the hydraulic circuit including the four wheel cylinders. The malfunction of concern (which is the pressure fixed defect of the front internal pressure chamber of the master cylinder 16) does not influence the sensor outputs during the BBW control check. Hence, in this condition, the sensor outputs pFR, pFL, pRR and pRL during the BBW control check show a normal change in the brake fluid pressure.

As described above, when a malfunction indicated by malfunction No. 14 occurs in the system, the detection result matches with the corresponding stored pattern as in the correlation of FIG. 5. In the correlation of FIG. 5 through FIG. 7, there is no other stored pattern of the sensor outputs which matches with the detection result of the present case. Hence, when the detection result matches with the stored pattern of malfunction No. 14, the ECU 10 determines that the pressure fixed defect of the front internal pressure chamber of the master cylinder 16 occurs in the system.

Malfunction No. 15 of FIG. 5 is a type-1 malfunction which may occur in the hydraulic brake pressure control system of FIG. 1. The malfunction position is the $P_{M/C}$ sensor 24 in the hydraulic brake pressure control system, and the malfunction mode is an "inoperative" defect. When a malfunction indicated by malfunction No. 15 occurs in the system, only the sensor output pMC during the M/C control check does not show a change in the brake fluid pressure in the first hydraulic path 20 (or the master cylinder 16) and the sensor outputs pFR, pFL, pRR and pRL during the M/C control check show a normal change in the brake fluid pressure. Also, all the sensor outputs pFR, pFL, pRR and pRL during the BBW control check show a normal change in the brake fluid pressure.

As described above, when a malfunction indicated by malfunction No. 15 occurs in the system, the detection result matches with the corresponding stored pattern as in the correlation of FIG. 5. In the correlation of FIG. 5 through FIG. 7, there is no other stored pattern of the sensor outputs which matches with the detection result of the present case. Hence, when the detection result matches with the stored pattern of malfunction No. 15, the ECU 10 determines that the inoperative defect of the $P_{M/C}$ sensor 24 occurs in the system.

Malfunction No. 16 of FIG. 5 is a type-1 malfunction which may occur in the hydraulic brake pressure control system of FIG. 1. The malfunction position is the $P_{M/C}$ sensor 24 in the hydraulic brake pressure control system, and the malfunction mode is a "drift" defect. When a malfunction indicated by malfunction No. 16 occurs in the system, only the sensor output pMC during the M/C control check drifts, or shows an abnormal value of the brake fluid pressure in the first hydraulic path 20 (or the master cylinder 16), but the other sensor outputs pFR, pFL, pRR and pRL during the M/C control check show a normal change in the brake fluid pressure. Also, all the sensor outputs pFR, pFL, pRR and pRL during the BBW control check show a normal change in the brake fluid pressure.

As described above, when a malfunction indicated by malfunction No. 16 occurs in the system, the detection result matches with the corresponding stored pattern as in the correlation of FIG. 5. In the correlation of FIG. 5 through FIG. 7, there is no other stored pattern of the sensor outputs which matches with the detection result of the present case. Hence, when the detection result matches with the stored pattern of malfunction No. 16, the ECU 10 determines that the drift defect of the $P_{M/C}$ sensor 24 occurs in the system.

Malfunction No. 17 of FIG. 6 is a type-1 malfunction which may occur in the hydraulic brake pressure control system of FIG. 1. The malfunction position is the FR pressure sensor 54 in the hydraulic brake pressure control system, and the malfunction mode is an "inoperative" defect. When a malfunction indicated by malfunction No. 17 occurs in the system, the sensor output pFR during the M/C control check does not show a change in the brake fluid pressure in the wheel cylinder 53 and the other sensor outputs pMC, pFL, pRR and pRL during the M/C control check show a normal change in the brake fluid pressure. Also, the sensor output pFR during the BBW control check does not show a change in the brake fluid pressure and the other sensor outputs pFL, pRR and pRL during the BBW control check show a normal change in the brake fluid pressure.

As described above, when a malfunction indicated by malfunction No. 17 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 17, the ECU 10 determines that the inoperative defect of the FR pressure sensor 54 occurs in the system.

Malfunction No. 18 of FIG. 6 is a type-1 malfunction which may occur in the hydraulic brake pressure control system of FIG. 1. The malfunction position is the FR pressure sensor 54 in the hydraulic brake pressure control system, and the malfunction mode is a "drift" defect. When a malfunction indicated by malfunction No. 18 occurs in the system, the sensor output pFR during the M/C control check drifts, or shows an abnormal value of the brake fluid pressure in the wheel cylinder 53, but the other sensor outputs pMC, pFL, pRR and pRL during the M/C control check show a normal change in the brake fluid pressure. Also, the sensor output pFR during the BBW control check drifts, but the other sensor outputs pFL, pRR and pRL during the BBW control check show a normal change in the brake fluid pressure.

As described above, when a malfunction indicated by malfunction No. 18 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 18, the ECU 10 determines that the drift defect of the FR pressure sensor 54 occurs in the system.

Malfunction No. 19 of FIG. 6 is a type-1 malfunction which may occur in the hydraulic brake pressure control system of FIG. 1. The malfunction position is the FL pressure sensor 57 in the hydraulic brake pressure control system, and the malfunction mode is an "inoperative" defect. When a malfunction indicated by malfunction No. 19 occurs in the system, the sensor output pFL during the M/C control check does not show a change in the brake fluid pressure in the wheel cylinder 56 and the other sensor outputs pMC, pFR, pRR and pRL during the M/C control check show a normal change in the brake fluid pressure. Also, the sensor output pFL during the BBW control check does not show a change in the brake fluid pressure and the other sensor outputs pFR, pRR and pRL during the BBW control check show a normal change in the brake fluid pressure.

As described above, when a malfunction indicated by malfunction No. 19 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 19, the ECU 10 determines that the inoperative defect of the FL pressure sensor 57 occurs in the system.

Malfunction No. 20 of FIG. 6 is a type-1 malfunction which may occur in the hydraulic brake pressure control system of FIG. 1. The malfunction position is the FSCV 55 in the hydraulic brake pressure control system, and the malfunction mode is a valve-closed defect. When a malfunction indicated by malfunction No. 20 occurs in the system, the sensor output pFL during the M/C control check does not show a change in the brake fluid pressure in the wheel cylinder 56 and the other sensor outputs pMC, pFR, pRR and pRL during the M/C control check show a normal change in the brake fluid pressure. However, all the sensor outputs pFR, pFL, pRR and pRL during the BBW control check show a normal change in the brake fluid pressure.

As described above, when a malfunction indicated by malfunction No. 20 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 20, the ECU 10 determines that the valve-closed defect of the FSCV 55 occurs in the system.

Malfunction No. 21 of FIG. 6 is a type-1 malfunction which may occur in the hydraulic brake pressure control system of FIG. 1. The malfunction position is the FL pressure sensor 57 in the hydraulic brake pressure control system, and the malfunction mode is a "drift" defect. When a malfunction indicated by malfunction No. 21 occurs in the system, the sensor output pFL during the M/C control check drifts, or shows an abnormal value of the brake fluid pressure in the wheel cylinder 56, but the other sensor outputs pMC, pFR, pRR and pRL during the M/C control check show a normal change in the brake fluid pressure. Also, the sensor output pFL during the BBW control check drifts, but the other sensor outputs pFR, pRR and pRL during the BBW control check show a normal change in the brake fluid pressure.

As described above, when a malfunction indicated by malfunction No. 21 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 21, the ECU 10 determines that the drift defect of the FL pressure sensor 57 occurs in the system.

Malfunction No. 22 of FIG. 6 is a type-1 malfunction which may occur in the hydraulic brake pressure control system of FIG. 1. The malfunction position is the RR pressure sensor 62 in the hydraulic brake pressure control system, and the malfunction mode is an "inoperative" defect. When a malfunction indicated by malfunction No. 22 occurs in the system, the sensor output pRR during the M/C control check does not show a change in the brake fluid pressure and the other sensor outputs pMC, pFR, pFL and pRL during the M/C control check show a normal change in the brake fluid pressure. Also, the sensor output pRR during the BBW control check does not show a change in the brake fluid pressure and the other sensor outputs pFR, pFL and pRL during the BBW control check show a normal change in the brake fluid pressure.

As described above, when a malfunction indicated by malfunction No. 21 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 22, the ECU 10 determines that the inoperative defect of the RR pressure sensor 62 occurs in the system.

Malfunction No. 23 of FIG. 6 is a type-1 malfunction which may occur in the hydraulic brake pressure control system of FIG. 1. The malfunction position is the RR pressure sensor 62 in the hydraulic brake pressure control system, and the malfunction mode is a "drift" defect. When a malfunction indicated by malfunction No. 23 occurs in the system, the sensor output pRR during the M/C control check drifts, or shows an abnormal value of the brake fluid pressure, but the other sensor outputs pMC, pFR, pFL and pRL during the M/C control check show a normal change in the brake fluid pressure. Also, the sensor output pRR during the BBW control check drifts, but the other sensor outputs pFR, pFL and pRL during the BBW control check show a normal change in the brake fluid pressure.

As described above, when a malfunction indicated by malfunction No. 23 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 23, the ECU 10 determines that the drift defect of the RR pressure sensor 62 occurs in the system.

Malfunction No. 24 of FIG. 6 is a type-1 malfunction which may occur in the hydraulic brake pressure control system of FIG. 1. The malfunction position is the RL pressure sensor 65 in the hydraulic brake pressure control system, and the malfunction mode is an "inoperative" defect. When a malfunction indicated by malfunction No. 24 occurs in the system, the sensor output pRL during the M/C control check does not show a change in the brake fluid pressure and the other sensor outputs pMC, pFR, pFL and pRR during the M/C control check show a normal change in the brake fluid pressure. Also, the sensor output pRL during the BBW control check does not show a change in the brake fluid pressure and the other sensor outputs pFR, pFL and pRR during the BBW control check show a normal change in the brake fluid pressure.

As described above, when a malfunction indicated by malfunction No. 24 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 24, the ECU 10 determines that the inoperative defect of the RL pressure sensor 65 occurs in the system.

Malfunction No. 25 of FIG. 6 is a type-1 malfunction which may occur in the hydraulic brake pressure control system of FIG. 1. The malfunction position is the RSCV 63 in the hydraulic brake pressure control system, and the malfunction mode is a valve-closed defect. When a malfunction indicated by malfunction No. 25 occurs in the system, the sensor output pRL during the M/C control check does not show a change in the brake fluid pressure and the other sensor outputs pMC, pFR, pFL and pRR during the M/C control check show a normal change in the brake fluid pressure. However, all the sensor outputs pFR, pFL, pRR and pRL during the BBW control check show a normal change in the brake fluid pressure.

As described above, when a malfunction indicated by malfunction No. 25 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 25, the ECU 10 determines that the valve-closed defect of the RSCV 63 occurs in the system.

Malfunction No. 26 of FIG. 6 is a type-1 malfunction which may occur in the hydraulic brake pressure control system of FIG. 1. The malfunction position is the RL pressure sensor 65 in the hydraulic brake pressure control system, and the malfunction mode is a "drift" defect. When a malfunction indicated by malfunction No. 26 occurs in the system, the sensor output pRL during the M/C control check drifts, or shows an abnormal value of the brake fluid pressure, but the other sensor outputs pMC, pFR, pFL and pRR during the M/C control check show a normal change in the brake fluid pressure. Also, the sensor output pRL during the BBW control check drifts, but the other sensor outputs pFR, pFL and pRR during the BBW control check show a normal change in the brake fluid pressure.

As described above, when a malfunction indicated by malfunction No. 26 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 26, the ECU 10 determines that the drift defect of the RL pressure sensor 65 occurs in the system.

Malfunction No. 27 of FIG. 6 is a type-2 malfunction which may occur in the hydraulic brake pressure control system of FIG. 1. The malfunction position is the FMCV 50 in the hydraulic brake pressure control system, and the malfunction mode is a valve-open defect. Even if a valve-open defect of the FMCV 50 occurs in the system, all the sensor outputs pMC, pFR, pFL, pRR and pRL during the M/C control check show a normal change in the brake fluid pressure.

However, if a valve-open defect of the FMCV 50 occurs in the system, the sensor output pFR during the BBW control check does not indicate a rise of the brake fluid pressure, and the other sensor outputs pFL, pRR and pRL during the BBW control check show a normal change in the brake fluid pressure.

Malfunction No. 28 of FIG. 6 is a type-2 malfunction which may occur in the hydraulic brake pressure control system of FIG. 1. The malfunction position is the FR LCV 80 in the hydraulic brake pressure control system, and the malfunction mode is a valve-closed defect. Even if a valve-closed defect of the FR LCV 80 occurs in the system, all the sensor outputs pMC, pFR, pFL, pRR and pRL during the M/C control check show a normal change in the brake fluid pressure.

However, if a valve-closed defect of the FR LCV 80 occurs in the system, the sensor output pFR during the BBW control check does not indicate a rise of the brake fluid pressure, and the other sensor outputs pFL, pRR and pRL during the BBW control check show a normal change in the brake fluid pressure.

As described above, when a malfunction indicated by one of malfunction No. 27 and malfunction No. 28 occurs in the system, the detection result matches with the corresponding stored pattern as in the correlation of FIG. 6. When the detection result matches with the stored pattern of malfunction No. 27 and malfunction No. 28, the ECU 10 determines that a malfunction position and a malfunction mode of the malfunction of concern is not properly detected by the malfunction determination process of the step 118. Hence, the ECU 10 at the step 128 performs a judgment process 4 as in the correlation of FIG. 6, in order to detect a malfunction position and a malfunction mode of the malfunction of concern.

Figure 11:
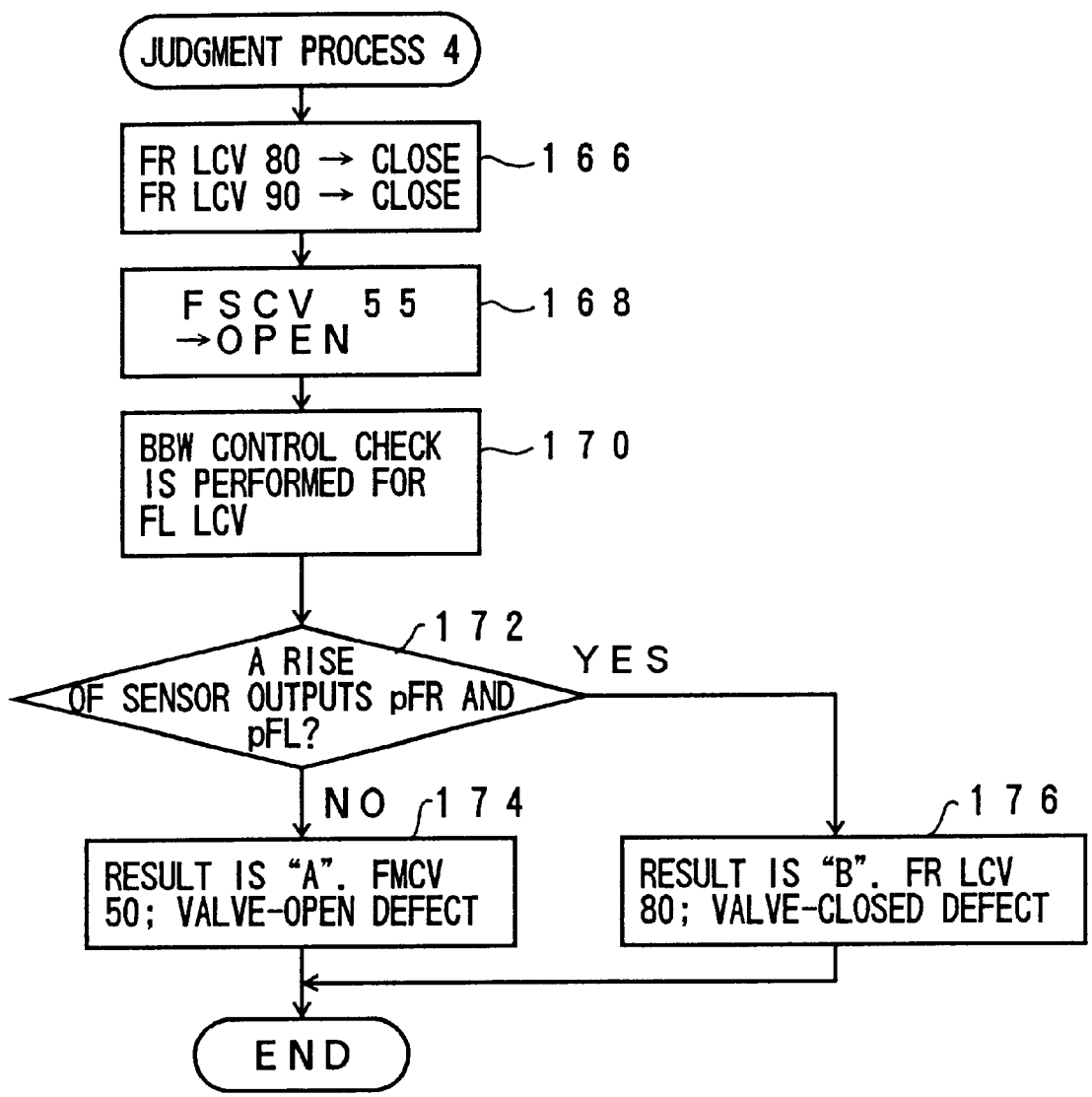
FIG. 11 is a flowchart for explaining a judgment process 4 performed by the control unit of the hydraulic brake pressure control system of FIG. 1.

FIG. 11 shows the judgment process 4 performed at the step 128 by the ECU 10 of the hydraulic brake pressure control system of FIG. 1.

As shown in FIG. 11, at the start of the judgment process 4, the ECU 10 at step 166 maintains the FR LCV 80 and the FR LCV 90 in the valve-closed state.

The ECU 10 at step 168 maintains the FSCV 55 in the valve-open state. After the step 168 is performed, the FR connecting path 51 and the FL connecting path 52 are connected to each other by the FSCV 55 in the valve-open state.

The ECU 10 at step 170 performs the BBW control check for the FL wheel cylinder 56. Specifically, during the BBW control check of the step 170, the FMCV 50 is maintained in the valve-closed state, and the FL LCV 82 and the FL LCV 92 are electrically controlled by supplying the given drive signals thereto.

The ECU 10 at step 172 detects whether the sensor outputs pFR and pRR as a result of the BBW control check of the step 170 indicate a proper rise of the brake fluid pressure in the wheel cylinders 53 and 56.

If the FMCV 50 is properly maintained in the valve-closed state during the BBW control check of the step 170, the brake fluid pressure in the wheel cylinders 53 and 56 properly rise. In this condition, the sensor outputs pFR and pFL as the detection result of the step 172 indicate a proper rise in the brake fluid pressure. Hence, when the result at the step 172 is affirmative, it is determined that the FMCV 50 is operating normally and a valve-open defect of the FMCV 50 does not occur in the system. Then, the ECU 10 proceeds to the next step 176.

If the FMCV 50 is improperly maintained in the valve-open state during the BBW control check of the step 170, the brake fluid pressure in the wheel cylinders 53 and 56 does not properly rise. In this condition, the sensor outputs pFR and pFL as the detection result of the step 172 do not indicate a proper rise in the brake fluid pressure. Hence, when the result at the step 172 is negative, it is determined that a valve-open defect of the FMCV 50 occurs in the system. Then, the ECU 10 proceeds to the next step 174.

When the result at the step 172 is negative, the ECU 10 at step 174 determines that the result of the judgment process 4 is "A". Specifically, the ECU 10 determines that the malfunction position is the FMCV 50 and the malfunction mode is the valve-open defect. After the step 174 is performed, the judgment process 4 of FIG. 11 ends.

When the result at the step 172 is affirmative, the ECU 10 at step 176 determines that the result of the judgment process 4 is "B". As described above, the precondition for the judgment process 4 of FIG. 11 is that the malfunction of concern is either malfunction No. 27 or malfunction No. 28. Hence, the ECU 10 can determine that the malfunction position is the FR LCV 80 and the malfunction mode is the valve-closed defect. After the step 176 is performed, the judgment process 4 of FIG. 11 ends. According to the judgment process 4 of the present embodiment, it is possible to accurately determine whether the malfunction of concern is malfunction No. 27 (a valve-open defect of the FMCV 50) or malfunction No. 28 (a valve-closed defect of the FR LCV 80).

Malfunction No. 29 of FIG. 6 is a type-1 malfunction which may occur in the hydraulic brake pressure control system of FIG. 1. The malfunction position is the FR LCV 80 in the hydraulic brake pressure control system, and the malfunction mode is a valve-open defect. Even if a valve-open defect of the FR LCV 80 occurs in the system, all the sensor outputs pMC, pFR, pFL, pRR and pRL during the M/C control check show a normal change in the brake fluid pressure.

However, if a valve-open defect of the FR LCV 80 occurs in the system, the sensor output pFR during the BBW control check does not indicate a linear change of the brake fluid pressure in response to the given drive signal, and the other sensor outputs pFL, pRR and pRL during the BBW control check show a normal change in the brake fluid pressure.

As described above, when a malfunction indicated by malfunction No. 29 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 29, the ECU 10 determines that the valve-open defect of the FR LCV 80 occurs in the system.

Malfunction No. 30 of FIG. 6 is a type-1 malfunction which may occur in the hydraulic brake pressure control system of FIG. 1. The malfunction position is the FR LCV 90 in the hydraulic brake pressure control system, and the malfunction mode is a valve-closed defect. Even if a valve-closed defect of the FR LCV 90 occurs in the system, all the sensor outputs pMC, pFR, pFL, pRR and pRL during the M/C control check show a normal change in the brake fluid pressure.

However, if a valve-closed defect of the FR LCV 90 occurs in the system, the sensor output pFR during the BBW control check does not indicate a drop of the brake fluid pressure, and the other sensor outputs pFL, pRR and pRL during the BBW control check show a normal change in the brake fluid pressure.

As described above, when a malfunction indicated by malfunction No. 30 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 30, the ECU 10 determines that the valve-open defect of the FR LCV 90 occurs in the system.

Malfunction No. 31 of FIG. 6 is a type-1 malfunction which may occur in the hydraulic brake pressure control system of FIG. 1. The malfunction position is the FL LCV 82 in the hydraulic brake pressure control system, and the malfunction mode is a valve-closed defect. Even if a valve-closed defect of the FL LCV 82 occurs in the system, all the sensor outputs pMC, pFR, pFL, pRR and pRL during the M/C control check show a normal change in the brake fluid pressure.

However, if a valve-closed defect of the FL LCV 82 occurs in the system, the sensor output pFL during the BBW control check does not indicate a rise of the brake fluid pressure, and the other sensor outputs pFR, pRR and pRL during the BBW control check show a normal change in the brake fluid pressure As described above, when a malfunction indicated by malfunction No. 31 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 31, the ECU 10 determines that the valve-open defect of the FL LCV 82 occurs in the system.

Malfunction No. 32 of FIG. 6 is a type-1 malfunction which may occur in the hydraulic brake pressure control system of FIG. 1. The malfunction position is the FL LCV 82 in the hydraulic brake pressure control system, and the malfunction mode is a valve-open defect. Even if a valve-open defect of the FL LCV 82 occurs in the system, all the sensor outputs pMC, pFR, pFL, pRR and pRL during the M/C control check show a normal change in the brake fluid pressure.

However, if a valve-open defect of the FL LCV 82 occurs in the system, the sensor output pFL during the BBW control check does not indicate a linear change of the brake fluid pressure in response to the given drive signal, and the other sensor outputs pFR, pRR and pRL during the BBW control check show a normal change in the brake fluid pressure.

As described above, when a malfunction indicated by malfunction No. 32 occurs in the system, the detection result matches with the corresponding stored pattern as in the correlation of FIG. 6. In the correlation of FIG. 5 through FIG. 7, there is no other stored pattern of the sensor outputs which matches with the detection result of the present case. Hence, when the detection result matches with the stored pattern of malfunction No. 32, the ECU 10 determines that the valve-open defect of the FL LCV 82 occurs in the system.

Malfunction No. 33 of FIG. 7 is a type-1 malfunction which may occur in the hydraulic brake pressure control system of FIG. 1. The malfunction position is the FL LCV 92 in the hydraulic brake pressure control system, and the malfunction mode is a valve-closed defect. Even if a valve-closed defect of the FL LCV 92 occurs in the system, all the sensor outputs pMC, pFR, pFL, pRR and pRL during the M/C control check show a normal change in the brake fluid pressure.

However, if a valve-closed defect of the FL LCV 92 occurs in the system, the sensor output pFL during the BBW control check does not indicate a drop of the brake fluid pressure, and the other sensor outputs pFR, pRR and pRL during the BBW control check show a normal change in the brake fluid pressure.

As described above, when a malfunction indicated by malfunction No. 33 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 33, the ECU 10 determines that the valve-closed defect of the FL LCV 92 occurs in the system.

Malfunction No. 34 of FIG. 7 is a type-2 malfunction which may occur in the hydraulic brake pressure control system of FIG. 1. The malfunction position is the RMCV 58 in the hydraulic brake pressure control system, and the malfunction mode is a valve-open defect. Even if a valve-open defect of the RMCV 58 occurs in the system, all the sensor outputs pMC, pFR, pFL, pRR and pRL during the M/C control check show a normal change in the brake fluid pressure.

However, if a valve-open defect of the RMCV 58 occurs in the system, the sensor output pRR during the BBW control check does not indicate a rise of the brake fluid pressure, and the other sensor outputs pFR, pFL and pRL during the BBW control check show a normal change in the brake fluid pressure.

Malfunction No. 35 of FIG. 7 is a type-2 malfunction which may occur in the hydraulic brake pressure control system of FIG. 1. The malfunction position is the RR LCV 86 in the hydraulic brake pressure control system, and the malfunction mode is a valve-closed defect. Even if a valve-closed defect of the RR LCV 86 occurs in the system, all the sensor outputs pMC, pFR, pFL, pRR and pRL during the M/C control check show a normal change in the brake fluid pressure.

However, if a valve-closed defect of the RR LCV 86 occurs in the system, the sensor output pRR during the BBW control check does not indicate a rise of the brake fluid pressure, and the other sensor outputs pFR, pFL and pRL during the BBW control check show a normal change in the brake fluid pressure.

As described above, when a malfunction indicated by one of malfunction No. 34 and malfunction No. 35 occurs in the system, the detection result matches with the corresponding stored pattern as in the correlation of FIG. 7. When the detection result matches with the stored pattern of malfunction No. 34 and malfunction No. 35, the ECU 10 determines that a malfunction position and a malfunction mode of the malfunction of concern is not properly detected by the malfunction determination process of the step 118. Hence, the ECU 10 at the step 128 performs a judgment process 5 as in the correlation of FIG. 7, in order to detect a malfunction position and a malfunction mode of the malfunction of concern.

Figure 12:
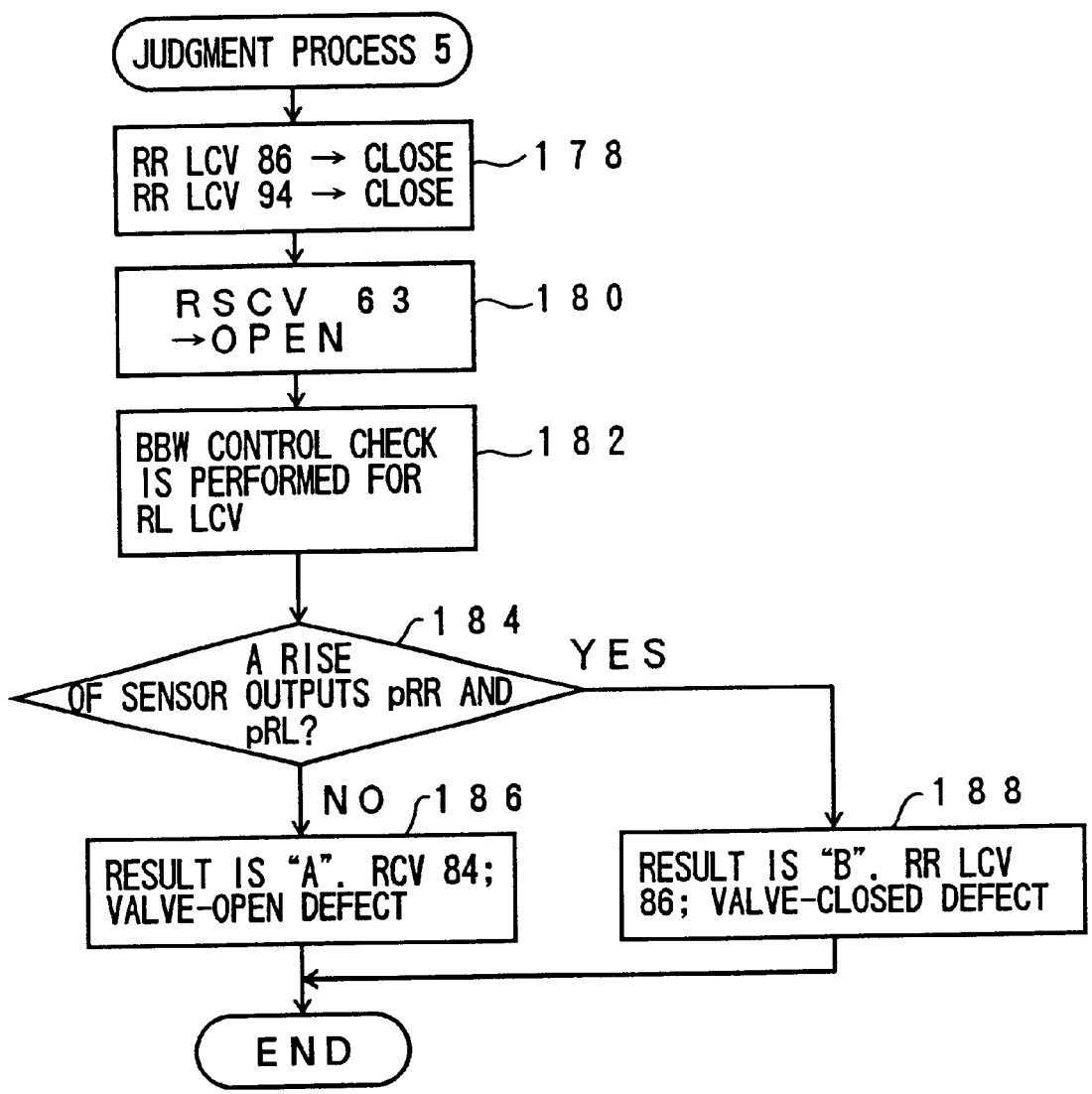
FIG. 12 is a flowchart for explaining a judgment process 5 performed by the control unit of the hydraulic brake pressure control system of FIG. 1.

FIG. 12 shows the judgment process 5 performed at the step 128 by the ECU 10 of the hydraulic brake pressure control system of FIG. 1.

As shown in FIG. 12, at the start of the judgment process 5, the ECU 10 at step 178 maintains the RR LCV 86 and the RR LCV 94 in the valve-closed state.

The ECU 10 at step 180 maintains the RSCV 63 in the valve-open state. After the step 180 is performed, the RR connecting path 59 and the RL connecting path 60 are connected to each other by the RSCV 63 in the valve-open state.

The ECU 10 at step 182 performs the BBW control check for the RL wheel cylinder 64. Specifically, during the BBW control check of the step 182, the RMCV 58 is maintained in the valve-closed state, and the RL LCV 88 and the RL LCV 96 are electrically controlled by supplying the given drive signals thereto.

The ECU 10 at step 184 detects whether the sensor outputs pRR and pRL as a result of the BBW control check of the step 182 indicate a proper rise of the brake fluid pressure in the wheel cylinders 61 and 64.

If the RMCV 58 is properly maintained in the valve-closed state during the BBW control check of the step 182, the brake fluid pressure in the wheel cylinders 61 and 64 properly rise. In this condition, the sensor outputs pRR and pRL as the detection result of the step 184 indicate a proper rise in the brake fluid pressure. Hence, when the result at the step 184 is affirmative, it is determined that the RMCV 58 is operating normally and a valve-open defect of the RMCV 58 does not occur in the system. Then, the ECU 10 proceeds to the next step 188.

If the RMCV 58 is improperly maintained in the valve-open state during the BBW control check of the step 182, the brake fluid pressure in the wheel cylinders 61 and 64 does not properly rise. In this condition, the sensor outputs pRR and pRL as the detection result of the step 184 do not indicate a proper rise in the brake fluid pressure. Hence, when the result at the step 184 is negative, it is determined that a valve-open defect of the RMCV 58 occurs in the system. Then, the ECU 10 proceeds to the next step 186.

When the result at the step 184 is negative, the ECU 10 at step 186 determines that the result of the judgment process 5 is "A". Specifically, the ECU 10 determines that the malfunction position is the RMCV 58 and the malfunction mode is the valve-open defect. After the step 186 is performed, the judgment process 5 of FIG. 12 ends.

When the result at the step 184 is affirmative, the ECU 10 at step 188 determines that the result of the judgment process 5 is "B". As described above, the precondition for the judgment process 5 of FIG. 12 is that the malfunction of concern is either malfunction No. 34 or malfunction No. 35. Hence, the ECU 10 can determine that the malfunction position is the RR LCV 86 and the malfunction mode is the valve-closed defect. After the step 188 is performed, the judgment process 5 of FIG. 12 ends. According to the judgment process 5 of the present embodiment, it is possible to accurately determine whether the malfunction of concern is malfunction No. 34 (a valve-open defect of the RMCV 58) or malfunction No. 35 (a valve-closed defect of the RR LCV 86).

Malfunction No. 36 of FIG. 7 is a type-1 malfunction which may occur in the hydraulic brake pressure control system of FIG. 1. The malfunction position is the RR LCV 86 in the hydraulic brake pressure control system, and the malfunction mode is a valve-open defect. Even if a valve-open defect of the RR LCV 86 occurs in the system, all the sensor outputs pMC, pFR, pFL, pRR and pRL during the M/C control check show a normal change in the brake fluid pressure.

However, if a valve-open defect of the RR LCV 86 occurs in the system, the sensor output pRR during the BBW control check does not indicate a linear change of the brake fluid pressure in response to the given drive signal, and the other sensor outputs pFR, pFL and pRL during the BBW control check show a normal change in the brake fluid pressure.

As described above, when a malfunction indicated by malfunction No. 36 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 36, the ECU 10 determines that the valve-open defect of the RR LCV 86 occurs in the system.

Malfunction No. 37 of FIG. 7 is a type-1malfunction which may occur in the hydraulic brake pressure control system of FIG. 1. The malfunction position is the RR LCV 94 in the hydraulic brake pressure control system, and the malfunction mode is a valve-closed defect. Even if a valve-closed defect of the RR LCV 94 occurs in the system, all the sensor outputs pMC, pFR, pFL, pRR and pRL during the M/C control check show a normal change in the brake fluid pressure.

However, if a valve-closed defect of the RR LCV 94 occurs in the system, the sensor output pRR during the BBW control check does not indicate a drop of the brake fluid pressure, and the other sensor outputs pFR, pFL and pRL during the BBW control check show a normal change in the brake fluid pressure.

As described above, when a malfunction indicated by malfunction No. 37 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 37, the ECU 10 determines that the valve-open defect of the RR LCV 94 occurs in the system.

Malfunction No. 38 of FIG. 7 is a type-1 malfunction which may occur in the hydraulic brake pressure control system of FIG. 1. The malfunction position is the RL LCV 88 in the hydraulic brake pressure control system, and the malfunction mode is a valve-closed defect. Even if a valve-closed defect of the RL LCV 88 occurs in the system, all the sensor outputs pMC, pFR, pFL, pRR and pRL during the M/C control check show a normal change in the brake fluid pressure.

However, if a valve-closed defect of the RL LCV 88 occurs in the system, the sensor output pRL during the BBW control check does not indicate a rise of the brake fluid pressure, and the other sensor outputs pFR, pFL and pRR during the BBW control check show a normal change in the brake fluid pressure.

As described above, when a malfunction indicated by malfunction No. 38 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 38, the ECU 10 determines that the valve-open defect of the RL LCV 88 occurs in the system.

Malfunction No. 39 of FIG. 7 is a type-1 malfunction which may occur in the hydraulic brake pressure control system of FIG. 1. The malfunction position is the RL LCV 88 in the hydraulic brake pressure control system, and the malfunction mode is a valve-open defect. Even if a valve-open defect of the RL LCV 88 occurs in the system, all the sensor outputs pMC, pFR, pFL, pRR and pRL during the M/C control check show a normal change in the brake fluid pressure.

However, if a valve-open defect of the RL LCV 88 occurs in the system, the sensor output pRL during the BBW control check does not indicate a linear change of the brake fluid pressure in response to the given drive signal, and the other sensor outputs pFR, pFL and pRR during the BBW control check show a normal change in the brake fluid pressure.

As described above, when a malfunction indicated by malfunction No. 39 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 39, the ECU 10 determines that the valve-open defect of the RL LCV 88 occurs in the system.

Malfunction No. 40 of FIG. 7 is a type-1 malfunction which may occur in the hydraulic brake pressure control system of FIG. 1. The malfunction position is the RL LCV 96 in the hydraulic brake pressure control system, and the malfunction mode is a valve-closed defect. Even if a valve-closed defect of the RL LCV 96 occurs in the system, all the sensor outputs pMC, pFR, pFL, pRR and pRL during the M/C control check show a normal change in the brake fluid pressure.

However, if a valve-closed defect of the RL LCV 96 occurs in the system, the sensor output pRL during the BBW control check does not indicate a drop of the brake fluid pressure, and the other sensor outputs pFR, pFL and pRR during the BBW control check show a normal change in the brake fluid pressure.

As described above, when a malfunction indicated by malfunction No. 40 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 40, the ECU 10 determines that the valve-closed defect of the RL LCV 96 occurs in the system.

Malfunction No. 41 of FIG. 7 is a type-1 malfunction which may occur in the hydraulic brake pressure control system of FIG. 1. The malfunction position is the FSCV 55 in the hydraulic brake pressure control system, and the malfunction mode is a valve-open defect. Even if a valve-open defect of the FSCV 55 occurs in the system, all the sensor outputs pMC, pFR, pFL, pRR and pRL during the M/C control check show a normal change in the brake fluid pressure.

However, if a valve-open defect of the FSCV 55 occurs in the system, the sensor outputs pFR and pFL during the BBW control check show a common change in the brake fluid pressure, and the other sensor outputs pRR and pRL during the BBW control check show a normal change in the brake fluid pressure.

As described above, when a malfunction indicated by malfunction No. 41 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 41, the ECU 10 determines that the valve-open defect of the FSCV 55 occurs in the system.

Malfunction No. 42 of FIG. 7 is a type-1malfunction which may occur in the hydraulic brake pressure control system of FIG. 1. The malfunction position is the FCV 79 in the hydraulic brake pressure control system, and the malfunction mode is a valve-closed defect. Even if a valve-closed defect of the FCV 79 occurs in the system, all the sensor outputs pMC, pFR, pFL, pRR and pRL during the M/C control check show a normal change in the brake fluid pressure.

However, if a valve-closed defect of the FCV 79 occurs in the system, the sensor outputs pFR and pFL during the BBW control check do not indicate a change in the brake fluid pressure, and the other sensor outputs pRR and pRL during the BBW control check show a normal change in the brake fluid pressure.

As described above, when a malfunction indicated by malfunction No. 42 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 42, the ECU 10 determines that the valve-closed defect of the FCV 79 occurs in the system.

Malfunction No. 43 of FIG. 7 is a type-1 malfunction which may occur in the hydraulic brake pressure control system of FIG. 1. The malfunction position is the RSCV 63 in the hydraulic brake pressure control system, and the malfunction mode is a valve-open defect. Even if a valve-open defect of the RSCV 63 occurs in the system, all the sensor outputs pMC, pFR, pFL, pRR and pRL during the M/C control check show a normal change in the brake fluid pressure.

However, if a valve-open defect of the RSCV 63 occurs in the system, the sensor outputs pRR and pRL during the BBW control check show a common change in the brake fluid pressure, and the other sensor outputs pFR and pFL during the BBW control check show a normal change in the brake fluid pressure.

As described above, when a malfunction indicated by malfunction No. 43 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 43, the ECU 10 determines that the valve-open defect of the RSCV 63 occurs in the system.

Malfunction No. 44 of FIG. 7 is a type-1 malfunction which may occur in the hydraulic brake pressure control system of FIG. 1. The malfunction position is the RCV 84 in the hydraulic brake pressure control system, and the malfunction mode is a valve-closed defect. Even if a valve-closed defect of the RCV 84 occurs in the system, all the sensor outputs pMC, pFR, pFL, pRR and pRL during the M/C control check show a normal change in the brake fluid pressure.

However, if a valve-closed defect of the RCV 84 occurs in the system, the sensor outputs pRR and pRL during the BBW control check do not indicate a change in the brake fluid pressure, and the other sensor outputs pFR and pFL during the BBW control check show a normal change in the brake fluid pressure.

As described above, when a malfunction indicated by malfunction No. 44 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 44, the ECU 10 determines that the valve-closed defect of the RCV 84 occurs in the system.

Malfunction No. 45 of FIG. 7 is a type-3 malfunction which may occur in the hydraulic brake pressure control system of FIG. 1. The malfunction position is the FCV 79 in the hydraulic brake pressure control system, and the malfunction mode is a valve-open defect. When the M/C control check is performed at the step 112, the ECU 10 sets the FCV 79 in the valve-closed state. If a valve-open defect of the FCV 79 occurs in the system, the accumulator pressure Pacc from the accumulator 72 is supplied to the FR LCV 80 and the FL LCV 82 through the defective FCV 79 during the M/C control check.

However, during the M/C control check, the FR LCV 80 and the FL LCV 82 are set in the valve-closed state, and the accumulator pressure Pacc does not arrive at the wheel cylinders 53 and 56. The malfunction of concern (which is the valve-open defect of the FCV 79 in the system) does not influence the sensor outputs related to the four wheel cylinders and the master cylinder 16. In this condition, all the sensor outputs pMC, pFR, pFL, pRR and pRL during the M/C control check show a normal change in the brake fluid pressure.

When the BBW control check is performed at the step 112, the ECU 10 sets the FCV 79 in the valve-open state. The malfunction of concern (which is the valve-open defect of the FCV 79) does not influence the sensor outputs during the BBW control check. In this condition, the sensor outputs pFR, pFL, pRR and pRL during the BBW control check show a normal change in the brake fluid pressure.

As described above, when a malfunction indicated by malfunction No. 45 occurs in the system, the detection result matches with the corresponding stored pattern as in the correlation of FIG. 7. When the detection result matches with the stored pattern of malfunction No. 45, the ECU 10 determines that the occurrence of the malfunction of concern is not properly detected by the step 118. Hence, the ECU 10 at the step 130 performs a judgment process 6 as in the correlation of FIG. 7, in order to detect the occurrence of the malfunction of concern, if any, and a malfunction position and a malfunction mode of the malfunction of concern.

Figure 13:
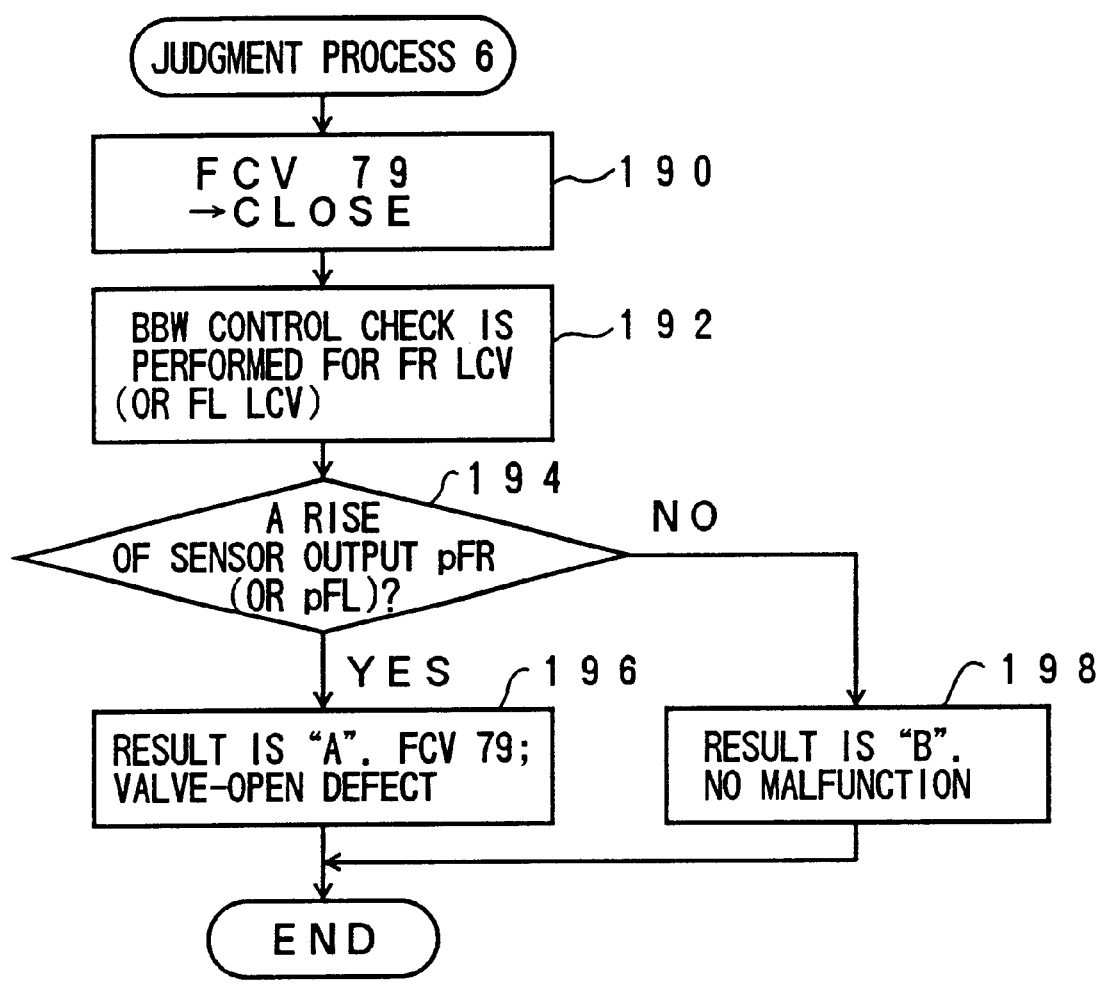
FIG. 13 is a flowchart for explaining a judgment process 6 performed by the control unit of the hydraulic brake pressure control system of FIG. 1.

FIG. 13 shows the judgment process 6 performed at the step 130 by the ECU 10 of the hydraulic brake pressure control system of FIG. 1.

As shown in FIG. 13, at the start of the judgment process 6, the ECU 10 at step 190 maintains the FCV 79 in the valve-closed state. If a valve-open defect of the FCV 79 does not occur in the hydraulic brake pressure control system of FIG. 1, the FCV 79 is properly set in the valve-closed state at the step 190. If the valve-open defect of the FCV 79 occurs in the system, the FCV 79 is improperly set in the valve-open state at the step 190.

The ECU 10 at step 192 performs the BBW control check for the FR wheel cylinder 53 (or the FL wheel cylinder 56). Specifically, during the BBW control check of the step 192, the FCV 79 is maintained in the valve-closed state, and the FR LCV 80 and the FR LCV 90 (or the FL LCV 82 and the FL LCV 92) are electrically controlled by supplying the given drive signals thereto.

The ECU 10 at step 194 detects whether the sensor output pFR (or pFL) as a result of the BBW control check of the step 192 indicates a proper rise of the brake fluid pressure in the FR wheel cylinder 53 (or the FL wheel cylinder 56). If the FCV 79 is maintained in the valve-closed state during the BBW control check of the step 192, the brake fluid pressure (Pacc) from the accumulator 72 is not supplied through the FCV 79 to the wheel cylinder 53 (or the wheel cylinder 56). In this condition, the sensor output pFR (or pFL) as the detection result does not indicate a rise in the brake fluid pressure of the wheel cylinder 53 (or the wheel cylinder 56). If the FCV 79 is improperly maintained in the valve-open state during the BBW control check of the step 192, the brake fluid pressure (Pacc) from the accumulator 72 is supplied through the defective FCV 79 to the wheel cylinder 53 (or the wheel cylinder 56). In this condition, the sensor output pFR (or pFL) as the detection result indicates a rise in the brake fluid pressure of the wheel cylinder 53 (or the wheel cylinder 56).

Hence, when the result at the step 194 is negative (that is, when the sensor output pFR during the BBW control check does not indicate a rise of the brake fluid pressure in the wheel cylinder 53), the ECU 10 determines that the FCV 79 is actually set in the valve-closed state, and a valve-open defect of the FCV 79 does not occur in the system. Then the ECU 10 proceeds to the next step 198.

The ECU 10 at step 198 determines that the result of the judgment process 6 is "B". Specifically, the ECU 10 determines that no malfunction has occurred in the hydraulic brake pressure control system. After the step 198 is performed, the judgment process 6 of FIG. 13 ends.

When the result at the step 194 is affirmative (that is, when the sensor output pFR during the BBW control check indicates a rise of the brake fluid pressure in the wheel cylinder 53), it is determined that the FCV 79 is improperly maintained in the valve-open state during the BBW control check. Hence, the ECU 10 determines that the FCV 79 is defective and a valve-open defect of the FCV 79 occurs in the system. Then, the ECU 10 proceeds to the next step 196.

The ECU 10 at step 196 determines that the result of the judgment process 6 is "A". Specifically, the ECU 10 determines that the malfunction position is the FCV 79, and the malfunction mode is a valve-open defect. After the step 196 is performed, the judgment process 6 of FIG. 13 ends. According to the judgment process 6 of the present embodiment, it is possible to accurately determine whether or not the malfunction of concern is malfunction No. 45 (a valve-open defect of the FCV 79).

Malfunction No. 46 of FIG. 7 is a type-3 malfunction which may occur in the hydraulic brake pressure control system of FIG. 1. The malfunction position is the RCV 84 in the hydraulic brake pressure control system, and the malfunction mode is a valve-open defect. Similar to malfunction No. 45, all the sensor outputs pMC, pFR, pFL, pRR and pRL during the M/C control check show a normal change in the brake fluid pressure, and all the sensor outputs pFR, pFL, pRR and pRL during the BBW control check show a normal change in the brake fluid pressure.

As described above, when a malfunction indicated by malfunction No. 46 occurs in the system, the detection result matches with the corresponding stored pattern as in the correlation of FIG. 7. When the detection result matches with the stored pattern of malfunction No. 46, the ECU 10 determines that the occurrence of the malfunction of concern is not properly detected by the step 118. Hence, the ECU 10 at the step 130 performs a judgment process 7 as in the correlation of FIG. 7, in order to detect the occurrence of the malfunction of concern, if any, and a malfunction position and a malfunction mode of the malfunction of concern.

Figure 14:
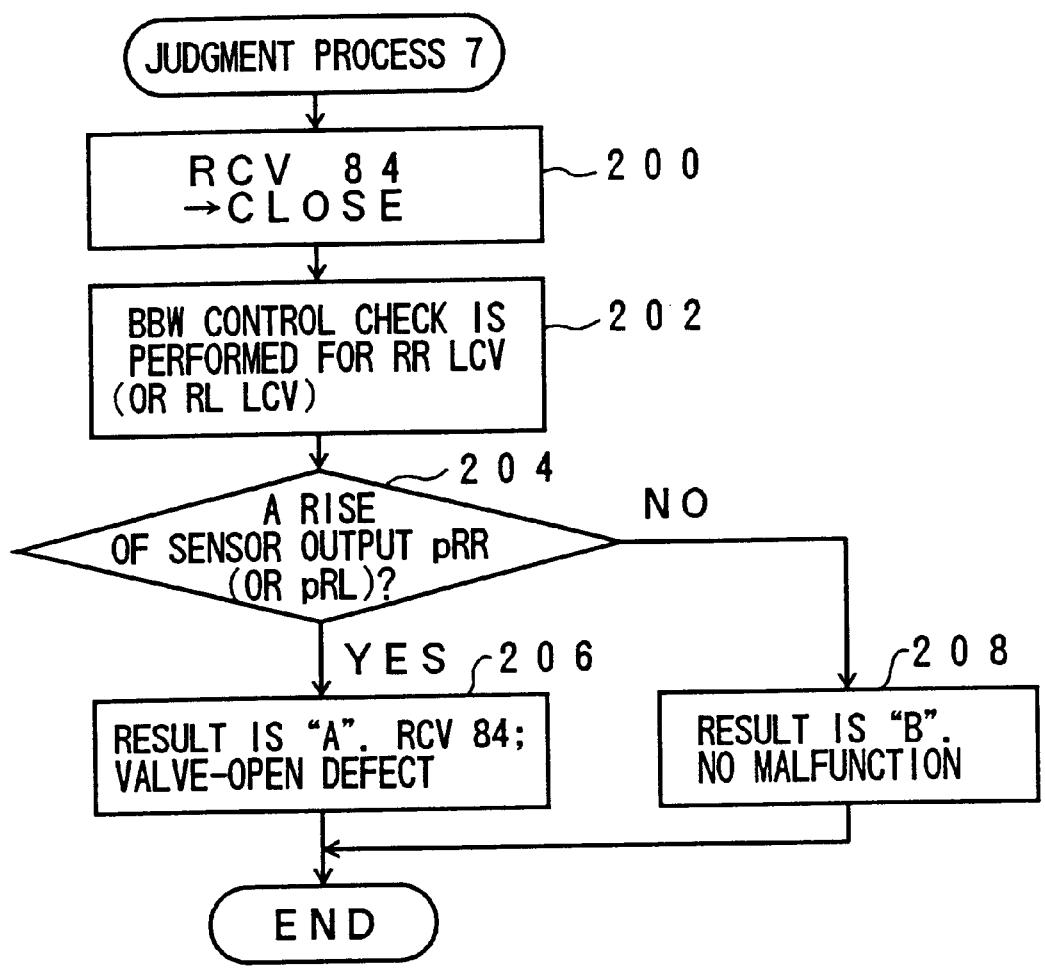
FIG. 14 is a flowchart for explaining a judgment process 7 performed by the control unit of the hydraulic brake pressure control system of FIG. 1.

FIG. 14 shows the judgment process 7 performed at the step 130 by the ECU 10 of the hydraulic brake pressure control system of FIG. 1.

As shown in FIG. 14, at the start of the judgment process 7, the ECU 10 at step 200 maintains the RCV 84 in the valve-closed state. If a valve-open defect of the RCV 84 does not occur in the hydraulic brake pressure control system of FIG. 1, the RCV 84 is properly set in the valve-closed state at the step 200. If the valve-open defect of the RCV 84 occurs in the system, the RCV 84 is improperly set in the valve-open state at the step 200.

The ECU 10 at step 202 performs the BBW control check for the RR wheel cylinder 61 (or the RL wheel cylinder 64). Specifically, during the BBW control check of the step 202, the RCV 84 is maintained in the valve-closed state, and the RR LCV 86 and the RR LCV 94 (or the RL LCV 88 and the RL LCV 96) are electrically controlled by supplying the given drive signals thereto.

The ECU 10 at step 204 detects whether the sensor output pRR (or pRL) as a result of the BBW control check of the step 202 indicates a rise of the brake fluid pressure in the wheel cylinder 61 (or the wheel cylinder 64). If the RCV 84 is maintained in the valve-closed state during the BBW control check of the step 202, the brake fluid pressure (Pacc) from the accumulator 72 is not supplied through the RCV 84 to the wheel cylinder 61 (or the wheel cylinder 64). In this condition, the sensor output pRR (or pRL) as the detection result does not indicate a rise in the brake fluid pressure of the wheel cylinder 61 (or the wheel cylinder 64). If the RCV 84 is improperly maintained in the valve-open state during the BBW control check of the step 202, the brake fluid pressure (Pacc) from the accumulator 72 is supplied through the defective RCV 84 to the wheel cylinder 61 (or the wheel cylinder 64). In this condition, the sensor output pRR (or pRL) as the detection result indicates a rise in the brake fluid pressure of the wheel cylinder 61 (or the wheel cylinder 64).

Hence, when the result at the step 204 is negative (that is, when the sensor output pRR during the BBW control check does not indicate a rise of the brake fluid pressure in the wheel cylinder 61), the ECU 10 determines that the RCV 84 is actually set in the valve-closed state, and a valve-open defect of the RCV 84 does not occur in the system. Then the ECU 10 proceeds to the next step 208.

The ECU 10 at step 208 determines that the result of the judgment process 7 is "B". Specifically, the ECU 10 determines that no malfunction has occurred in the hydraulic brake pressure control system. After the step 208 is performed, the judgment process 7 of FIG. 14 ends.

When the result at the step 204 is affirmative (that is, when the sensor output pRR during the BBW control check indicates a rise of the brake fluid pressure in the wheel cylinder 61), it is determined that the RCV 84 is improperly maintained in the valve-open state during the BBW control check. Hence, the ECU 10 determines that the RCV 84 is defective and a valve-open defect of the RCV 84 occurs in the system. Then, the ECU 10 proceeds to the next step 206.

The ECU 10 at step 206 determines that the result of the judgment process 7 is "A". Specifically, the ECU 10 determines that the malfunction position is the RCV 84, and the malfunction mode is a valve-open defect. After the step 206 is performed, the judgment process 7 of FIG. 14 ends. According to the judgment process 7 of the present embodiment, it is possible to accurately determine whether or not the malfunction of concern is malfunction No. 45 (a valve-open defect of the RCV 84).

Malfunction No. 47 of FIG. 7 is a type-3 malfunction which may occur in the hydraulic brake pressure control system of FIG. 1. The malfunction position is the mechanical pressure-increase valve 26 in the hydraulic brake pressure control system, and the malfunction mode is a "Pacc leak" defect. This "Pacc leak" defect occurs if the ball valve 41 (FIG. 2) is improperly fixed to the valve-open position and the accumulator pressure Pacc from the accumulator 72 leaks into the pressure adjusting chamber 45 of the valve 26.

Similar to malfunction No. 45, when a malfunction indicated by malfunction No. 47 occurs in the system, all the sensor outputs pMC, pFR, pFL, pRR and pRL during the M/C control check show a normal change in the brake fluid pressure, and all the sensor outputs pFR, pFL, pRR and pRL during the BBW control check show a normal change in the brake fluid pressure.

As described above, when a malfunction indicated by malfunction No. 47 occurs in the system, the detection result matches with the corresponding stored pattern as in the correlation of FIG. 7. When the detection result matches with the stored pattern of malfunction No. 47, the ECU 10 determines that the occurrence of the malfunction of concern is not properly detected by the step 118. Hence, the ECU 10 at the step 130 performs a judgment process 8 as in the correlation of FIG. 7, in order to detect the occurrence of the malfunction of concern, if any, and a malfunction position and a malfunction mode of the malfunction of concern.

Figure 15:
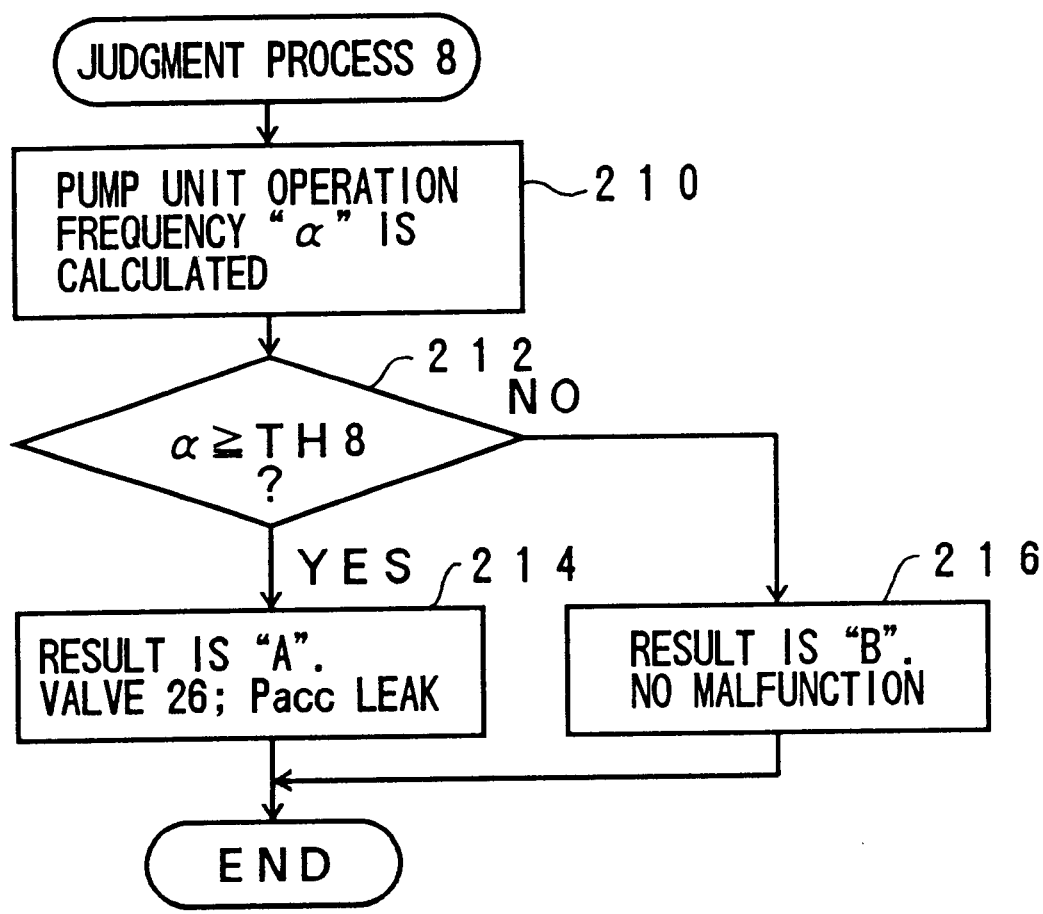
FIG. 15 is a flowchart for explaining a judgment process 8 performed by the control unit of the hydraulic brake pressure control system of FIG. 1.

FIG. 15 shows the judgment process 8 performed at the step 130 by the ECU 10 of the hydraulic brake pressure control system of FIG. 1.

As shown in FIG. 15, at the start of the judgment process 8, the ECU 10 at step 210 calculates an operation frequency "α" of the pump unit 68. Specifically, the operation frequency "α" is calculated by the number of operations of the pump unit 68 within a given preceding time period.

The ECU 10 at step 212 detects whether the operation frequency α of the pump unit 68 is larger than a predetermined threshold value TH8. When the result at the step 212 is affirmative ($\alpha \geq TH8$), it is determined that a large amount of the brake fluid (at the accumulator pressure Pacc) is supplied to the hydraulic circuit having the four wheel cylinders by the pump unit 68 and the accumulator 72. In the present embodiment, it is supposed that the "Pacc leak" defect causes a large amount of the brake fluid to be supplied to the hydraulic circuit. Hence, when the result at the step 212 is affirmative, the ECU 10 determines that the "Pacc leak" defect occurs in the system, and the ECU 10 proceeds to the next step 214.

When the result at the step 204 is negative (that is, when the operation frequency a is not larger than TH8), it is determined that the mechanical pressure-increase valve 26 is operating normally and no malfunction has occurred in the system. Hence, the ECU 10 proceeds to the next step 216.

The ECU 10 at step 216 determines that the result of the judgment process 8 is "B". Specifically, the ECU 10 determines that no malfunction has occurred in the system. After the step 216 is performed, the judgment process 8 of FIG. 15 ends.

The ECU 10 at step 214 determines that the result of the judgment process 8 is "A". Specifically, the ECU 10 determines that the malfunction position is the mechanical pressure-increase valve 26, and the malfunction mode is a "Pacc leak" defect. After the step 214 is performed, the judgment process 8 of FIG. 15 ends. According to the judgment process 8 of the present embodiment, it is possible to accurately determine whether or not the malfunction of concern is malfunction No. 47 (a "Pacc leak" defect of the valve 26).

Malfunction No. 48 of FIG. 7 is a type-1 malfunction which may occur in the hydraulic brake pressure control system of FIG. 1. The malfunction position is the mechanical pressure-increase valve 26 in the hydraulic brake pressure control system, and the malfunction mode is a rapid "Pacc leak". When the rapid "Pacc leak" occurs in the system, the brake fluid pressure in the pressure adjusting chamber 46 of the valve 26 is higher than the atmospheric pressure if the brake pedal 12 is not depressed by the vehicle operator. When the operator starts depressing the brake pedal 12, the master cylinder 16 is closed off from the reservoir tank 18, and then the brake fluid pressure in the pressure adjusting chamber 46 rapidly rises to almost the accumulator pressure Pacc.

When the M/C control check is performed upon the occurrence of the rapid "Pacc leak" defect, the brake fluid pressure of the first hydraulic path 20 and the boosted pressure Pb of the mechanical pressure-increase valve 26 are rapidly increased. Hence, the sensor outputs pMC, pFR and pFL during the M/C control check show a rapid increase of the brake fluid pressure and only the sensor outputs pRR and pRL during the M/C control check show a proper change in the brake fluid pressure.

When a malfunction indicated by malfunction No. 48 occurs in the system, the malfunction of concern (which is a rapid "Pacc leak" of the mechanical pressure-increase valve 26) does not influence the sensor outputs pFR, pFL, pRR and pRL during the BBW control check. The sensor outputs pFR, pFL, pRR and pRL during the BBW control check show a normal change in the brake fluid pressure.

As described above, when a malfunction indicated by malfunction No. 48 occurs in the system, the detection result matches with the corresponding stored pattern as in the correlation of FIG. 7. In the correlation of FIG. 5 through FIG. 7, there is no other stored pattern of the sensor outputs which matches with the detection result of the present case. Hence, when the detection result matches with the stored pattern of malfunction No. 48, the ECU 10 at the step 118 determines that the rapid "Pacc leak" of the mechanical pressure-increase valve 26 occurs in the system.

According to the above-described malfunction/countermeasure determination control process of FIG. 3 and FIG. 4, when a malfunction occurs in the hydraulic brake pressure control system of FIG. 1, it is possible to accurately detect the malfunction position/mode of the malfunction by performing the steps 118, 128 and 130.

In the above-described malfunction determination process of the step 118, the detected pattern of the BBW check sensor outputs (pFR, pFL, pRR and PRL) and the M/C check sensor outputs (pMC, pFR, pFL, pRR and pRL) is compared with the stored pattern. However, in order to detect the malfunction position/mode of some of the type-1 malfunctions shown in FIG. 5 through FIG. 7, it is not necessarily needed for the ECU 10 to compare the detected pattern of both the BBW check sensor outputs and the M/C check sensor outputs with the stored pattern.

For example, in the cases of the type-1 malfunction Nos. 7, 8, 14–18, 21–23 and 26 in the correlation of FIG. 5 through FIG. 7, the ECU 10 may compare the detection result of only the M/C check sensor outputs with the stored pattern in order to detect the malfunction position/mode of the malfunction of concern. In these cases, the comparison of the detection result of the BBW check sensor outputs with the stored pattern may be omitted. Also, in the cases of the type-1 malfunction Nos. 30, 33, 37, and 40–44 in the correlation of FIG. 5 through FIG. 7, the ECU 10 may compare the detection result of only the BBW check sensor outputs with the stored pattern in order to detect the malfunction position/mode of the malfunction of concern. In these cases, the comparison of the detection result of the M/C check sensor outputs with the stored pattern may be omitted.

According to the above-described malfunction/countermeasure determination control process of FIG. 3 and FIG. 4, when a malfunction occurs in the hydraulic brake pressure control system of FIG. 1, it is possible to accurately detect a malfunction position and a malfunction mode of the malfunction by performing the steps 118, 128 and 130. After the malfunction position/mode of the malfunction are detected by the steps 118, 128 and 130, the ECU 10 at the step 126 performs a countermeasure process in response to the occurrence of the malfunction of concern. As previously described, the plurality of countermeasure processes for individual malfunctions which may occur in the system of FIG. 1 are stored in the memory of the ECU 10. At the start of the step 126, the ECU 10 selects one of the stored countermeasure processes for the malfunction of concern such that the malfunction position/mode detected by the steps 118, 128 and 130 matches with the malfunction position/mode of one of the stored countermeasure processes. Then, the ECU 10 performs the selected countermeasure process in response to the occurrence of the malfunction of concern.

FIG. 16 through FIG. 25 show various countermeasure processes for individual malfunctions performed at the step 126 by the ECU 10 of the hydraulic brake pressure control system of FIG. 1.

In FIG. 16 through FIG. 25, each of individual malfunctions, which may occur in the system of FIG. 1, is identified by "MALFUNCTION No.", "MALFUNCTION POSITION" and "MALFUNCTION MODE". In FIG. 16 through FIG. 25, "CONTROL METHOD" denotes the brake pressure control method (the M/C control method or the BBW control method) which is executed by the ECU 10 when a braking request for the four wheel cylinders is sent to the system of FIG. 1 by the vehicle, and "BBW BASE PRESSURE" denotes the sensor output (pMC, pRR, pFR, etc.) which is used as the base pressure of the BBW control method when a braking operation of the vehicle operator causes the execution of the BBW control method.

As shown in FIG. 16, when the malfunction position/mode of a malfunction indicated by malfunction No. 1 (the "no pressure rise" defect of the rear internal pressure chamber of the master cylinder 16) are detected, the countermeasure process performed at the step 128 by the ECU 10 is to maintain the RMCV 58 in the valve-closed state. By this countermeasure process, the defective pressure chamber of the master cylinder 16 is cut off from the hydraulic circuit including the four wheel cylinders. It is possible to prevent the flow of brake fluid containing air from the defective master cylinder 16 into the rear wheel cylinders.

After the countermeasure process is performed, when the brake pedal 12 is depressed by the vehicle operator, the ECU 10 detects a brake pedal pressure based on the sensor output pMC and calculates a target wheel cylinder pressure for each of the wheel cylinders from the brake pedal pressure. The ECU 10 performs the BBW control method for the four wheel cylinders by using the sensor output pMC as the base pressure. That is, the ECU 10 electrically controls the LCV 80, 82, 86 and 88 and the LCV 90, 92, 94 and 96 such that the output signals pFR, pFL, pRR and pRL of the pressure sensors 54, 57, 62 and 65 match with the target wheel cylinder pressure. Similar to the normal process, the hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 7 (the "pressure fixed" defect of the rear internal pressure chamber of the master cylinder 16) are detected, the countermeasure process performed at the step 128 by the ECU 10 is to maintain the RMCV 58 in the valve-closed state, which is the same as that of malfunction No. 1. After the countermeasure process is performed, the hydraulic brake pressure control system of FIG. 1 can maintain the wheel cylinder pressure of each of the wheel cylinders at a controlled level by performing the BBW control method.

When the malfunction position/mode of a malfunction indicated by malfunction No. 9 (the "no pressure rise" defect of the front internal pressure chamber of the master cylinder 16) are detected, the countermeasure process performed at the step 128 by the ECU 10 is to maintain the RR LCV 86, the RR LCV 94 and the RSCV 63 in the valve-closed state, and maintain the RMCV 58 in the valve-open state. By this countermeasure process, the RR connecting path 59 is cut off from the RL connecting path 60, and the brake fluid pressure ($P_{M/C}$) from the master cylinder 16 is supplied to the RR wheel cylinder 61.

After the countermeasure process is performed, when the brake pedal 12 is depressed by the vehicle operator, the ECU 10 performs the M/C control method to control the wheel cylinder pressure of the RR wheel cylinder 61. Because of the malfunction in the system, the sensor output pMC from the sensor 24 is not available. In this case, the sensor output pRR is equal to the master cylinder pressure $P_{M/C}$. The sensor output pRR is used as the base pressure of the BBW control method. The ECU 10 performs the BBW control method for the other wheel cylinders by using the sensor output pRR as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 14 (the "pressure fixed" defect of the front internal pressure chamber of the master cylinder 16) are detected, the countermeasure process performed at the step 128 by the ECU 10 is the same as that of malfunction No. 9 above. After the countermeasure process is performed, the hydraulic brake pressure control system of FIG. 1 can maintain the wheel cylinder pressure of each of the wheel cylinders at a controlled level by performing the M/C control method and the BBW control method.

When the malfunction position/mode of a malfunction indicated by malfunction No. 15 (the "inoperative" defect of the $P_{M/C}$ sensor 24) are detected, the countermeasure process performed at the step 128 by the ECU 10 is the same as that of malfunction No. 9 above. After the countermeasure process is performed, the hydraulic brake pressure control system of FIG. 1 can maintain the wheel cylinder pressure of each of the wheel cylinders at a controlled level by performing the M/C control method and the BBW control method.

When the malfunction position/mode of a malfunction indicated by malfunction No. 16 (the "drift" defect of the $P_{M/C}$ sensor 24) are detected, the countermeasure process performed at the step 128 by the ECU 10 is either ACTION 1 or ACTION 2 as shown in FIG. 16. When the amount of the drift or deviation of the sensor output pMC of the sensor 24 is small, the ECU 10 performs the ACTION 1. The ACTION 1 is to correct the sensor output pMC of the sensor 24. Since the drift of the sensor output pMC is small, the ECU can detect accurate master cylinder pressure by correction of the sensor output pMC of the sensor 24. After the countermeasure process is performed, when the brake pedal 12 is depressed by the vehicle operator, the ECU 10 performs the BBW control method for the four wheel cylinders by using the corrected sensor output pMC as the base pressure.

When the amount of the drift or deviation of the sensor output pMC of the sensor 24 is excessively large, the ECU 10 performs the ACTION 2. The ACTION 2 is the same as that of malfunction No. 9. The hydraulic brake pressure control system of FIG. 1 can maintain the wheel cylinder pressure of each of the wheel cylinders at a controlled level by performing the M/C control method and the BBW control method in a manner similar to the case of malfunction No. 9.

When the malfunction position/mode of a malfunction indicated by malfunction No. 17 (the "inoperative" defect of the FR sensor 54) are detected, the countermeasure process performed at the step 128 by the ECU 10 is either ACTION 1 or ACTION 2 as shown in FIG. 16. In accordance with the characteristics or operating conditions of the system, one of the ACTION 1 and the ACTION 2 is predetermined as the countermeasure process in the present case.

The ACTION 1 is to maintain the FR LCV 80, the FR LCV 90 and the FMCV 50 in the valve-closed state and maintain the FSCV 55 in the valve-open state. By this countermeasure process, the FR connecting path 51 and the FL connecting path 52 are connected to each other, and these paths are cut off from the mechanical pressure-increase valve 26. The wheel cylinder pressure in the FR wheel cylinder 53 is always set to be equal to the wheel cylinder pressure in the FL wheel cylinder 56. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

The ACTION 2 is to electrically control the FR LCV 80 and the FR LCV 90 in the same manner as the FL LCV 82 and the FL LCV 92, irrespective of the sensor output pFR of the defective sensor 54. By this countermeasure process, the BBW control method for the FR wheel cylinder is executed in the same manner as the BBW control method executed for the FL wheel cylinder. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

When the malfunction position/mode of a malfunction indicated by malfunction No. 18 (the "drift" defect of the FR sensor 54) are detected, the countermeasure process performed at the step 128 by the ECU 10 is either ACTION 1 or ACTION 2 as shown in FIG. 16. When the amount of the drift or deviation of the sensor output pFR of the sensor 54 is small, the ECU 10 performs the ACTION 1. The ACTION 1 is to correct the sensor output pFR of the sensor 54. Since the drift of the sensor output pFR is small, the ECU can detect accurate wheel cylinder pressure by correction of the sensor output pFR of the sensor 54. After the countermeasure process is performed, when the brake pedal 12 is depressed by the vehicle operator, the ECU 10 performs the BBW control method for the four wheel cylinders by using the sensor output pMC as the base pressure.

When the amount of the drift or deviation of the sensor output pFR of the sensor 54 is excessively large, the ECU 10 performs the ACTION 2. The ACTION 2 is the same as that of malfunction No. 17 (one of the ACTION 1 and the ACTION 2 thereof). The hydraulic brake pressure control system of FIG. 1 can maintain the wheel cylinder pressure of each of the wheel cylinders at a controlled level by performing the BBW control method in a manner similar to the case of malfunction No. 17.

When the malfunction position/mode of a malfunction indicated by malfunction No. 19 (the "inoperative" defect of the FL sensor 57) are detected, the countermeasure process performed at the step 128 by the ECU 10 is either ACTION 1 or ACTION 2 as shown in FIG. 17. In accordance with the characteristics or operating conditions of the system, one of the ACTION 1 and the ACTION 2 is predetermined as the countermeasure process in the present case.

The ACTION 1 is to maintain the FL LCV 82, the FL LCV 92 and the FMCV 50 in the valve-closed state and maintain the FSCV 55 in the valve-open state. By this countermeasure process, the FR connecting path 51 and the FL connecting path 52 are connected to each other, and these paths are cut off from the mechanical pressure-increase valve 26. The wheel cylinder pressure in the FL wheel cylinder 56 is always set to be equal to the wheel cylinder pressure in the FR wheel cylinder 53. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

The ACTION 2 is to electrically control the FL LCV 82 and the FL LCV 92 in the same manner as the FR LCV 80 and the FR LCV 90, irrespective of the sensor output pFL of the defective sensor 57. By this countermeasure process, the BBW control method for the FL wheel cylinder is executed in the same manner as the BBW control method executed for the FR wheel cylinder. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

When the malfunction position/mode of a malfunction indicated by malfunction No. 21 (the "drift" defect of the FL sensor 57) are detected, the countermeasure process performed at the step 128 by the ECU 10 is either ACTION 1 or ACTION 2 as shown in FIG. 17. When the amount of the drift or deviation of the sensor output pFL of the sensor 57 is small, the ECU 10 performs the ACTION 1. The ACTION 1 is to correct the sensor output pFL of the sensor 57. Since the drift of the sensor output pFL is small, the ECU can detect accurate wheel cylinder pressure by correction of the sensor output pFL of the sensor 57. After the countermeasure process is performed, when the brake pedal 12 is depressed by the vehicle operator, the ECU 10 performs the BBW control method for the four wheel cylinders by using the sensor output pMC as the base pressure.

When the amount of the drift or deviation of the sensor output pFL of the sensor 57 is excessively large, the ECU 10 performs the ACTION 2. The ACTION 2 is the same as that of malfunction No. 19 (one of the ACTION 1 and the ACTION 2 thereof). The hydraulic brake pressure control system of FIG. 1 can maintain the wheel cylinder pressure of each of the wheel cylinders at a controlled level by performing the BBW control method in a manner similar to the case of malfunction No. 19.

When the malfunction position/mode of a malfunction indicated by malfunction No. 22 (the "inoperative" defect of the RR sensor 62) are detected, the countermeasure process performed at the step 128 by the ECU 10 is either ACTION 1 or ACTION 2 as shown in FIG. 17. In accordance with the characteristics or operating conditions of the system, one of the ACTION 1 and the ACTION 2 is predetermined as the countermeasure process in the present case.

The ACTION 1 is to maintain the RR LCV 86, the RR LCV 94 and the RMCV 58 in the valve-closed state and maintain the RSCV 63 in the valve-open state. By this countermeasure process, the RR connecting path 59 and the RL connecting path 60 are connected to each other, and these paths are cut off from the master cylinder 16. The wheel cylinder pressure in the RR wheel cylinder 61 is always set to be equal to the wheel cylinder pressure in the RL wheel cylinder 64. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

The ACTION 2 is to electrically control the RR LCV 86 and the RR LCV 94 in the same manner as the RL LCV 88 and the RL LCV 96, irrespective of the sensor output pRR of the defective sensor 62. By this countermeasure process, the BBW control method for the RR wheel cylinder is executed in the same manner as the BBW control method executed for the RL wheel cylinder. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

When the malfunction position/mode of a malfunction indicated by malfunction No. 23 (the "drift" defect of the RR sensor 62) are detected, the countermeasure process performed at the step 128 by the ECU 10 is either ACTION 1 or ACTION 2 as shown in FIG. 17. When the amount of the drift or deviation of the sensor output pRR of the sensor 62 is small, the ECU 10 performs the ACTION 1. The ACTION 1 is to correct the sensor output pRR of the sensor 62. Since the drift of the sensor output pRR is small, the ECU can detect accurate wheel cylinder pressure by correction of the sensor output pRR of the sensor 62. After the countermeasure process is performed, when the brake pedal 12 is depressed by the vehicle operator, the ECU 10 performs the BBW control method for the four wheel cylinders by using the sensor output pMC as the base pressure.

When the amount of the drift or deviation of the sensor output pRR of the sensor 62 is excessively large, the ECU 10 performs the ACTION 2. The ACTION 2 is the same as that of malfunction No. 22 (one of the ACTION 1 and the ACTION 2 thereof). The hydraulic brake pressure control system of FIG. 1 can maintain the wheel cylinder pressure of each of the wheel cylinders at a controlled level by performing the BBW control method in a manner similar to the case of malfunction No. 22.

When the malfunction position/mode of a malfunction indicated by malfunction No. 24 (the "inoperative" defect of the RL sensor 65) are detected, the countermeasure process performed at the step 128 by the ECU 10 is either ACTION 1 or ACTION 2 as shown in FIG. 18. In accordance with the characteristics or operating conditions of the system, one of the ACTION 1 and the ACTION 2 is predetermined as the countermeasure process in the present case.

The ACTION 1 is to maintain the RL LCV 88, the RL LCV 96 and the RMCV 58 in the valve-closed state and maintain the RSCV 63 in the valve-open state. By this countermeasure process, the RR connecting path 59 and the RL connecting path 60 are connected to each other, and these paths are cut off from the master cylinder 16. The wheel cylinder pressure in the RL wheel cylinder 64 is always set to be equal to the wheel cylinder pressure in the RR wheel cylinder 61. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

The ACTION 2 is to electrically control the RL LCV 88 and the RL LCV 96 in the same manner as the RR LCV 86 and the RR LCV 94, irrespective of the sensor output pRL of the defective sensor 65. By this countermeasure process, the BBW control method for the RL wheel cylinder is executed in the same manner as the BBW control method executed for the RR wheel cylinder. After the countermeasure process is performed, when the brake pedal 12 is depressed by the vehicle operator, the ECU 10 performs the BBW control method for the four wheel cylinders by using the sensor output pMC as the base pressure. Even if the malfunction in the present case occurs, the hydraulic brake pressure control system of FIG. 1 can maintain the wheel cylinder pressure of each of the wheel cylinders at a controlled level by performing the BBW control method.

When the malfunction position/mode of a malfunction indicated by malfunction No. 26 (the "drift" defect of the RL sensor 65) are detected, the countermeasure process performed at the step 128 by the ECU 10 is either ACTION 1 or ACTION 2 as shown in FIG. 18. When the amount of the drift or deviation of the sensor output pRL of the sensor 65 is small, the ECU 10 performs the ACTION 1. The ACTION 1 is to correct the sensor output pRL of the sensor 65. Since the drift of the sensor output pRL is small, the ECU can detect accurate wheel cylinder pressure by correction of the sensor output pRL of the sensor 65. After the countermeasure process is performed, when the brake pedal 12 is depressed by the vehicle operator, the ECU 10 performs the BBW control method for the four wheel cylinders by using the sensor output pMC as the base pressure.

When the amount of the drift or deviation of the sensor output pRL of the sensor 65 is excessively large, the ECU 10 performs the ACTION 2. The ACTION 2 is the same as that of malfunction No. 24 (one of the ACTION 1 and the ACTION 2 thereof). The hydraulic brake pressure control system of FIG. 1 can maintain the wheel cylinder pressure of each of the wheel cylinders at a controlled level by performing the BBW control method in a manner similar to the case of malfunction No. 24.

When the malfunction position/mode of a malfunction indicated by malfunction No. 34 (the valve-open defect of the RMCV 58) are detected, the countermeasure process performed at the step 128 by the ECU 10 is to maintain the RR LCV 86, the RR LCV 94 and the RSCV 63 in the valve-closed state. By this countermeasure process, the RR connecting path 59 is cut off from the RL connecting path 60, and the brake fluid pressure ($P_{M/C}$) from the master cylinder 16 is supplied to the RR wheel cylinder 61.

After the countermeasure process is performed, when the brake pedal 12 is depressed by the vehicle operator, the ECU 10 performs the M/C control method to control the wheel cylinder pressure of the RR wheel cylinder 61. In this case, the sensor output pRR of the sensor 62 is equal to the master cylinder pressure $P_{M/C}$ (or the sensor output pMC of the sensor 24). The sensor output pRR may be used as the base pressure of the BBW control method. The ECU 10 performs the BBW control method for the other wheel cylinders by using the sensor output pRR (or pMC) as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 2 (the valve-closed defect of the RMCV 58) are detected, the countermeasure process performed at the step 128 by the ECU 10 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the malfunction position/mode of a malfunction indicated by malfunction No. 43 (the valve-open defect of the RSCV 63) are detected, the countermeasure process performed at the step 128 by the ECU 10 is to maintain the RL LCV 88, the RL LCV 96 and the RMCV 58 in the valve-closed state. By this countermeasure process, the RR connecting path 59 and the RL connecting path 60 are connected to each other, and these paths are cut off from the master cylinder 16.

After the countermeasure process is performed, when the brake pedal 12 is depressed by the vehicle operator, the ECU 10 performs the M/C control method to control the wheel cylinder pressure of the FL, FR and RR wheel cylinders by using the sensor output pMC as the base pressure. In this case, the wheel cylinder pressure of the RL wheel cylinder is equal to the wheel cylinder pressure of the RR wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 25 (the valve-closed defect of the RSCV 63) are detected, the countermeasure process performed at the step 128 by the ECU 10 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the malfunction position/mode of a malfunction indicated by malfunction No. 27 (the valve-open defect of the FMCV 50) are detected, the countermeasure process performed at the step 128 by the ECU 10 is to maintain the FR LCV 80, the FR LCV 90 and the FSCV 55 in the valve-closed state as shown in FIG. 19. By this countermeasure process, the RR connecting path 59 is cut off from the RL connecting path 60, and the brake fluid pressure ($P_{M/C}$) from the master cylinder 16 is supplied to the RR wheel cylinder 61.

After the countermeasure process is performed, when the brake pedal 12 is depressed by the vehicle operator, the ECU 10 performs the M/C control method to control the wheel cylinder pressure of the FR wheel cylinder 53. In this case, the sensor output pFR of the sensor 54 is equal to the master cylinder pressure $P_{M/C}$ (or the sensor output pMC of the sensor 24). The sensor output pFR may be used as the base pressure of the BBW control method. The ECU 10 performs the BBW control method for the other wheel cylinders by using the sensor output pFR (or pMC) as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 8 (the valve-closed defect of the FMCV 50) are detected, the countermeasure process performed at the step 128 by the ECU is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the malfunction position/mode of a malfunction indicated by malfunction No. 41 (the valve-open defect of the FSCV 55) are detected, the countermeasure process performed at the step 128 by the ECU 10 is to maintain the FL LCV 82, the FL LCV 92 and the FMCV 50 in the valve-closed state as shown in FIG. 19. By this countermeasure process, the FR connecting path 51 and the FL connecting path 52 are connected to each other, and these paths are cut off from the mechanical pressure-increase valve 26.

After the countermeasure process is performed, when the brake pedal 12 is depressed by the vehicle operator, the ECU 10 performs the BBW control method to control the wheel cylinder pressure of the FR, RL and RR wheel cylinders by using the sensor output pMC as the base pressure. In this case, the wheel cylinder pressure of the FL wheel cylinder is equal to the wheel cylinder pressure of the FR wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 20 (the valve-closed defect of the FSCV 55) are detected, the countermeasure process performed at the step 128 by the ECU is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the malfunction position/mode of a malfunction indicated by malfunction No. 45 (the valve-open defect of the RCV 84) are detected, the countermeasure process performed at the step 128 by the ECU is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the malfunction position/mode of a malfunction indicated by malfunction No. 44 (the valve-closed defect of the RCV 84) are detected, the countermeasure process performed at the step 128 by the ECU 10 is to maintain the RR LCV 86, the RR LCV 94, the RL LCV 88 and the RL LCV 96 in the valve-closed state, and maintain the RMCV 58 and the RSCV 63 in the valve-open state, as shown in FIG. 19. By this countermeasure process, the RR connecting path 59 and the RL connecting path 60 are connected to the master cylinder 16, and the brake fluid pressure ($P_{M/C}$) from the master cylinder 16 is supplied to the RR wheel cylinder 61 and the RL wheel cylinder 64.

After the countermeasure process is performed, when the brake pedal 12 is depressed by the vehicle operator, the ECU 10 performs the M/C control method to control both the wheel cylinder pressure of the RR wheel cylinder 61 and the wheel cylinder pressure of the RL wheel cylinder 64. In this case, the ECU 10 performs the BBW control method for the FR and FL wheel cylinders 53 and 56 by using the sensor output pMC as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 46 (the valve-open defect of the FCV 79) are detected, the countermeasure process performed at the step 128 by the ECU is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the malfunction position/mode of a malfunction indicated by malfunction No. 42 (the valve-closed defect of the FCV 79) are detected, the countermeasure process performed at the step 128 by the ECU 10 is to maintain the FR LCV 80, the FR LCV 90, the FL LCV 82 and the FL LCV 92 in the valve-closed state, and maintain the FMCV 50 and the FSCV 55 in the valve-open state, as shown in FIG. 20. By this countermeasure process, the FR connecting path 51 and the FL connecting path 52 are connected to the master cylinder 16, and the brake fluid pressure ($P_{M/C}$) from the master cylinder 16 is supplied to the FR wheel cylinder 53 and the FL wheel cylinder 56 through the mechanical pressure-increase valve 26.

After the countermeasure process is performed, when the brake pedal 12 is depressed by the vehicle operator, the ECU 10 performs the M/C control method to control both the wheel cylinder pressure of the FR wheel cylinder 53 and the wheel cylinder pressure of the FL wheel cylinder 56. In this case, the ECU 10 performs the BBW control method for the RR and RL wheel cylinders 61 and 64 by using the sensor output pMC as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 29 (the valve-open defect of the FR LCV 80) are detected, the countermeasure process performed at the step 128 by the ECU 10 is either ACTION 1 or ACTION 2 as shown in FIG. 20. When the amount of the leaking brake fluid from the FR LCV 80 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the FR LCV 80 is excessively large, the ECU 10 performs the ACTION 2. The ACTION 2 is to maintain the FR LCV 90, the FL LCV 82, the FL LCV 92 and the FCV 79 in the valve-closed state, and maintain the FMCV 50 and the FSCV 55 in the valve-open state, as shown in FIG. 20. By this countermeasure process, the FR LCV 80 is cut off from the accumulator 72, the FR connecting path 51 and the FL connecting path 52 are connected to the master cylinder 16, and the brake fluid pressure ($P_{M/C}$) from the master cylinder 16 is supplied to the FR wheel cylinder 53 and the FL wheel cylinder 56 through the mechanical pressure-increase valve 26.

After the countermeasure process is performed, when the brake pedal 12 is depressed by the vehicle operator, the ECU 10 performs the M/C control method to control both the wheel cylinder pressure of the FR wheel cylinder 53 and the wheel cylinder pressure of the FL wheel cylinder 56. In this case, the ECU 10 performs the BBW control method for the RR and RL wheel cylinders 61 and 64 by using the sensor output pMC as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 28 (the valve-closed defect of the FR LCV 80) are detected, the countermeasure process performed at the step 128 by the ECU 10 is to maintain the FR LCV 90 and the FMCV 50 in the valve-closed state and maintain the FSCV 55 in the valve-open state as shown in FIG. 20. By this countermeasure process, the FR connecting path 51 and the FL connecting path 52 are connected to each other, and these paths are cut off from the mechanical pressure-increase valve 26.

After the countermeasure process is performed, when the brake pedal 12 is depressed by the vehicle operator, the ECU 10 performs the BBW control method to control the wheel cylinder pressure of the FL, RL and RR wheel cylinders by using the sensor output pMC as the base pressure. In this case, the wheel cylinder pressure of the FR wheel cylinder is equal to the wheel cylinder pressure of the FL wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 11 (the valve-open defect of the FR LCV 90) are detected, the countermeasure process performed at the step 128 by the ECU 10 is either ACTION 1 or ACTION 2 as shown in FIG. 21. When the amount of the leaking brake fluid from the FR LCV 90 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the FR LCV 90 is excessively large, the ECU 10 performs the ACTION 2. The ACTION 2 is to maintain the FR LCV 80, the FMCV 50 and the FSCV 55 in the valve-closed state, and maintain the FCV 79 in the valve-open state, as shown in FIG. 21. By this countermeasure process, the FR LCV 90 is cut off from the accumulator 72, the mechanical pressure-increase valve 26 and the FL connecting path 52. Hence, if the valve-open defect of the FR LCV 90 occurs in the system, the leaking of the brake fluid from the FR LCV 90 is prevented.

After the countermeasure process is performed, when the brake pedal 12 is depressed by the vehicle operator, the ECU 10 performs the BBW control method for the FL, RR and RL wheel cylinders 61 and 64 by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the FR LCV 90. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 30 (the valve-closed defect of the FR LCV 90) are detected, the countermeasure process performed at the step 128 by the ECU 10 is to maintain the FR LCV 80 and the FMCV 50 in the valve-closed state and maintain the FSCV 55 in the valve-open state as shown in FIG. 21. By this countermeasure process, the FR connecting path 51 and the FL connecting path 52 are connected to each other, and these paths are cut off from the mechanical pressure-increase valve 26.

After the countermeasure process is performed, when the brake pedal 12 is depressed by the vehicle operator, the ECU 10 performs the BBW control method to control the wheel cylinder pressure of the FL, RL and RR wheel cylinders by using the sensor output pMC as the base pressure. In this case, the wheel cylinder pressure of the FR wheel cylinder is equal to the wheel cylinder pressure of the FL wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 32 (the valve-open defect of the FL LCV 82) are detected, the countermeasure process performed at the step 128 by the ECU 10 is either ACTION 1 or ACTION 2 as shown in FIG. 21. When the amount of the leaking brake fluid from the FL LCV 82 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the FL LCV 82 is excessively large, the ECU 10 performs the ACTION 2. The ACTION 2 is to maintain the FL LCV 92, the FR LCV 80, the FR LCV 90 and the FCV 79 in the valve-closed state, and maintain the FMCV 50 and the FSCV 55 in the valve-open state, as shown in FIG. 21. By this countermeasure process, the FL LCV 82 is cut off from the accumulator 72, and the FR and FL wheel cylinders 53 and 56 are connected to the mechanical pressure-increase valve 26. In this condition, if the valve-open defect of the FL LCV 82 occurs in the system, the leaking of the brake fluid from the FL LCV 82 is prevented.

After the countermeasure process is performed, when the brake pedal 12 is depressed by the vehicle operator, the ECU 10 performs the M/C control method to control both the wheel cylinder pressure of the FR wheel cylinder 53 and the wheel cylinder pressure of the FL wheel cylinder 56. In this case, the ECU 10 performs the BBW control method for the RR and RL wheel cylinders 61 and 64 by using the sensor output pMC as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 31 (the valve-closed defect of the FL LCV 82) are detected, the countermeasure process performed at the step 128 by the ECU 10 is to maintain the FL LCV 92 and the FMCV 50 in the valve-closed state and maintain the FSCV 55 in the valve-open state as shown in FIG. 21. By this countermeasure process, the FR connecting path 51 and the FL connecting path 52 are connected to each other, and these paths are cut off from the mechanical pressure-increase valve 26.

After the countermeasure process is performed, when the brake pedal 12 is depressed by the vehicle operator, the ECU 10 performs the BBW control method to control the wheel cylinder pressure of the FR, RL and RR wheel cylinders by using the sensor output pMC as the base pressure. In this case, the wheel cylinder pressure of the FL wheel cylinder is equal to the wheel cylinder pressure of the FR wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 13 (the valve-open defect of the FL LCV 92) are detected, the countermeasure process performed at the step 128 by the ECU 10 is either ACTION 1 or ACTION 2 as shown in FIG. 22. When the amount of the leaking brake fluid from the FL LCV 92 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the FL LCV 92 is excessively large, the ECU 10 performs the ACTION 2. The ACTION 2 is to maintain the FL LCV 82, the FMCV 50 and the FSCV 55 in the valve-closed state, and maintain the FR LCV 80 in the valve-open state, as shown in FIG. 22. By this countermeasure process, the FL LCV 92 is cut off from the accumulator 72, the mechanical pressure-increase valve 26 and the FR connecting path 51. Hence, if the valve-open defect of the FL LCV 92 occurs in the system, the leaking of the brake fluid from the FL LCV 92 is prevented.

After the countermeasure process is performed, when the brake pedal 12 is depressed by the vehicle operator, the ECU 10 performs the BBW control method for the FR, RR and RL wheel cylinders by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the FL LCV 92. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 33 (the valve-closed defect of the FL LCV 92) are detected, the countermeasure process performed at the step 128 by the ECU 10 is to maintain the FL LCV 82 and the FMCV 50 in the valve-closed state and maintain the FSCV 55 in the valve-open state as shown in FIG. 22. By this countermeasure process, the FR connecting path 51 and the FL connecting path 52 are connected to each other, and these paths are cut off from the mechanical pressure-increase valve 26.

After the countermeasure process is performed, when the brake pedal 12 is depressed by the vehicle operator, the ECU 10 performs the BBW control method to control the wheel cylinder pressure of the FR, RL and RR wheel cylinders by using the sensor output pMC as the base pressure. In this case, the wheel cylinder pressure of the FL wheel cylinder is equal to the wheel cylinder pressure of the FR wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 36 (the valve-open defect of the RR LCV 86) are detected, the countermeasure process performed at the step 128 by the ECU 10 is either ACTION 1 or ACTION 2 as shown in FIG. 22. When the amount of the leaking brake fluid from the RR LCV 86 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the RR LCV 86 is excessively large, the ECU 10 performs the ACTION 2. The ACTION 2 is to maintain the RR LCV 94, the RL LCV 88, the RL LCV 96 and the RCV 84 in the valve-closed state, and maintain the RMCV 58 and the RSCV 63 in the valve-open state, as shown in FIG. 22. By this countermeasure process, the RR LCV 86 is cut off from the accumulator 72, and the RR and RL wheel cylinders 61 and 64 are connected to the master cylinder 16. In this condition, if the valve-open defect of the RR LCV 86 occurs in the system, the leaking of the brake fluid from the RR LCV 86 is prevented.

After the countermeasure process is performed, when the brake pedal 12 is depressed by the vehicle operator, the ECU 10 performs the M/C control method to control both the wheel cylinder pressure of the RR wheel cylinder 61 and the wheel cylinder pressure of the RL wheel cylinder 64. In this case, the ECU 10 performs the BBW control method for the FR and FL wheel cylinders 53 and 56 by using the sensor output pMC as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 35 (the valve-closed defect of the RR LCV 86) are detected, the countermeasure process performed at the step 128 by the ECU 10 is to maintain the RR LCV 94 and the RMCV 58 in the valve-closed state and maintain the RSCV 63 in the valve-open state as shown in FIG. 22. By this countermeasure process, the RR connecting path 59 and the RL connecting path 60 are connected to each other, and these paths are cut off from the master cylinder 16.

After the countermeasure process is performed, when the brake pedal 12 is depressed by the vehicle operator, the ECU 10 performs the BBW control method to control the wheel cylinder pressure of the FR, FL and RL wheel cylinders by using the sensor output pMC as the base pressure. In this case, the wheel cylinder pressure of the RR wheel cylinder is equal to the wheel cylinder pressure of the RL wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 4 (the valve-open defect of the RR LCV 94) are detected, the countermeasure process performed at the step 128 by the ECU 10 is either ACTION 1 or ACTION 2 as shown in FIG. 23. When the amount of the leaking brake fluid from the RR LCV 94 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the RR LCV 94 is excessively large, the ECU 10 performs the ACTION 2. The ACTION 2 is to maintain the RR LCV 86, the RMCV 58 and the RSCV 63 in the valve-closed state, and maintain the RCV 84 in the valve-open state, as shown in FIG. 23. By this countermeasure process, the RR LCV 94 is cut off from the accumulator 72, the master cylinder 16 and the RL connecting path 60. Hence, if the valve-open defect of the RR LCV 94 occurs in the system, the leaking of the brake fluid from the RR LCV 94 is prevented.

After the countermeasure process is performed, when the brake pedal 12 is depressed by the vehicle operator, the ECU 10 performs the BBW control method for the FR, FL and RL wheel cylinders by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the RR LCV 94. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 37 (the valve-closed defect of the RR LCV 94) are detected, the countermeasure process performed at the step 128 by the ECU 10 is to maintain the RR LCV 86 and the RMCV 58 in the valve-closed state and maintain the RSCV 63 in the valve-open state as shown in FIG. 23. By this countermeasure process, the RR connecting path 59 and the RL connecting path 60 are connected to each other, and these paths are cut off from the master cylinder 16.

After the countermeasure process is performed, when the brake pedal 12 is depressed by the vehicle operator, the ECU 10 performs the BBW control method to control the wheel cylinder pressure of the FR, FL and RL wheel cylinders by using the sensor output pMC as the base pressure. In this case, the wheel cylinder pressure of the RR wheel cylinder is equal to the wheel cylinder pressure of the RL wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 39 (the valve-open defect of the RL LCV 88) are detected, the countermeasure process performed at the step 128 by the ECU 10 is either ACTION 1 or ACTION 2 as shown in FIG. 23. When the amount of the leaking brake fluid from the RL LCV 88 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the RL LCV 88 is excessively large, the ECU 10 performs the ACTION 2. The ACTION 2 is to maintain the RL LCV 96, the RR LCV 86, the RR LCV 94 and the RCV 84 in the valve-closed state, and maintain the RMCV 58 and the RSCV 63 in the valve-open state, as shown in FIG. 23. By this countermeasure process, the RL LCV 88 is cut off from the accumulator 72, and the RR and RL wheel cylinders 61 and 64 are connected to the master cylinder 16. In this condition, if the valve-open defect of the RL LCV 88 occurs in the system, the leaking of the brake fluid from the RL LCV 88 is prevented.

After the countermeasure process is performed, when the brake pedal 12 is depressed by the vehicle operator, the ECU 10 performs the M/C control method to control both the wheel cylinder pressure of the RR wheel cylinder 61 and the wheel cylinder pressure of the RL wheel cylinder 64. In this case, the ECU 10 performs the BBW control method for the FR and FL wheel cylinders 53 and 56 by using the sensor output pMC as the base pressure. The hydraulic brake pressure control system of FIG. 1 can maintain the wheel cylinder pressure of each of the wheel cylinders at a controlled level by performing the M/C control method and the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 38 (the valve-closed defect of the RL LCV 88) are detected, the countermeasure process performed at the step 128 by the ECU 10 is to maintain the RL LCV 88 and the RMCV 58 in the valve-closed state and maintain the RSCV 63 in the valve-open state as shown in FIG. 23. By this countermeasure process, the RR connecting path 59 and the RL connecting path 60 are connected to each other, and these paths are cut off from the master cylinder 16.

After the countermeasure process is performed, when the brake pedal 12 is depressed by the vehicle operator, the ECU 10 performs the BBW control method to control the wheel cylinder pressure of the FR, FL and RR wheel cylinders by using the sensor output pMC as the base pressure. In this case, the wheel cylinder pressure of the RL wheel cylinder is equal to the wheel cylinder pressure of the RR wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 6 (the valve-open defect of the RL LCV 96) are detected, the countermeasure process performed at the step 128 by the ECU 10 is either ACTION 1 or ACTION 2 as shown in FIG. 24. When the amount of the leaking brake fluid from the RL LCV 96 is small, the ECU 10 performs the ACTION 1. The ACTION 1 is the same as the normal process (or the BBW control method performed at the step 134). After the countermeasure process is performed, the hydraulic brake pressure control system of FIG. 1 can maintain the wheel cylinder pressure of each of the wheel cylinders at a controlled level by performing the BBW control method in the same manner as the normal process of the step 134.

When the amount of the leaking brake fluid from the RL LCV 96 is excessively large, the ECU 10 performs the ACTION 2. The ACTION 2 is to maintain the RL LCV 88, the RMCV 58 and the RSCV 63 in the valve-closed state, and maintain the RCV 84 in the valve-open state, as shown in FIG. 24. By this countermeasure process, the RL LCV 96 is cut off from the accumulator 72, the master cylinder 16 and the RR connecting path 59. Hence, if the valve-open defect of the RL LCV 96 occurs in the system, the leaking of the brake fluid from the RL LCV 96 is prevented.

After the countermeasure process is performed, when the brake pedal 12 is depressed by the vehicle operator, the ECU 10 performs the BBW control method for the FR, FL and RR wheel cylinders by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the RL LCV 96. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 40 (the valve-closed defect of the RL LCV 96) are detected, the countermeasure process performed at the step 128 by the ECU 10 is to maintain the RL LCV 88 and the RMCV 58 in the valve-closed state and maintain the RSCV 63 in the valve-open state as shown in FIG. 24. By this countermeasure process, the RR connecting path 59 and the RL connecting path 60 are connected to each other, and these paths are cut off from the master cylinder 16.

After the countermeasure process is performed, when the brake pedal 12 is depressed by the vehicle operator, the ECU 10 performs the BBW control method to control the wheel cylinder pressure of the FR, FL and RR wheel cylinders by using the sensor output pMC as the base pressure. In this case, the wheel cylinder pressure of the RL wheel cylinder is equal to the wheel cylinder pressure of the RR wheel cylinder. The hydraulic brake pressure control system of FIG. 1 can maintain the wheel cylinder pressure of each of the wheel cylinders at a controlled level by performing the BBW control method. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 10 (the leak defect of the pipe of the FR wheel cylinder 53) are detected, the countermeasure process performed at the step 128 by the ECU 10 is to maintain the FR LCV 80, the FR LCV 90, the FMCV 50 and the FSCV 55 in the valve-closed state and maintain the FCV 79 in the valve-open state as shown in FIG. 24. By this countermeasure process, the pipe of the FR wheel cylinder 53 is cut off from the accumulator 72, the mechanical pressure-increase valve 26 and the FL connecting path 52. In this condition, if the leak defect of the pipe of the FR wheel cylinder 53 occurs in the system, the leaking of the brake fluid from the pipe of the FR wheel cylinder 53 is prevented.

After the countermeasure process is performed, when the brake pedal 12 is depressed by the vehicle operator, the ECU 10 performs the BBW control method to control the wheel cylinder pressure of the FL, RL and RR wheel cylinders by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the pipe of the FR wheel cylinder 53. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 12 (the leak defect of the pipe of the FL wheel cylinder 56) are detected, the countermeasure process performed at the step 128 by the ECU 10 is to maintain the FL LCV 82, the FL LCV 92, the FMCV 50 and the FSCV 55 in the valve-closed state and maintain the FCV 79 in the valve-open state as shown in FIG. 24. By this countermeasure process, the pipe of the FL wheel cylinder 56 is cut off from the accumulator 72, the mechanical pressure-increase valve 26 and the FR connecting path 51. In this condition, if the leak defect of the pipe of the FL wheel cylinder 56 occurs in the system, the leaking of the brake fluid from the pipe of the FL wheel cylinder 56 is prevented.

After the countermeasure process is performed, when the brake pedal 12 is depressed by the vehicle operator, the ECU 10 performs the BBW control method to control the wheel cylinder pressure of the FR, RL and RR wheel cylinders by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the pipe of the FL wheel cylinder 56. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 3 (the leak defect of the pipe of the RR wheel cylinder 61) are detected, the countermeasure process performed at the step 128 by the ECU 10 is to maintain the RR LCV 86, the RR LCV 94, the RMCV 58 and the RSCV 63 in the valve-closed state and maintain the RCV 84 in the valve-open state as shown in FIG. 25. By this countermeasure process, the pipe of the RR wheel cylinder 61 is cut off from the accumulator 72, the master cylinder 16 and the RL connecting path 60. In this condition, if the leak defect of the pipe of the RR wheel cylinder 61 occurs in the system, the leaking of the brake fluid from the pipe of the RR wheel cylinder 61 is prevented.

After the countermeasure process is performed, when the brake pedal 12 is depressed by the vehicle operator, the ECU 10 performs the BBW control method to control the wheel cylinder pressure of the FR, FL and RL wheel cylinders by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the pipe of the RR wheel cylinder 61. Hence, the hydraulic brake pressure control system of FIG. 1 can produce an adequate level of braking force on the wheels of the vehicle in spite of the occurrence of the malfunction.

When the malfunction position/mode of a malfunction indicated by malfunction No. 5 (the leak defect of the pipe of the RL wheel cylinder 64) are detected, the countermeasure process performed at the step 128 by the ECU 10 is to maintain the RL LCV 88, the RL LCV 96, the RMCV 58 and the RSCV 63 in the valve-closed state and maintain the RCV 84 in the valve-open state as shown in FIG. 25. By this countermeasure process, the pipe of the RL wheel cylinder 64 is cut off from the accumulator 72, the master cylinder 16 and the RR connecting path 59. In this condition, if the leak defect of the pipe of the RL wheel cylinder 64 occurs in the system, the leaking of the brake fluid from the pipe of the RL wheel cylinder 64 is prevented.

After the countermeasure process is performed, when the brake pedal 12 is depressed by the vehicle operator, the ECU 10 performs the BBW control method to control the wheel cylinder pressure of the FR, FL and RR wheel cylinders by using the sensor output pMC as the base pressure. The hydraulic brake pressure control system of FIG. 1 can maintain the wheel cylinder pressure of the three wheel cylinders at a controlled level by performing the BBW control method while preventing the leaking of the brake fluid from the pipe of the RL wheel cylinder 64. Hence, the hydraulic brake pressure control system of FIG. 1 can produce an adequate level of braking force on the wheels of the vehicle in spite of the occurrence of the malfunction.

When the malfunction position/mode of a malfunction indicated by one of malfunction No. 47 and malfunction No. 48 (the "Pacc leak" defect of the mechanical pressure-increase valve 26) are detected, the countermeasure process performed at the step 128 by the ECU 10 is the same as the normal process (or the BBW control method performed at the step 134). When the BBW control method is executed, the FMCV 50 is set in the valve-closed state and the valve 26 is cut off from the hydraulic circuit including the four wheel cylinders. When the malfunction in the present case occurs in the system, the operation frequency of the pump unit 68 becomes high. However, the hydraulic brake pressure control system of FIG. 1 can maintain the wheel cylinder pressure of each of the wheel cylinders at a controlled level by performing the BBW control method in the same manner as the normal process of the step 134.

Further, in the hydraulic brake pressure control system of the present embodiment, additional malfunctions, other than the above-mentioned malfunctions, may occur at various elements including the Acc pressure sensor 73, the ULS 74, the LLS 76, the pump unit 68 and the accumulator 72. Similar to the malfunction/ countermeasure determination control process of FIG. 3 and FIG. 4, it is possible for the hydraulic brake pressure control system of the present invention to detect the malfunction position/mode of such a malfunction and perform a countermeasure process in response to the occurrence of the malfunction of concern.

Further, the present invention is not limited to the above-described embodiments, and variations and modifications may be made without departing from the present invention.

The present invention is based on Japanese priority application No. 9-217828, filed on Aug. 12, 1997, the entire contents of which are hereby incorporated by reference.

What is claimed is:

1. A hydraulic brake pressure control system including a master cylinder generating a brake fluid pressure proportional to brake pedal pressure, a high-pressure supply device generating an increased brake fluid pressure, and a hydraulic circuit having a wheel cylinder device, the hydraulic circuit performing a master cylinder control to control a wheel cylinder pressure by using the pressure generated by the master cylinder, and performing a brake-by-wire control to control the wheel cylinder pressure by using the pressure generated by the high-pressure supply device, the hydraulic brake pressure control system comprising:

a master cut valve device provided in the hydraulic circuit for controlling a flow of brake fluid from the master cylinder into the wheel cylinder device;

a wheel cylinder sensor device for outputting a signal indicative of the brake fluid pressure in the wheel cylinder device; and a malfunction position/mode detecting unit for detecting a malfunction position and a malfunction mode in the hydraulic brake pressure control system based on the combination of both the signal output by the wheel cylinder sensor device during the master cylinder control together with the signal output by the wheel cylinder sensor device during the brake-by-wire control.

2. The hydraulic brake pressure control system according to claim 1, wherein the malfunction position/mode detecting unit includes a first malfunction detecting unit wherein, when the output signal of the wheel cylinder sensor device during the master cylinder control indicates a normal change of the brake fluid pressure in the wheel cylinder device but the output signal of the wheel cylinder sensor device during the brake-by-wire control does not indicate a rise of the brake fluid pressure in the wheel cylinder device, the first malfunction detecting unit detects that a valve-open defect of the master cut valve device occurs.

3. The hydraulic brake pressure control system according to claim 2, wherein the hydraulic brake pressure control system includes a first countermeasure unit for inhibiting the brake-by-wire control and allowing the master cylinder control to control the wheel cylinder pressure, when the first malfunction detecting unit has detected that the valve-open defect of the master cut valve device occurs.

4. The hydraulic brake pressure control system according to claim 1, wherein the hydraulic brake pressure control system includes a master cylinder sensor device for outputting a signal indicative of the brake fluid pressure in the master cylinder, and the malfunction position/mode detecting unit detects a malfunction position and a malfunction mode in the hydraulic brake pressure control system based on the signal output by the master cylinder sensor device as well as the signal output by the wheel cylinder sensor device during the master cylinder control, and based on the signal output by the wheel cylinder sensor device during the brake-by-wire control.

5. The hydraulic brake pressure control system according to claim 4, wherein the malfunction position/mode detecting unit includes a second malfunction detecting unit wherein, when at least one of the output signal of the wheel cylinder sensor device during the master cylinder control and the output signal of the master cylinder sensor device during the master cylinder control does not indicate a rise of the brake fluid pressure, the second malfunction detecting unit detects that the master cylinder is subjected to no pressure rise.

6. The hydraulic brake pressure control system according to claim 4, wherein the master cylinder includes first and second pressure chambers in which the brake fluid pressure in the master cylinder is generated, and the master cylinder sensor device is connected to one of the first and second pressure chambers of the master cylinder.

7. The hydraulic brake pressure control system according to claim 6, wherein the wheel cylinder device includes first wheel cylinders connected to the first pressure chamber of the master cylinder and second wheel cylinders connected to the second pressure chamber of the master cylinder, and the malfunction position/mode detecting unit includes:

a first judgment process unit wherein, when the output signal of the wheel cylinder sensor device during the master cylinder control does not indicate a rise of the brake fluid pressure in the second wheel cylinders, the first judgment process unit performs a first judgment process in which the brake-by-wire control for the second wheel cylinders is performed while the master cut valve device is maintained in a valve-open state;

a first malfunction detecting unit for detecting that the master cylinder is subjected to no pressure rise, when the output signal of the wheel cylinder sensor device during the first judgment process does not indicate a rise of the brake fluid pressure; and a first malfunction detecting unit for detecting that a valve-closed defect of the master cut valve device occurs, when the output signal of the wheel cylinder sensor device during the first judgment process indicates a rise of the brake fluid pressure.

8. The hydraulic brake pressure control system according to claim 1, wherein the hydraulic circuit includes a pressure-raising linear control valve device, provided between the high-pressure supply device and the wheel cylinder device, for controlling the increased brake fluid pressure from the high-pressure supply device so as to maintain the brake fluid pressure in the wheel cylinder device at a controlled level.

9. The hydraulic brake pressure control system according to claim 8, wherein the wheel cylinder device includes a plurality of wheel cylinders, and the malfunction position/mode detecting unit includes:

a judgment process unit wherein, when the output signal of the wheel cylinder sensor device during the master cylinder control indicates a rise of the brake fluid pressure in one of the plurality of wheel cylinders and the output signal of the wheel cylinder sensor device during the brake-by-wire control does not indicate a rise of the brake fluid pressure in said one of the plurality of wheel cylinders, the judgment process unit performs a judgment process in which said one of the plurality of wheel cylinders is cut off from both the master cylinder and the high-pressure supply device and set to be open to the other wheel cylinders, and the brake-by-wire control for the other wheel cylinders is performed; and a secondary malfunction position/mode detecting unit for detecting a malfunction position and a malfunction mode in the hydraulic brake pressure control system based on a signal output by the wheel cylinder sensor device with respect to said one of the plurality of wheel cylinders during the judgment process.

10. The hydraulic brake pressure control system according to claim 9, wherein the pressure-raising linear control valve device includes respective linear control valves for the plurality of wheel cylinders, and the secondary malfunction position/mode detecting unit includes:

a first malfunction detecting unit for detecting that a valve-open defect of the master cut valve device occurs, when the output signal of the wheel cylinder sensor device with respect to said one of the plurality of wheel cylinders during the judgment process does not indicate a rise of the brake fluid pressure; and a second malfunction detecting unit for detecting that a valve-closed defect of one of the linear control valves corresponding to said one of the plurality of wheel cylinders occurs, when the output signal of the wheel cylinder sensor device with respect to said one of the plurality of wheel cylinders during the judgment process indicates a rise of the brake fluid pressure.

11. The hydraulic brake pressure control system according to claim 10, wherein the hydraulic brake pressure control system includes a countermeasure unit for cutting off said one of the plurality of wheel cylinders from both the master cylinder and the high-pressure supply device and setting said one of the plurality of wheel cylinders to be open to the other wheel cylinders, when the second malfunction detecting unit has detected that a valve-closed defect of one of the linear control valves corresponding to said one of the plurality of wheel cylinders occurs.

12. The hydraulic brake pressure control system according to claim 8, wherein the wheel cylinder device includes first wheel cylinders and second wheel cylinders, the pressure-raising linear control valve device includes first linear control valves provided between the high-pressure supply device and the first wheel cylinders and second linear control valves provided between the high-pressure supply device and the second wheel cylinders, and the hydraulic circuit includes:

first connecting paths connected to the master cut valve device, the first wheel cylinders and the first linear control valves;

second connecting paths connected to a secondary master cut valve device, the second wheel cylinders and the second linear control valves, wherein the secondary master cut valve device controls a flow of the brake fluid in the second connecting paths.

13. The hydraulic brake pressure control system according to claim 12, wherein the malfunction position/mode detecting unit detects a malfunction position and a malfunction mode in the hydraulic brake pressure control system by performing the brake-by-wire control for the first wheel cylinders and the brake-by-wire control for the second wheel cylinders at different times.

14. The hydraulic brake pressure control system according to claim 13, wherein the malfunction position/mode detecting unit includes a malfunction detecting unit wherein, when the output signal of the wheel cylinder sensor device during the brake-by-wire control with respect to one of the first wheel cylinders and the second wheel cylinders indicates a common change of the brake fluid pressure and the output signal of the wheel cylinder sensor device during the brake-by-wire control with respect to the other of the first wheel cylinders and the second wheel cylinders indicates a rise of the brake fluid pressure, the sixth malfunction detecting unit detects that a valve-open defect of the second master cut valve device occurs.

15. The hydraulic brake pressure control system according to claim 1, wherein the hydraulic circuit includes:

a tank for holding the brake fluid at a given low pressure; and a pressure-reducing linear control valve device provided between the tank and the wheel cylinder device for controlling a flow of the brake fluid from the wheel cylinder device into the tank so as to reduce the brake fluid pressure in the wheel cylinder device to the given low pressure.

16. The hydraulic brake pressure control system according to claim 15, wherein the wheel cylinder device includes a plurality of wheel cylinders, the pressure-reducing linear control valve device includes respective linear control valves for the plurality of wheel cylinders, the wheel cylinder pressure sensor device includes respective pressure sensors for the plurality of wheel cylinders, and the malfunction position/mode detecting unit includes a malfunction detecting unit, wherein, when only a signal output by one of the pressure sensors does not indicate a rise of the brake fluid pressure in a corresponding one of the plurality of wheel cylinders during the master cylinder control nor during the brake-by-wire control, the malfunction detecting unit detecting that said one of the pressure sensors malfunctions.

17. The hydraulic brake pressure control system according to claim 16, wherein the hydraulic brake pressure control system includes a countermeasure unit for cutting off the corresponding wheel cylinder from both the master cylinder and the high-pressure supply device and for setting the corresponding wheel cylinder to be open to the other wheel cylinders when the malfunction detecting unit detects the malfunction of said one of the pressure sensors.

18. The hydraulic brake pressure control system according to claim 16, wherein the hydraulic brake pressure control system includes a countermeasure unit for controlling the brake fluid pressure in the corresponding wheel cylinder based on signals output by the other pressure sensors for the other wheel cylinders when the malfunction detecting unit detects the malfunction of said one of the pressure sensors.

19. The hydraulic brake pressure control system according to claim 15, wherein the wheel cylinder device includes a plurality of wheel cylinders, the pressure-reducing linear control valve device includes respective linear control valves for the plurality of wheel cylinders, the wheel cylinder pressure sensor device includes respective pressure sensors for the plurality of wheel cylinders, and the malfunction position/mode detecting unit includes:

a change rate detecting unit wherein, when only a signal output by one of the pressure sensors does not indicate a rise of the brake fluid pressure in a corresponding one of the plurality of wheel cylinders during the brake-by-wire control and only signals output by two or more of the pressure sensors do not indicate a rise of the brake fluid pressure in corresponding ones of the plurality of wheel cylinders during the master cylinder control, the change rate detecting unit detecting whether a rate of change of the output signal of said one of the pressure sensors during the brake-by-wire control is above a threshold value;

a first malfunction detecting unit for detecting that a corresponding one of the linear control valves for the corresponding wheel cylinder leaks, when the change rate detecting unit has detected that the rate of change is above the threshold value; and a second malfunction detecting unit for detecting that a pipe connected to the corresponding wheel cylinder leaks, when the change rate detecting unit has detected that the rate of change is not above the threshold value.

20. The hydraulic brake pressure control system according to claim 15, wherein the wheel cylinder device includes a plurality of wheel cylinders, the pressure-reducing linear control valve device includes respective linear control valves for the plurality of wheel cylinders, the wheel cylinder pressure sensor device includes respective pressure sensors for the plurality of wheel cylinders, and the malfunction position/mode detecting unit includes:

a brake fluid amount detecting unit wherein, when only a signal output by one of the pressure sensors does not indicate a rise of the brake fluid pressure in a corresponding one of the plurality of wheel cylinders during the brake-by-wire control and only signals output by two or more of the pressure sensors do not indicate a rise of the brake fluid pressure in corresponding ones of the plurality of wheel cylinders during the master cylinder control, the brake fluid amount detecting unit detecting an amount of a remaining brake fluid in the tank;

a first malfunction detecting unit for detecting that a corresponding one of the linear control valves for the corresponding wheel cylinder leaks, when a rate of change of the amount of the remaining brake fluid detected by the brake fluid amount detecting unit is not above a threshold value; and a second malfunction detecting unit for detecting that a pipe connected to the corresponding wheel cylinder leaks, when the rate of change of the amount of the remaining brake fluid detected by the brake fluid amount detecting unit is above the threshold value.

21. A hydraulic brake pressure control system including a master cylinder generating a brake fluid pressure proportional to a brake pedal pressure, a high-pressure supply device generating an increased brake fluid pressure, and a hydraulic circuit including a wheel cylinder device and connecting the wheel cylinder device to both the master cylinder and the high-pressure supply device, the hydraulic circuit performing a master cylinder control to control a wheel cylinder pressure by using the pressure generated by the master cylinder, and performing a brake-by-wire control to control the wheel cylinder pressure by using the pressure generated by the high-pressure supply device, the hydraulic brake pressure control system comprising:

a master cut valve device provided in the hydraulic circuit for controlling a flow of brake fluid from the master cylinder into the wheel cylinder device;

a hydraulic circuit sensor device for outputting a signal indicative of the brake fluid pressure in the hydraulic circuit; and a malfunction position/mode detecting unit for detecting a malfunction position and a malfunction mode in the hydraulic brake pressure control system based on the combination of the signal output by the hydraulic circuit sensor device during the master cylinder control together with the signal output by the hydraulic circuit sensor device during the brake-by-wire control.

22. A method of detecting a malfunction position and a malfunction mode in a hydraulic brake pressure control system including a master cylinder generating a brake fluid pressure proportional to a brake pedal pressure, a high-pressure supply device generating an increased brake fluid pressure, and a hydraulic circuit including a wheel cylinder device and connecting the wheel cylinder device to both the master cylinder and the high-pressure supply device, the hydraulic circuit performing a master cylinder control to control a wheel cylinder pressure by using the pressure generated by the master cylinder, and performing a brake-by-wire control to control the wheel cylinder pressure by using the pressure generated by high-pressure supply device, the method comprising the steps of:

providing a master cut valve device in the hydraulic circuit, the master cut valve device controlling a flow of brake fluid from the master cylinder into the wheel cylinder device;

providing a hydraulic circuit sensor device which outputs a signal indicative of the brake fluid pressure in the hydraulic circuit;

outputting a signal from the hydraulic circuit sensor device during the master cylinder control;

outputting a signal from the hydraulic circuit sensor device during the brake-by-wire control; and detecting a malfunction position and a malfunction mode in the hydraulic brake pressure control system based on the combination of both the signal output by the hydraulic circuit sensor device during the master cylinder control together with the signal output by the hydraulic circuit sensor device during the brake-by-wire control.

23. The hydraulic brake pressure control system according to claim 1, wherein the hydraulic circuit connects the wheel cylinder device to both the master cylinder and the high-pressure supply device, and wherein the malfunction position/mode detecting unit repeatedly initiates a malfunction position/mode detection process of detecting a malfunction position and a malfunction mode in the hydraulic brake pressure control system based on both the signal output by the wheel cylinder sensor device during the master cylinder control and the signal output by the wheel cylinder sensor device during the brake-by-wire control.

* * * * *